US012726946B2

(12) United States Patent
Zhang

(10) Patent No.: US 12,726,946 B2
(45) Date of Patent: Sep. 1, 2026

(54) METHOD AND DEVICE IN NODES USED FOR WIRELESS COMMUNICATION

(71) Applicant: Apogee 5G Global, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 512 days.

(21) Appl. No.: 18/123,986

(22) Filed: Mar. 21, 2023

(65) Prior Publication Data

US 2023/0232373 A1 Jul. 20, 2023

Related U.S. Application Data

(63) Continuation of application No. PCT/CN2021/118440, filed on Sep. 15, 2021.

(30) Foreign Application Priority Data

Sep. 23, 2020 (CN) ......................... 202011008088.3
Sep. 25, 2020 (CN) ......................... 202011022298.8
(Continued)

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04W 72/0446* (2013.01); *H04W 72/0453* (2013.01)

(58) Field of Classification Search
CPC ............. H04W 72/02; H04W 72/0446; H04W 72/0453; H04L 1/1812
See application file for complete search history.

(56) References Cited

U.S. PATENT DOCUMENTS 11,005,631 B2 5/2021 Takeda et al.
11,108,524 B2 8/2021 Wu et al.
(Continued)

FOREIGN PATENT DOCUMENTS

CN 110474747 A 11/2019
CN 110832920 A 2/2020
(Continued)

OTHER PUBLICATIONS

ISR received in application No. PCT/CN2021/118440 dated Nov. 17, 2021.

(Continued)

*Primary Examiner* — Ayman A Abaza
*Assistant Examiner* — Benjamin T. Ranew
(74) *Attorney, Agent, or Firm* — Volpe Koenig

(57) ABSTRACT

Provided are techniques for priority-based HARQ-ACK transmission. A receiver receives a first signaling; a transmitter transmits a first signal in a first time-frequency resource pool, the first signal carries a first bit block; herein, the first signaling is used to determine the first time-frequency resource pool; the first bit block comprises K HARQ-ACK information bit(s); a first condition is a condition related to type(s) of HARQ-ACK comprised in the first bit block; when the first condition is not satisfied, a same offset value is used to determine both a number of time-frequency resource element(s) comprised in a first time-frequency resource sub-pool and a number of time-frequency resource element(s) comprised in the first reserved resource pool; when the first condition is satisfied, two different offset values are respectively used to determine a number of time-frequency resource element(s) comprised in a first time-frequency resource sub-pool.

18 Claims, 8 Drawing Sheets

(30) Foreign Application Priority Data

Sep. 27, 2020 (CN) ........................ 202011033350.X
Oct. 15, 2020 (CN) ........................ 202011103568.8

(51) Int. Cl.
*H04W 72/0446* (2023.01)
*H04W 72/0453* (2023.01)

(56) References Cited

U.S. PATENT DOCUMENTS

| | | | | |
|---|---|---|---|---|
| 11,184,882 | B2 | 11/2021 | Wu et al. | |
| 2019/0013855 | A1 | 1/2019 | Kim | |
| 2019/0335423 | A1 | 10/2019 | Wu et al. | |
| 2020/0007296 | A1* | 1/2020 | Papasakellariou | H04L 5/0042 |
| 2020/0280398 | A1 | 9/2020 | Hwang et al. | |
| 2023/0043308 | A1* | 2/2023 | Li | H04L 1/1685 |

FOREIGN PATENT DOCUMENTS

| | | | |
|---|---|---|---|
| CN | 111278129 | A | 6/2020 |
| CN | 111314033 | A | 6/2020 |
| CN | 111436128 | A | 7/2020 |
| CN | 111669823 | A | 9/2020 |
| WO | 2019194464 | A1 | 10/2019 |
| WO | 2019194664 | A1 | 10/2019 |
| WO | 2020143428 | A1 | 7/2020 |
| WO | 2020164417 | A1 | 8/2020 |
| WO | 2020168907 | A1 | 8/2020 |

OTHER PUBLICATIONS

First Office Action of Chinese patent application No. CN202011022298.8 dated Jan. 4, 2023.
First Search Report of Chinese patent application No. CN202011022298.8 dated Dec. 21, 2022.
Notification to Grant Patent Right for Invention of Chinese patent application No. CN202011022298.8 dated Feb. 12, 2023.
OPPO UCI enhancements for URLLC 3GPP TSG RAN WG1 #97 R1-1906448 Apr. 30, 2019.
First Office Action of Chinese patent application No. CN202011103568.8 dated Feb. 1, 2024.
First Search Report of Chinese patent application No. CN202011103568.8 dated Jan. 31, 2024.
Supplementary European search report and European search opinion on application EP21871353, dated Jan. 26, 2024.
Huawei et a:"UCI piggyback on PUSCH" 3GPP Draft; R1800833, 3rd Partnership Project(3GPP).
India examination report on application IN202317028861, dated Apr. 2, 2024.
TCL Communication, "UE feedback enhancements for HARQ-ACK," 3GPP TSG RAN WG1 Meeting #102-e, R1-2005967, e-Meeting (Aug. 17-28, 2020).
Third Generation Partnership Project, "Technical Specification Group Radio Access Network; NR; Physical channels and modulation (Release 16)," 3GPP TS 38.211 V16.2.0 (Jun. 2020).
Third Generation Partnership Project, "Technical Specification Group Radio Access Network; NR; Multiplexing and channel coding (Release 16)," 3GPP TS 38.212 V16.2.0 (Jun. 2020).
Third Generation Partnership Project, "Technical Specification Group Radio Access Network; NR; Physical layer procedures for control (Release 16)," 3GPP TS 38.213 V16.2.0 (Jun. 2020).
Third Generation Partnership Project, "Technical Specification Group Radio Access Network; NR; Physical layer procedures for data (Release 16)," 3GPP TS 38.214 V16.2.0 (Jun. 2020).
Third Generation Partnership Project, "Technical Specification Group Radio Access Network; NR; Radio Resource Control (RRC) protocol specification (Release 16)," 3GPP TS 38.331 V16.1.0 (Jul. 2020).
Ku, "Resource Allocation and Link Adaptation in LTE and LTE Advanced: A Tutorial," IEEE Communications Surveys & Tutorials, vol. 17, Issue 3 (Dec. 2014).

* cited by examiner

Corresponding to
First priority
First-type HARQ-ACK
Corresponding to
Second priority
Second-type HARQ-ACK First node
1400
First receiver 1401
First transmitter 1402

Second node
1500
Second transmitter 1501
Second receiver 1502

METHOD AND DEVICE IN NODES USED FOR WIRELESS COMMUNICATION

CROSS REFERENCE TO RELATED APPLICATIONS

This application is the continuation of the international patent application No. PCT/CN2021/118440, filed on Sep. 15, 2021, which claims the priority benefit of Chinese Patent Application 202011008088.3, filed on Sep. 23, 2020; and claims the priority benefit of Chinese Patent Application 202011022298.8, filed on Sep. 25, 2020; and claims the priority benefit of Chinese Patent Application 202011033350.X, filed on Sep. 27, 2020; and claims the priority benefit of Chinese Patent Application 202011103568.8, filed on Oct. 15, 2020, the full disclosure of which is incorporated herein by reference.

BACKGROUND

Technical Field

The present application relates to transmission methods and devices in wireless communication systems, and in particular to a method and device of radio signal transmission in a wireless communication system supporting cellular networks.

Related Art

In a 5G system, Enhance Mobile Broadband (eMBB) and Ultra Reliable and Low Latency Communication (URLLC) are two typical service types. Targeting lower target block error rate (BLER) requirements for URLLC services, a new Modulation and Coding Scheme (MCS) table has been defined in 3rd Generation Partner Project (3GPP) New Radio (NR) Release 15. For the purpose of supporting more demanding Ultra Reliable and Low Latency Communication (URLLC) services in 5G system, for example, with higher reliability (e.g., a target BLER is 10^-6) or with lower delay (e.g., 0.5-1 ms), in the 3GPP NR. Release 16, a downlink control information (DCI) signaling can indicate whether the scheduled services are of Low Priority or High Priority, wherein the High Priority corresponds to URLLC services, and the Low Priority corresponds to eMBB services. When a low-priority transmission overlaps with a high-priority transmission in time domain, the high-priority one is executed, and the low priority one is dropped.

A Work Item (WI) of URLLC enhancement in NR Release 17 was approved at 3GPP RAN Plenary, where the multiplexing of different intra-UE services is a focus to be researched.

SUMMARY

A. After introducing the multiplexing of different intra-UE priority services, a UE can multiplex a high-priority Uplink Control Information (UCI) or a low-priority UCI onto a given-priority Physical Uplink Shared CHannel (PUSCH) for transmission; different offset value factors (e.g., beta-offset) are respectively used to execute the multiplexing of Hybrid Automatic Repeat reQuest Acknowledgement (HARQ-ACK) with different priorities. In the above scenario, when a number of HARQ-ACK information bit(s) to be reported is few, how to determine time-frequency resources reserved for the HARQ-ACK information bit(s) to be reported is a key problem to be solved.

To address the above problem, the present application provides a solution. It should be noted that though the present application only took the Uplink for example in the statement above, it is also applicable to other transmission scenarios of Downlink and Sidelink, where similar technical effects can be achieved. Additionally, the adoption of a unified solution for various scenarios (including but not limited to Uplink, Downlink and Sidelink) contributes to the reduction of hardcore complexity and costs. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first signaling; and transmitting a first signal in a first time-frequency resource pool, and the first signal carrying a first bit block;

herein, the first signaling is used to determine the first time-frequency resource pool; the first bit block comprises K HARQ-ACK information bit(s), K being a positive integer; the first bit block comprises at least one of a first-type HARQ-ACK or a second-type HARQ-ACK; a first condition is a condition related to type(s) of HARQ-ACK(s) comprised in the first bit block; when the first condition is not satisfied, a same offset value is used to determine both a number of time-frequency resource element(s) comprised in a first time-frequency resource sub-pool and a number of time-frequency resource element(s) comprised in a first reserved resource pool; when the first condition is satisfied, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting HARQ-ACK information bit(s), and the first time-frequency resource sub-pool comprises time-frequency resources occupied by modulation symbol(s) generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one embodiment, a problem to be solved in the present application comprises: after introducing the multiplexing of different intra-UE priority services, how to determine time-frequency resources reserved for a potential HARQ-ACK transmission on a PUSCH.

In one embodiment, a problem to be solved in the present application comprises: after introducing configurations of multiple offset values (such as, beta-offset value) used to determine transmission resources occupied by a HARQ-ACK, how to determine an offset value used to calculate reserve resources.

In one embodiment, characteristics of the above method comprise: different multiplexing scenarios correspond to different offset values (for example, different beta-offset values); an offset value determined according to a type of a transmitted HARQ-ACK is used to determine the number of the time-frequency resource element(s) comprised in the first time-frequency resource sub-pool.

In one embodiment, characteristics of the above method comprise: an offset value used to determine the number of the time-frequency resource element(s) comprised in the first reserved resource pool is unrelated to a type of a transmitted HARQ-ACK.

In one embodiment, characteristics of the above method comprise: there exists a multiplexing scenario, two different offset values in the multiplexing scenario are respectively used to determine a number of time-frequency resource element(s) comprised in a first time-frequency resource sub-pool and a number of time-frequency resource element (s) comprised in a first reserved resource pool.

In one embodiment, advantages of the above method comprise: avoiding the misunderstanding between communication parties incurred by DCI loss and other reasons.

In one embodiment, advantages of the above method comprise: avoiding the inconsistent understanding of time-frequency resources carrying a coded bit for HARQ-ACK incurred by the inconsistent understanding of reserved resources between the communication parties.

In one embodiment, advantages of the above method comprise: improving the spectral efficiency of the system.

In one embodiment, advantages of the above method comprise: enhancing the flexibility of multiplexing.

According to one aspect of the present application, the above method is characterized in comprising:

the first signal carrying a second bit block, the second bit block comprising a Transport Block (TB).

According to one aspect of the present application, the above method is characterized in that the first condition comprises: the first bit block comprising the second-type HARQ-ACK.

According to one aspect of the present application, the above method is characterized in that when the first condition is satisfied: the two different offset values are respectively a first offset value and a second offset value; the first offset value is used to determine the number of the time-frequency resource element(s) comprised in the first time-frequency resource sub-pool, and the second offset value is used to determine the number of the time-frequency resource element(s) comprised in the first reserved resource pool.

According to one aspect of the present application, the above method is characterized in that the first condition is satisfied; a second condition set comprises N mutually-exclusive conditions, N being a positive integer greater than 1; a first offset value set comprises not less than the N mutually-different offset values, and a second offset value set comprises at least one offset value; for any positive integer j not greater than N, when the j-th condition in the second condition set is satisfied: the j-th offset value in the first offset value set is used to determine the number of the time-frequency resource element(s) comprised in the first time-frequency resource sub-pool, an offset value in the second offset value set different from the j-th offset value in the first offset value set is used to determine the number of the time-frequency resource element(s) comprised in the first reserved resource pool.

According to one aspect of the present application, the above method is characterized in that a first radio resource pool is reserved for at least one bit sub-block comprised in the first bit block; the first radio resource pool overlaps with the first time-frequency resource pool in time domain.

According to one aspect of the present application, the above method is characterized in that the first-type HARQ-ACK corresponds to a first priority, and the second-type HARQ-ACK corresponds to a second priority.

The present application provides a method in a second node for wireless communications, comprising:

transmitting a first signaling; and receiving a first signal in a first time-frequency resource pool, and the first signal carrying a first bit block;

herein, the first signaling is used to determine the first time-frequency resource pool; the first bit block comprises K HARQ-ACK information bit(s), K being a positive integer; the first bit block comprises at least one of a first-type HARQ-ACK or a second-type HARQ-ACK; a first condition is a condition related to type(s) of HARQ-ACK(s) comprised in the first bit block; when the first condition is not satisfied, a same offset value is used to determine both a number of time-frequency resource element(s) comprised in a first time-frequency resource sub-pool and a number of time-frequency resource element(s) comprised in a first reserved resource pool; when the first condition is satisfied, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

According to one aspect of the present application, the above method is characterized in comprising:

the first signal carrying a second bit block, the second bit block comprising a Transport Block (TB).

According to one aspect of the present application, the above method is characterized in that the first condition comprises: the first bit block comprising the second-type HARQ-ACK.

According to one aspect of the present application, the above method is characterized in that when the first condition is satisfied: the two different offset values are respectively a first offset value and a second offset value; the first offset value is used to determine the number of the time-frequency resource element(s) comprised in the first time-frequency resource sub-pool, and the second offset value is used to determine the number of the time-frequency resource element(s) comprised in the first reserved resource pool.

According to one aspect of the present application, the above method is characterized in that the first condition is satisfied; a second condition set comprises N mutually-exclusive conditions, N being a positive integer greater than 1; a first offset value set comprises not less than the N mutually-different offset values, and a second offset value set comprises at least one offset value; for any positive integer j not greater than N, when the j-th condition in the second condition set is satisfied: the j-th offset value in the first offset value set is used to determine the number of the time-frequency resource element(s) comprised in the first time-frequency resource sub-pool, an offset value in the second offset value set different from the j-th offset value in the first offset value set is used to determine the number of the time-frequency resource element(s) comprised in the first reserved resource pool.

According to one aspect of the present application, the above method is characterized in that a first radio resource pool is reserved for at least one bit sub-block comprised in the first bit block; the first radio resource pool overlaps with the first time-frequency resource pool in time domain.

According to one aspect of the present application, the above method is characterized in that the first-type HARQ-ACK corresponds to a first priority, and the second-type HARQ-ACK corresponds to a second priority.

The present application provides a first node for wireless communications, comprising:

a first receiver, receiving a first signaling; and a first transmitter, transmitting a first signal in a first time-frequency resource pool, the first signal carrying a first bit block;

herein, the first signaling is used to determine the first time-frequency resource pool; the first bit block comprises K HARQ-ACK information bit(s), K being a positive integer; the first bit block comprises at least one of a first-type HARQ-ACK or a second-type HARQ-ACK; a first condition is a condition related to type(s) of HARQ-ACK(s) comprised in the first bit block; when the first condition is not satisfied, a same offset value is used to determine both a number of time-frequency resource element(s) comprised in a first time-frequency resource sub-pool and a number of time-frequency resource element(s) comprised in a first reserved resource pool; when the first condition is satisfied, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

The present application provides a second node for wireless communications, comprising:

a second transmitter, transmitting a first signaling; and a second receiver, receiving a first signal in a first time-frequency resource pool, the first signal carrying a first bit block;

herein, the first signaling is used to determine the first time-frequency resource pool; the first bit block comprises K HARQ-ACK information bit(s), K being a positive integer; the first bit block comprises at least one of a first-type HARQ-ACK or a second-type HARQ-ACK; a first condition is a condition related to type(s) of HARQ-ACK(s) comprised in the first bit block; when the first condition is not satisfied, a same offset value is used to determine both a number of time-frequency resource element(s) comprised in a first time-frequency resource sub-pool and a number of time-frequency resource element(s) comprised in a first reserved resource pool; when the first condition is satisfied, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one embodiment, the method in the present application is advantageous in the following aspects:

avoiding the inconsistent understanding of resource allocation between the communication parties;

using different offset values in different scenarios to complete the resource allocation between data and control information, and taking into account the flexibility of scheduling and the reliability of communications;

improving the spectral efficiency of the system;

enhancing the flexibility of multiplexing.

B. After introducing the multiplexing of different intra-UE priority services, a UE can multiplex a high-priority Uplink Control Information (UCI) or a low-priority UCI onto a given-priority Physical Uplink Shared CHannel (PUSCH) for transmission; different offset factors (e.g., beta-offset value) are respectively used to execute the multiplexing of Hybrid Automatic Repeat reQuest Acknowledgement (HARQ-ACK) with different priorities. In the above scenario, how to determine time-frequency resources reserved for HARQ-ACK information bits and the mapping method when HARQ-ACK is multiplexed is a key problem to be solved.

To address the above problem, the present application provides a solution. It should be noted that though the present application only took the Uplink for example in the statement above, it is also applicable to other transmission scenarios of Downlink and Sidelink, where similar technical effects can be achieved. Additionally, the adoption of a unified solution for various scenarios (including but not limited to Uplink, Downlink and Sidelink) contributes to the reduction of hardcore complexity and costs. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first signaling; and transmitting a first signal in a first time-frequency resource pool, the first signal carrying a first bit block and a second bit block;

herein, the first signaling is used to determine the first time-frequency resource pool; the second bit block comprises a TB, and the first bit block comprises at least one of a first-type HARQ-ACK or a second-type HARQ-ACK; a number of HARQ-ACK bit(s) comprised in the first bit block and type(s) of HARQ-ACK comprised in the first bit block are used together to determine a number of time-frequency resource element(s) comprised in a first reserved resource pool, and the number of the time-frequency resource element(s) comprised in the first reserved resource pool is a non-negative integer; a target coded bit sequence output through a first procedure is related to the number of the time-frequency resource element(s) comprised in the first reserved resource pool, both the first bit block and the second bit block are used to determine the target coded bit sequence, and modulation symbols generated by the target coded bit sequence are transmitted in the first time-frequency resource pool.

In one embodiment, a problem to be solved in the present application comprises: after introducing the multiplexing of different intra-UE priority services, how to determine time-frequency resources reserved for a potential HARQ-ACK transmission on a PUSCH.

In one embodiment, a problem to be solved in the present application comprises: how to determine a coded bit sequence of the multiplexed data and control information based on the number of HARQ-ACK bit(s) to be reported and a type of HARQ-ACK.

In one embodiment, a problem to be solved in the present application comprises: how to determine the mapping method of the multiplexed data and control information based on the number of HARQ-ACK bit(s) to be reported and a type of HARQ-ACK.

In one embodiment, characteristics of the above method comprise: the number of HARQ-ACK bits comprised in the first bit block and a type of HARQ-ACK comprised in the first bit block are used together to determine whether a HARQ-ACK is multiplexed in a rate matching manner or in a puncturing manner.

In one embodiment, advantages of the above method comprise: avoiding the misunderstanding between communication parties incurred by DCI loss and other reasons.

In one embodiment, advantages of the above method comprise: avoiding the inconsistent understanding of the coded bit sequence of the multiplexed data and control information incurred by the inconsistent understanding of reserved resources between the communication parties.

In one embodiment, advantages of the above method comprise: reducing the decoding error probability.

In one embodiment, advantages of the above method comprise: enhancing the flexibility of multiplexing.

According to one aspect of the present application, the above method is characterized in that the first bit block generates a first coded bit sequence, and the second bit block generates a second coded bit sequence; the first coded bit sequence and the second coded bit sequence are used as input to execute the first procedure to obtain the target coded bit sequence; the first procedure comprises at least two of a first sub-procedure, a second sub-procedure or a third sub-procedure; when the number of the time-frequency resource element(s) comprised in the first reserved resource pool is equal to 0, the first procedure comprises a first sub-procedure and a second sub-procedure, the first coded bit sequence is used as an input to execute the first sub-procedure in the first procedure, the second coded bit sequence is used as an input to execute the second sub-procedure in the first procedure, and the first sub-procedure in the first procedure is executed before the second sub-procedure in the first procedure; when the number of the time-frequency resource element(s) comprised in the first reserved resource pool is greater than 0, the first procedure comprises a second sub-procedure and a third sub-procedure, the second coded bit sequence is used as an input to execute the second sub-procedure in the first procedure, the first coded bit sequence used as an input is used to execute the third sub-procedure in the first procedure, and the third sub-procedure in the first procedure is executed after the second sub-procedure in the first procedure.

According to one aspect of the present application, the above method is characterized in that a first number threshold is related to a type of HARQ-ACK comprised in the first bit block; a first condition is a condition related to type(s) of HARQ-ACK(s) comprised in the first bit block; when the first condition is satisfied, the first number threshold is equal to a first number; when the first condition is not satisfied, the first number threshold is equal to a number different from the first number; a magnitude relation between a number of HARQ-ACK bit(s) comprised in the first bit block and the first number threshold is used to determine the number of the time-frequency resource element(s) comprised in the first reserved resource pool.

In one embodiment, characteristics of the above method comprise: different number thresholds are used for different HARQ-ACK multiplexing scenarios.

In one embodiment, advantages of the above method comprise: types of different HARQ-ACKs correspond to different number thresholds, which is conducive to optimizing the resource allocation method on demand (such as delay demand, reliability demand) in different multiplexing scenarios (comprising the multiplexing between HARQ-ACKs with different priorities and data with different priorities).

According to one aspect of the present application, the above method is characterized in that a first condition set comprises multiple mutually-exclusive conditions; there exist two conditions in the first condition set: a first number threshold determined when one of the two conditions in the first condition set is satisfied is not equal to a first number threshold determined when the other of the two conditions in the first condition set is satisfied; all conditions in the first condition set are conditions related to a type of HARQ-ACK comprised in the first bit block.

According to one aspect of the present application, the above method is characterized in that when a number of HARQ-ACK bit(s) comprised in the first bit block is not greater than a first number threshold, the number of the time-frequency resource element(s) comprised in the first reserved resource pool is greater than 0; when a number of HARQ-ACK bit(s) comprised in the first bit block is greater than a first number threshold, the number of the time-frequency resource element(s) comprised in the first reserved resource pool is equal to 0.

According to one aspect of the present application, the above method is characterized in that when the number of the time-frequency resource element(s) comprised in the first reserved resource pool is greater than 0, a modulation symbol generated by the first bit block is transmitted in the first reserved resource pool, and code rate of the second bit block is unrelated to a number of bit(s) comprised in the first bit block; when the number of the time-frequency resource element(s) comprised in the first reserved resource pool is equal to 0, a number of bit(s) comprised in the first bit block is used to determine code rate of the second bit block.

According to one aspect of the present application, the above method is characterized in that a first radio resource pool is reserved for at least one bit sub-block comprised in the first bit block; the first radio resource pool overlaps with the first time-frequency resource pool in time domain.

The present application provides a method in a second node for wireless communications, comprising:

transmitting a first signaling; and receiving a first signal in a first time-frequency resource pool, the first signal carrying a first bit block and a second bit block;

herein, the first signaling is used to determine the first time-frequency resource pool; the second bit block comprises a TB, and the first bit block comprises at least one of a first-type HARQ-ACK or a second-type HARQ-ACK; a number of HARQ-ACK bit(s) comprised in the first bit block and type(s) of HARQ-ACK comprised in the first bit block are used together to determine a number of time-frequency resource element(s) comprised in a first reserved resource pool, and the number of the time-frequency resource element(s) comprised in the first reserved resource pool is a non-negative integer; a target coded bit sequence output through a first procedure is related to the number of the time-frequency resource element(s) comprised in the first reserved resource pool, both the first bit block and the second bit block are used to determine the target coded bit sequence, and modulation symbols generated by the target coded bit sequence are transmitted in the first time-frequency resource pool.

According to one aspect of the present application, the above method is characterized in that the first bit block generates a first coded bit sequence, and the second bit block generates a second coded bit sequence; the first coded bit sequence and the second coded bit sequence are used as input to execute the first procedure to obtain the target coded bit sequence; the first procedure comprises at least two of a first sub-procedure, a second sub-procedure or a third sub-procedure; when the number of the time-frequency resource element(s) comprised in the first reserved resource pool is equal to 0, the first procedure comprises a first sub-procedure and a second sub-procedure, the first coded bit sequence is used as an input to execute the first sub-procedure in the first procedure, the second coded bit sequence is used as an input to execute the second sub-procedure in the first procedure, and the first sub-procedure in the first procedure is executed before the second sub-procedure in the first procedure; when the number of the time-frequency resource element(s) comprised in the first reserved resource pool is greater than 0, the first procedure comprises a second sub-procedure and a third sub-procedure, the second coded bit sequence is used as an input to execute the second sub-procedure in the first procedure, the first coded bit sequence used as an input is used to execute the third sub-procedure in the first procedure, and the third sub-procedure in the first procedure is executed after the second sub-procedure in the first procedure.

According to one aspect of the present application, the above method is characterized in that a first number threshold is related to a type of HARQ-ACK comprised in the first bit block; a first condition is a condition related to type(s) of HARQ-ACK(s) comprised in the first bit block; when the first condition is satisfied, the first number threshold is equal to a first number; when the first condition is not satisfied, the first number threshold is equal to a number different from the first number; a magnitude relation between a number of HARQ-ACK bit(s) comprised in the first bit block and the first number threshold is used to determine the number of the time-frequency resource element(s) comprised in the first reserved resource pool.

According to one aspect of the present application, the above method is characterized in that a first condition set comprises multiple mutually-exclusive conditions; there exist two conditions in the first condition set: a first number threshold determined when one of the two conditions in the first condition set is satisfied is not equal to a first number threshold determined when the other of the two conditions in the first condition set is satisfied; all conditions in the first condition set are conditions related to a type of HARQ-ACK comprised in the first bit block.

According to one aspect of the present application, the above method is characterized in that when a number of HARQ-ACK bit(s) comprised in the first bit block is not greater than a first number threshold, the number of the time-frequency resource element(s) comprised in the first reserved resource pool is greater than 0; when a number of HARQ-ACK bit(s) comprised in the first bit block is greater than a first number threshold, the number of the time-frequency resource element(s) comprised in the first reserved resource pool is equal to 0.

According to one aspect of the present application, the above method is characterized in that when the number of the time-frequency resource element(s) comprised in the first reserved resource pool is greater than 0, a modulation symbol generated by the first bit block is transmitted in the first reserved resource pool, and code rate of the second bit block is unrelated to a number of bit(s) comprised in the first bit block; when the number of the time-frequency resource element(s) comprised in the first reserved resource pool is equal to 0, a number of bit(s) comprised in the first bit block is used to determine code rate of the second bit block.

According to one aspect of the present application, the above method is characterized in that a first radio resource pool is reserved for at least one bit sub-block comprised in the first bit block; the first radio resource pool overlaps with the first time-frequency resource pool in time domain.

The present application provides a first node for wireless communications, comprising:

a first receiver, receiving a first signaling; and a first transmitter, transmitting a first signal in a first time-frequency resource pool, the first signal carrying a first bit block and a second bit block;

herein, the first signaling is used to determine the first time-frequency resource pool; the second bit block comprises a TB, and the first bit block comprises at least one of a first-type HARQ-ACK or a second-type HARQ-ACK; a number of HARQ-ACK bit(s) comprised in the first bit block and type(s) of HARQ-ACK comprised in the first bit block are used together to determine a number of time-frequency resource element(s) comprised in a first reserved resource pool, and the number of the time-frequency resource element(s) comprised in the first reserved resource pool is a non-negative integer; a target coded bit sequence output through a first procedure is related to the number of the time-frequency resource element(s) comprised in the first reserved resource pool, both the first bit block and the second bit block are used to determine the target coded bit sequence, and modulation symbols generated by the target coded bit sequence are transmitted in the first time-frequency resource pool.

The present application provides a second node for wireless communications, comprising:

a second transmitter, transmitting a first signaling; and a second receiver, receiving a first signal in a first time-frequency resource pool, the first signal carrying a first bit block and a second bit block;

herein, the first signaling is used to determine the first time-frequency resource pool; the second bit block comprises a TB, and the first bit block comprises at least one of a first-type HARQ-ACK or a second-type HARQ-ACK; a number of HARQ-ACK bit(s) comprised in the first bit block and type(s) of HARQ-ACK comprised in the first bit block are used together to determine a number of time-frequency resource element(s) comprised in a first reserved resource pool, and the number of the time-frequency resource element(s) comprised in the first reserved resource pool is a non-negative integer; a target coded bit sequence output through a first procedure is related to the number of the time-frequency resource element(s) comprised in the first reserved resource pool, both the first bit block and the second bit block are used to determine the target coded bit sequence, and modulation symbols generated by the target coded bit sequence are transmitted in the first time-frequency resource pool.

In one embodiment, the method in the present application is advantageous in the following aspects:

avoiding receiving errors incurred by the inconsistent understanding of resource allocation between communication parties;

reducing the decoding error probability;

determining the use mode of reserved resources based on a type of a HARQ-ACK, and taking into account the flexibility of scheduling and the reliability of communications;

enhancing the flexibility of multiplexing.

BRIEF DESCRIPTION OF THE DRAWINGS

Other features, objects and advantages of the present application will become more apparent from the detailed description of non-restrictive embodiments taken in conjunction with the following drawings:

FIG. 10A illustrates a schematic diagram of a relation between a first-type HARQ-ACK and a first priority as well as a relation between a second-type HARQ-ACK and a second priority according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1:
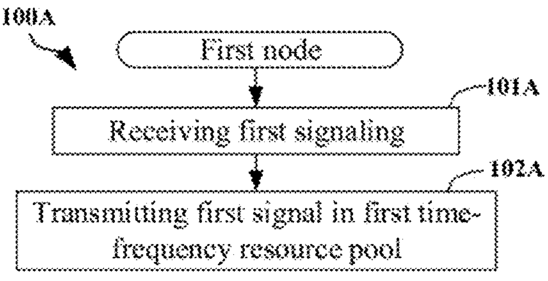
FIG. 1 illustrates a flowchart of the processing of a first node according to one embodiment of the present application.

Embodiment 1A illustrates a flowchart of the processing of a first node according to one embodiment of the present application, as shown in FIG. 1.

In Embodiment 1A, the first node in the present application receives a first signaling in step 101A; and transmits a first signal in a first time-frequency resource pool in step 102A.

In embodiment 1A, the first signal carries a first bit block; the first signaling is used to determine the first time-frequency resource pool; the first bit block comprises K HARQ-ACK information bit(s), K being a positive integer; the first bit block comprises at least one of a first-type HARQ-ACK or a second-type HARQ-ACK; a first condition is a condition related to type(s) of HARQ-ACK(s) comprised in the first bit block; when the first condition is not satisfied, a same offset value is used to determine both a number of time-frequency resource element(s) comprised in a first time-frequency resource sub-pool and a number of time-frequency resource element(s) comprised in a first reserved resource pool; when the first condition is satisfied, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one embodiment, the first signal comprises a radio signal.

In one embodiment, the first signal comprises a radio-frequency signal.

In one embodiment, the first signal comprises a baseband signal.

In one embodiment, the first signaling is dynamically configured.

In one embodiment, the first signaling comprises a layer 1 (L1) signaling.

In one embodiment, the first signaling comprises an L1 control signaling.

In one embodiment, the first signaling comprises a physical-layer signaling.

In one embodiment, the first signaling comprises one or multiple fields in a physical-layer signaling.

In one embodiment, the first signaling comprises a higher-layer signaling.

In one embodiment, the first signaling comprises one or multiple fields in a higher-layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises one or multiple fields in an RRC signaling.

In one embodiment, the first signaling comprises one or multiple fields in a MAC CE signaling.

In one embodiment, the first signaling comprises Downlink Control Information (DCI).

In one embodiment, the first signaling comprises one or multiple fields in a DCI.

In one embodiment, the first signaling comprises Sidelink Control Information (SCI).

In one embodiment, the first signaling comprises one of multiple fields in an SCI.

In one embodiment, the first signaling comprises one or multiple fields in an Information Element (IE).

In one embodiment, the first signaling is an UpLink Grant Signalling.

In one embodiment, the first signaling is transmitted on a downlink physical layer control channel (i.e., a downlink channel only capable of carrying a physical-layer signaling).

In one embodiment, the downlink physical-layer control channel in the present application is a Physical Downlink Control CHannel (PDCCH).

In one embodiment, the downlink physical layer control channel in the present application is a short PDCCH (sPDCCH).

In one embodiment, the downlink physical layer control channel in the present application is a Narrow Band PDCCH (NB-PDCCH).

In one embodiment, the first signaling is DCI format 0_0, and for the specific meaning of the DCI format 0_0, refer to section 7.3.1.1 in 3GPP TS38.212.

In one embodiment, the first signaling is DCI format 0_1, and for the specific meaning of the DCI format 0_1, refer to section 7.3.1.1 in 3GPP TS38.212.

In one embodiment, the first signaling is DCI format 0_2, and for the specific meaning of the DCI format 0_2, refer to section 7.3.1.1 in 3GPP TS38.212.

In one embodiment, the phrase that the first signal carries a first bit block comprises: the first signal comprises an output after all or partial bits in the first bit block sequentially through part or all of an CRC Insertion, Segmentation, Code Block-level CRC Insertion, Channel Coding, Rate Matching, Concatenation, Scrambling, Modulation, Layer Mapping, Precoding, Mapping to Resource Element, Multicarrier symbol Generation and Modulation and Upconversion.

In one embodiment, a modulation symbol generated by the first bit block comprises; an output after all or partial bits in the first bit block sequentially through part or all of CRC insertion, segmentation, code block-level CRC insertion, channel coding, rate matching, concatenation, scrambling, and modulation.

In one embodiment, the first time-frequency resource pool comprises a positive integer number of time-frequency resource element(s).

In one embodiment, the first time-frequency resource pool comprises a positive integer number of Resource Element(s) (RE(s) in time-frequency domain.

In one embodiment, the RE occupies a multicarrier symbol in time domain, and a subcarrier in frequency domain.

In one embodiment, the time-frequency resource element in the present application is an RE.

In one embodiment, the time-frequency resource element in the present application comprises a subcarrier in frequency domain.

In one embodiment, the time-frequency resource element in the present application comprises a multicarrier symbol in time domain.

In one embodiment, the multicarrier symbol in the present application is an Orthogonal Frequency Division Multiplexing (OFDM) symbol.

In one embodiment, the multicarrier symbol in the present application is a Single Carrier-Frequency Division Multiple Access (SC-FDMA) symbol.

In one embodiment, the multicarrier symbol in the present application is a Discrete Fourier Transform Spread OFDM (DFT-S-OFDM) symbol.

In one embodiment, the first time-frequency resource pool comprises a positive integer number of subcarrier(s) in frequency domain.

In one embodiment, the first time-frequency resource pool comprises a positive integer number of Physical resource block(s) (PRB(s)) in frequency domain.

In one embodiment, the first time-frequency resource pool comprises a positive integer number of Resource Block(s) (RB(s) in frequency domain.

In one embodiment, the first time-frequency resource pool comprises a positive integer number of multi-carrier symbol(s) in time domain.

In one embodiment, the first time-frequency resource pool comprises a positive integer number of slot(s) in time domain.

In one embodiment, the first time-frequency resource pool comprises a positive integer number of sub-slot(s) in time domain.

In one embodiment, the first time-frequency resource pool comprises a positive integer number of ms(s) in time domain.

In one embodiment, the first time-frequency resource pool comprises a positive integer number of continuous multi-carrier symbol(s) in time domain.

In one embodiment, the first time-frequency resource pool comprises a positive integer number of discontinuous slot(s) in time domain.

In one embodiment, the first time-frequency resource pool comprises a positive integer number of continuous slot(s) in time domain.

In one embodiment, the first time-frequency resource pool comprises a positive integer number of sub-frame(s) in time domain.

In one embodiment, the first time-frequency resource pool is configured by a physical-layer signaling.

In one embodiment, the first time-frequency resource pool is configured by a higher-layer signaling.

In one embodiment, the first time-frequency resource pool is configured by a Radio Resource Control (RRC) signaling.

In one embodiment, the first time-frequency resource pool is configured by a Medium Access Control layer Control Element (MAC CE) signaling.

In one embodiment, the first time-frequency resource pool is reserved for an uplink physical-layer channel.

In one embodiment, the first time-frequency resource pool comprises time-frequency resources reserved for an uplink physical layer channel.

In one embodiment, the first time-frequency resource pool comprises time-frequency resources occupied by an uplink physical layer channel.

In one embodiment, the first time-frequency resource pool is reserved for a Physical Uplink Shared CHannel (PUSCH).

In one embodiment, the first time-frequency resource pool comprises time-frequency resources reserved for a PUSCH.

In one embodiment, the first time-frequency resource pool comprises time-frequency resources occupied by a PUSCH.

In one embodiment, the first time-frequency resource pool is reserved for a Physical Sidelink Shared CHannel (PSSCH).

In one embodiment, the first signaling indicates the first time-frequency resource pool.

In one embodiment, the first signaling explicitly indicates the first time-frequency resource pool.

In one embodiment, the first signaling implicitly indicates the first time-frequency resource pool.

In one embodiment, the first signaling indicates frequency-domain resources comprised in the first time-frequency resource pool.

In one embodiment, the first signaling indicates time-domain resources comprised in the first time-frequency resource pool.

In one embodiment, the first signaling is used to configure a period characteristic associated with the first time-frequency resource pool.

In one embodiment, the implicitly indicating in the present application comprises implicitly indicating via a signaling format.

In one embodiment, the implicitly indicating in the present application comprises implicitly indicating via an RNTI.

In one embodiment, the first signaling comprises first scheduling information; the first scheduling information comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a periodicity, a transmission antenna port, or a corresponding Transmission Configuration Indicator (TCI) state.

In one embodiment, the phrase of being used for in the present application comprises; being used by the first node for.

In one embodiment, the phrase of being used for in the present application comprises: being used by a transmitting end of the first signal for.

In one embodiment, the phrase of being used for in the present application comprises: being used by a receiving end of the first signal for.

In one embodiment, a HARQ-ACK comprised in the first bit block comprises: indication information of whether a signaling is correctly received, or indication information of whether a bit block scheduled by a signaling is correctly received.

In one embodiment, a HARQ-ACK comprised in the first bit block comprises: indication information used to indicate whether a signaling of Semi-Persistent Scheduling (SPS) release is correctly received, or indication information of whether a bit block transmitted on a Physical Downlink Shared CHannel (PDSCH) scheduled by a signaling is correctly received.

In one embodiment, the first bit block comprises a HARQ-ACK.

In one embodiment, the first bit block comprises a positive integer number of bit(s).

In one embodiment, the first bit block comprises a positive integer number of ACK(s) or NACK(s).

In one embodiment, the first bit block comprises a HARQ-ACK codebook.

In one embodiment, the first-type HARQ-ACK is different from the second-type HARQ-ACK.

In one embodiment, both the first-type HARQ-ACK and the second HARQ-ACK comprises HARQ-ACK information bit(s).

In one embodiment, the first-type HARQ-ACK comprises a HARQ-ACK corresponding to a Quality of Service (QoS) in multiple QoS types.

In one embodiment, the first-type HARQ-ACK comprises a HARQ-ACK corresponding to URLLC service type.

In one embodiment, the first-type HARQ-ACK comprises a HARQ-ACK corresponding to eMBB service type.

In one embodiment, the first-type HARQ-ACK comprises a high-priority HARQ-ACK.

In one embodiment, the first-type HARQ-ACK comprises a low-priority HARQ-ACK.

In one embodiment, the first-type HARQ-ACK comprises a HARQ-ACK corresponding to priority index 1.

In one embodiment, the first-type HARQ-ACK comprises a HARQ-ACK corresponding to priority index 0.

In one embodiment, the first-type HARQ-ACK comprises sidelink HARQ-ACK (SL HARQ-ACK).

In one embodiment, the second-type HARQ-ACK comprises a HARQ-ACK corresponding to a QoS in multiple QoS types.

In one embodiment, the second-type HARQ-ACK comprises a HARQ-ACK corresponding to URLLC service type.

In one embodiment, the second-type HARQ-ACK comprises a HARQ-ACK corresponding to eMBB service type.

In one embodiment, the second-type HARQ-ACK comprises a high-priority HARQ-ACK.

In one embodiment, the second-type HARQ-ACK comprises a low-priority HARQ-ACK.

In one embodiment, the second-type HARQ-ACK comprises a HARQ-ACK corresponding to priority index 1.

In one embodiment, the second-type HARQ-ACK comprises a HARQ-ACK corresponding to priority index 0.

In one embodiment, the second-type HARQ-ACK comprises a sidelink HARQ-ACK.

In one embodiment, the second-type HARQ-ACK and the first-type HARQ-ACK are respectively HARQ-ACKs for different links.

In one embodiment, the different links comprise an uplink and a sidelink.

In one embodiment, the second-type HARQ-ACK and the first-type HARQ-ACK are respectively HARQ-ACKs used for different service types.

In one embodiment, the second-type HARQ-ACK and the first-type HARQ-ACK are respectively HARQ-ACKs of different types.

In one embodiment, the second-type HARQ-ACK and the first-type HARQ-ACK are respectively HARQ-ACKs with different priorities.

In one embodiment, the second-type HARQ-ACK and the first-type HARQ-ACK are respectively HARQ-ACKs corresponding to different priority indexes.

In one embodiment, the second-type HARQ-ACK comprises a HARQ-ACK corresponding to priority index 1, and the first-type HARQ-ACK comprises a HARQ-ACK corresponding to priority index 0.

In one embodiment, the second-type HARQ-ACK comprises a HARQ-ACK corresponding to priority index 0, and the first-type HARQ-ACK comprises a HARQ-ACK corresponding to priority index 1.

In one embodiment, the first bit block comprises UCL

In one embodiment, the first signal carries at least a first one of a HARQ-ACK, a CSI or a Scheduling Request (SR).

In one embodiment, K is equal to 1.

In one embodiment, K is equal to 2.

In one embodiment, K is equal to 3.

In one embodiment, K is equal to 4.

In one embodiment, K is not greater than 16.

In one embodiment, K is not greater than a first threshold, and the first threshold is a default positive integer.

In one embodiment, the first bit block comprises only one of the first-type HARQ-ACK or the second-type HARQ-ACK.

In one embodiment, the first bit block comprises one or two of the first-type HARQ-ACK or the second-type HARQ-ACK.

In one embodiment, the offset value in the present application is $$\beta_{offset}^{HARQ-ACK}.$$

In one embodiment, the offset value in the present application is beta-offset.

In one embodiment, the offset value in the present application is a beta-offset value.

In one embodiment, a name of the offset value in the present application comprises β.

In one embodiment, a name of the offset value in the present application comprises at least one of HARQ or ACK.

In one embodiment, a name of the offset value in the present application comprises offset.

In one embodiment, a symbol used to represent the offset value in the present application comprises β.

In one embodiment, a symbol used to represent the offset value in the present application comprises at least one of HARQ or ACK.

In one embodiment, a symbol used to represent the offset value in the present application comprises offset.

In one embodiment, the offset value in the present application is used to determine a parameter of a number of time-frequency resource element(s) comprised in a time-frequency resource pool.

In one embodiment, the offset value in the two different offset values is less than the other offset value in the two different offset values.

In one embodiment, the first reserved resource pool is reserved for a potential HARQ-ACK transmission.

In one embodiment, the first reserved resource pool comprises time-frequency resources reserved for a potential HARQ-ACK transmission.

In one embodiment, the first time-frequency resource sub-pool comprises time-frequency resources occupied by the modulation symbol generated by the first bit block being mapped into the first reserved resource pool.

In one embodiment, the number of the time-frequency resource element(s) comprised in the first time-frequency resource sub-pool is greater than 0.

In one embodiment, the number of the time-frequency resource element(s) comprised in the first reserved resource pool is greater than 0.

In one embodiment, the first time-frequency resource pool comprises the first reserved resource pool.

In one embodiment, time-frequency resources comprised in the first reserved resource pool are a subset of time-frequency resources comprised in the first time-frequency resource pool.

In one embodiment, the first time-frequency resource pool comprises the first time-frequency resource sub-pool.

In one embodiment, the first reserved resource pool comprises the first time-frequency resource sub-pool.

In one embodiment, time-frequency resources comprised in the first time-frequency resource sub-pool are a subset of time-frequency resources comprised in the first time-frequency resource pool.

In one embodiment, time-frequency resources comprised in the first time-frequency resource sub-pool are a subset of time-frequency resources comprised in the first reserved resource pool.

In one embodiment, the number of the time-frequency resource element(s) comprised in the first time-frequency resource sub-pool is a number of RE(s) comprised in the first time-frequency resource sub-pool.

In one embodiment, the number of the time-frequency resource element(s) comprised in the first time-frequency resource sub-pool is a number of coded modulation symbols per layer that can be carried by the first time-frequency resource sub-pool.

In one embodiment, the number of the time-frequency resource element(s) comprised in the first time-frequency resource sub-pool is equal to a number of coded modulation symbols per layer that can be carried by the first time-frequency resource sub-pool.

In one embodiment, the number of the time-frequency resource element(s) comprised in the first time-frequency resource sub-pool is not less than a number of coded modulation symbols per layer that can be carried by the first time-frequency resource sub-pool.

In one embodiment, the number of the time-frequency resource element(s) comprised in the first reserved resource pool is a number of RE(s) comprised in the first reserved resource pool.

In one embodiment, the number of the time-frequency resource element(s) comprised in the first reserved resource pool is a number of coded modulation symbols per layer that can be carried by the first reserved resource pool.

In one embodiment, the number of the time-frequency resource element(s) comprised in the first reserved resource pool is equal to a number of coded modulation symbols per layer that can be carried by the first reserved resource pool.

In one embodiment, the number of the time-frequency resource element(s) comprised in the first reserved resource pool is not less than a number of coded modulation symbols per layer that can be carried by the first reserved resource pool.

In one embodiment, the coded modulation symbols per layer in the present application comprises: coded modulation symbols per layer for HARQ-ACK transmission, or, coded modulation symbols per layer for potential HARQ-ACK transmission.

In one embodiment, the first signal carrying Channel State Information part 1 (CSI part 1); modulation symbols generated by the CSI part 1 are mapped into time-frequency resources other than the first reserved resource pool in the first time-frequency resource pool.

Embodiment 1B

Embodiment 1B illustrates a flowchart of the processing of a first node according to one embodiment of the present application, as shown in FIG. 1.

In Embodiment 1B, the first node in the present application receives a first signaling in step 101A; transmits a first signal in a first time-frequency resource pool in step 102A.

In embodiment 1B, the first signal carries a first bit block and a second bit block; the first signaling is used to determine the first time-frequency resource pool; the second bit block comprises a TB, and the first bit block comprises at least one of a first-type HARQ-ACK or a second-type HARQ-ACK; a number of HARQ-ACK bit(s) comprised in the first bit block and type(s) of HARQ-ACK comprised in the first bit block are used together to determine a number of time-frequency resource element(s) comprised in a first reserved resource pool, and the number of the time-frequency resource element(s) comprised in the first reserved resource pool is a non-negative integer; a target coded bit sequence output through a first procedure is related to the number of the time-frequency resource element(s) comprised in the first reserved resource pool, both the first bit block and the second bit block are used to determine the target coded bit sequence, and modulation symbols generated by the target coded bit sequence are transmitted in the first time-frequency resource pool.

In one embodiment, the first signal comprises a radio signal.

In one embodiment, the first signal comprises a radio-frequency signal.

In one embodiment, the first signal comprises a baseband signal.

In one embodiment, the first signaling is dynamically configured.

In one embodiment, the first signaling comprises a layer 1 (L1) signaling.

In one embodiment, the first signaling comprises an L1 control signaling.

In one embodiment, the first signaling comprises a physical-layer signaling.

In one embodiment, the first signaling comprises one or multiple fields in a physical layer signaling.

In one embodiment, the first signaling comprises a higher-layer signaling.

In one embodiment, the first signaling comprises one or multiple fields in a higher-layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises one or multiple fields in an RRC signaling.

In one embodiment, the first signaling comprises one or multiple fields in a MAC CE signaling.

In one embodiment, the first signaling comprises Downlink Control Information (DCI).

In one embodiment, the first signaling comprises one or multiple fields in a DCI.

In one embodiment, the first signaling comprises Sidelink Control Information (SCI).

In one embodiment, the first signaling comprises one or multiple fields in an SCI In one embodiment, the first signaling comprises one or multiple Fields in an Information Element (IE).

In one embodiment, the first signaling is an UpLink Grant Signalling.

In one embodiment, the first signaling is transmitted on a downlink physical layer control channel (i.e., a downlink channel only capable of carrying a physical-layer signaling).

In one embodiment, the downlink physical-layer control channel in the present application is a Physical Downlink Control CHannel (PDCCH).

In one embodiment, the downlink physical layer control channel in the present application is a short PDCCH (sPDCCH).

In one embodiment, the downlink physical layer control channel in the present application is a Narrow Band PDCCH (NB-PDCCH).

In one embodiment, the first signaling is DCI format 0_0, and for the specific meaning of the DCI format 0_0, refer to section 7.3.1.1 in 3GPP TS38.212.

In one embodiment, the first signaling is DCI format 0_1, and for the specific meaning of the DCI format 0_1, refer to section 7.3.1.1 in 3GPP TS38.212.

In one embodiment, the first signaling is DCI format 0_2, and for the specific meaning of the DCI format 0_2, refer to section 7.3.1.1 in 3GPP TS38.212.

In one embodiment, the meaning of the phrase that the first signal carry a first bit block and a second bit block comprises: the first signal comprises an output after all or partial bits in the first bit block sequentially through part or all of CRC Insertion, Segmentation, code-block level CRC Insertion, Channel Coding, Rate Matching, Concatenation, Scrambling, Modulation, Layer Mapping, Precoding, Mapping to Resource Element, generation of multi-carrier symbol and Modulation and Upconversion, and the first signal comprises an output after all or partial bits in the second bit block sequentially through part or all of CRC Insertion, Segmentation, code-block level CRC Insertion, Channel Coding, Rate Matching, Concatenation, Scrambling, Modulation, Layer Mapping, Precoding, Mapping to Resource Element, generation of multi-carrier symbol and Modulation and Upconversion.

In one embodiment, the first time-frequency resource pool comprises a positive integer number of time-frequency resource element(s).

In one embodiment, the first time-frequency resource pool comprises a positive integer number of Resource Element(s) (RE(s)) in time-frequency domain.

In one embodiment, the RE occupies a multicarrier symbol in time domain, and a subcarrier in frequency domain.

In one embodiment, the time-frequency resource element in the present application is an RE.

In one embodiment, the time-frequency resource element in the present application comprises a subcarrier in frequency domain.

In one embodiment, the time-frequency resource element in the present application comprises a multicarrier symbol in time domain.

In one embodiment, the multicarrier symbol in the present application is an Orthogonal Frequency Division Multiplexing (OFDM) symbol.

In one embodiment, the multicarrier symbol in the present application is a Single Carrier-Frequency Division Multiple Access (SC-FDMA) symbol.

In one embodiment, the multicarrier symbol in the present application is a Discrete Fourier Transform Spread OFDM (DFT-S-OFDM) symbol.

In one embodiment, the first time-frequency resource pool comprises a positive integer number of subcarrier(s) in frequency domain.

In one embodiment, the first time-frequency resource pool comprises a positive integer number of PRB(s) in frequency domain.

In one embodiment, the first time-frequency resource pool comprises a positive integer number of Resource Block(s) (RB(s) in frequency domain.

In one embodiment, the first time-frequency resource pool comprises a positive integer number of multi-carrier symbol(s) in time domain.

In one embodiment, the first time-frequency resource pool comprises a positive integer number of slot(s) in time domain.

In one embodiment, the first time-frequency resource pool comprises a positive integer number of sub-slot(s) in time domain.

In one embodiment, the first time-frequency resource pool comprises a positive integer number of ms(s) in time domain.

In one embodiment, the first time-frequency resource pool comprises a positive integer number of continuous multi-carrier symbol(s) in time domain.

In one embodiment, the first time-frequency resource pool comprises a positive integer number of discontinuous slot(s) in time domain.

In one embodiment, the first time-frequency resource pool comprises a positive integer number of continuous slot(s) in time domain.

In one embodiment, the first time-frequency resource pool comprises a positive integer number of sub-frame(s) in time domain.

In one embodiment, the first time-frequency resource pool is configured by a physical-layer signaling.

In one embodiment, the first time-frequency resource pool is configured by a higher-layer signaling.

In one embodiment, the first time-frequency resource pool is configured by a Radio Resource Control (RRC) signaling.

In one embodiment, the first time-frequency resource pool is configured by a Medium Access Control layer Control Element (MAC CE) signaling.

In one embodiment, the first time-frequency resource pool is reserved for an uplink physical-layer channel.

In one embodiment, the first time-frequency resource pool comprises time-frequency resources reserved for an uplink physical layer channel.

In one embodiment, the first time-frequency resource pool comprises time-frequency resources occupied by an uplink physical layer channel.

In one embodiment, the first time-frequency resource pool is reserved for a Physical Uplink Shared CHannel (PUSCH).

In one embodiment, the first time-frequency resource pool comprises time-frequency resources reserved for a PUSCH.

In one embodiment, the first time-frequency resource pool comprises time-frequency resources occupied by a PUSCH.

In one embodiment, the first time-frequency resource pool is reserved for a Physical Sidelink Shared CHannel (PSSCH).

In one embodiment, the first signaling indicates the first time-frequency resource pool.

In one embodiment, the first signaling explicitly indicates the first time-frequency resource pool.

In one embodiment, the first signaling implicitly indicates the first time-frequency resource pool.

In one embodiment, the first signaling indicates frequency-domain resources comprised in the first time-frequency resource pool.

In one embodiment, the first signaling indicates time-domain resources comprised in the first time-frequency resource pool.

In one embodiment, the first signaling is used to configure a period characteristic associated with the first time-frequency resource pool.

In one embodiment, the implicitly indicating in the present application comprises implicitly indicating via a signaling format.

In one embodiment, the implicitly indicating in the present application comprises implicitly indicating via an RNTI.

In one embodiment, the first signaling comprises first scheduling information; the first scheduling information comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a periodicity, a transmission antenna port, or a corresponding Transmission Configuration Indicator (TCI) state.

In one embodiment, the phrase of being used for in the present application comprises; being used by the first node for.

In one embodiment, the phrase of being used for in the present application comprises: being used by a transmitting end of the first signal for.

In one embodiment, the phrase of being used for in the present application comprises: being used by a receiving end of the first signal for.

In one embodiment, a HARQ-ACK comprised in the first bit block comprises: indication information of whether a signaling is correctly received, or indication information of whether a bit block scheduled by a signaling is correctly received.

In one embodiment, a HARQ-ACK comprised in the first bit block comprises: indication information used to indicate whether a signaling of Semi-Persistent Scheduling (SPS) release is correctly received, or indication information of whether a bit block transmitted on a Physical Downlink Shared CHannel (PDSCH) scheduled by a signaling is correctly received.

In one embodiment, the first bit block comprises a HARQ-ACK.

In one embodiment, the first bit block comprises a positive integer number of bit(s).

In one embodiment, the first bit block comprises a positive integer number of ACK(s) or NACK(s).

In one embodiment, the first bit block comprises a HARQ-ACK codebook.

In one embodiment, the first-type HARQ-ACK is different from the second-type HARQ-ACK.

In one embodiment, both the first-type HARQ-ACK and the second HARQ-ACK comprises HARQ-ACK information bit(s).

In one embodiment, the first-type HARQ-ACK comprises a HARQ-ACK corresponding to a QoS in multiple QoS types.

In one embodiment, the first-type HARQ-ACK comprises a HARQ-ACK corresponding to URLLC service type.

In one embodiment, the first-type HARQ-ACK comprises a HARQ-ACK corresponding to eMBB service type.

In one embodiment, the first-type HARQ-ACK comprises a high-priority HARQ-ACK.

In one embodiment, the first-type HARQ-ACK comprises a low-priority HARQ-ACK.

In one embodiment, the first-type HARQ-ACK comprises a HARQ-ACK corresponding to priority index 1.

In one embodiment, the first-type HARQ-ACK comprises a HARQ-ACK corresponding to priority index 0.

In one embodiment, the first-type HARQ-ACK comprises sidelink HARQ-ACK (SL HARQ-ACK).

In one embodiment, the second-type HARQ-ACK comprises a HARQ-ACK corresponding to a QoS in multiple QoS types.

In one embodiment, the second-type HARQ-ACK comprises a HARQ-ACK corresponding to URLLC service type.

In one embodiment, the second-type HARQ-ACK comprises a HARQ-ACK corresponding to eMBB service type.

In one embodiment, the second-type HARQ-ACK comprises a high-priority HARQ-ACK.

In one embodiment, the second-type HARQ-ACK comprises a low-priority HARQ-ACK.

In one embodiment, the second-type HARQ-ACK comprises a HARQ-ACK corresponding to priority index 1.

In one embodiment, the second-type HARQ-ACK comprises a HARQ-ACK corresponding to priority index 0.

In one embodiment, the second-type HARQ-ACK comprises sidelink HARQ-ACK.

In one embodiment, the second-type HARQ-ACK and the first-type HARQ-ACK are respectively HARQ-ACKs for different links.

In one embodiment, the different links comprise an uplink and a sidelink.

In one embodiment, the second-type HARQ-ACK and the first-type HARQ-ACK are respectively HARQ-ACKs used for different service types.

In one embodiment, the second-type HARQ-ACK and the first-type HARQ-ACK are respectively HARQ-ACKs of different types.

In one embodiment, the second-type HARQ-ACK and the first-type HARQ-ACK are respectively HARQ-ACKs with different priorities.

In one embodiment, the second-type HARQ-ACK and the first-type HARQ-ACK are respectively HARQ-ACKs corresponding to different priority indexes.

In one embodiment, the second-type HARQ-ACK comprises a HARQ-ACK corresponding to priority index 1, and the first-type HARQ-ACK comprises a HARQ-ACK corresponding to priority index 0.

In one embodiment, the second-type HARQ-ACK comprises a HARQ-ACK corresponding to priority index 0, and the first-type HARQ-ACK comprises a HARQ-ACK corresponding to priority index 1.

In one embodiment, the first bit block comprises UCL

In one embodiment, the first signal carries at least a first one of a HARQ-ACK, a CSI or a Scheduling Request (SR).

In one embodiment, the first bit block comprises only one of the first-type HARQ-ACK or the second HARQ-ACK.

In one embodiment, the first bit block comprises one or two of the first-type HARQ-ACK or the second HARQ-ACK.

In one embodiment, the first time-frequency resource pool is reserved for the second bit block.

In one embodiment, the first signaling comprises scheduling information of the second bit block.

In one embodiment, the first signal comprises an output after all or partial bits in the first bit block group and the second bit block sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Multicarrier symbol Generation and Modulation and Upconversion.

In one embodiment, the second bit block comprises a positive integer number of bit(s).

In one embodiment, the second bit block comprises a Transport Block (TB).

In one embodiment, the second bit block comprises a Code Block (CB).

In one embodiment, the second bit block comprises a Code Block Group (CBG).

In one embodiment, the meaning of the phrase that a number of HARQ-ACK bit(s) comprised in the first bit block and type(s) of HARQ-ACK comprised in the first bit block are used together to determine a number of time-frequency resource element(s) comprised in a first reserved resource pool comprises: the first reserved resource pool comprises a positive integer number of the time-frequency resource element(s) reserved for a potential HARQ-ACK transmission, or the first reserved resource pool is a null set; multiple conditions in a second condition set respectively correspond to multiple numbers in a second number set: when a condition in the second condition set is satisfied, the number of the time-frequency resource element(s) comprised in the first reserved resource pool is equal to a number corresponding to the condition in the second condition set in the second number set; any condition in the second condition set is a condition related to a number of HARQ-ACK bit(s) comprised in the first bit block and type(s) of a HARQ-ACK comprised in the first bit block; a number in the second number set is default or configured by a higher-layer signaling or calculated.

In one subembodiment of the above embodiment, a corresponding relation between the multiple conditions in the second condition set and the multiple numbers in the second number set is default.

In one subembodiment of the above embodiment, a corresponding relation between the multiple conditions in the second condition set and the multiple numbers in the second number set is configured by a higher-layer signaling.

In one subembodiment of the above embodiment, the second condition set comprises multiple mutually-exclusive conditions.

In one subembodiment of the above embodiment, the second condition set comprises the following conditions: a number of the first-type HARQ-ACK bit(s) comprised in the first bit block is greater than D and a number of the second-type HARQ-ACK bit(s) comprised in the first bit block is greater than D2.

In one subembodiment of the above embodiment, the second condition set comprises the following conditions: a number of the first-type HARQ-ACK bit(s) comprised in the first bit block is not greater than D and a number of the second-type HARQ-ACK bit(s) comprised in the first bit block is greater than D2.

In one subembodiment of the above embodiment, the second condition set comprises the following conditions: a number of the first-type HARQ-ACK bit(s) comprised in the first bit block is greater than D and a number of the second-type HARQ-ACK bit(s) comprised in the first bit block is not greater than D2.

In one subembodiment of the above embodiment, the second condition set comprises the following conditions: a number of the first-type HARQ-ACK bit(s) comprised in the first bit block is not greater than D and a number of the second-type HARQ-ACK bit(s) comprised in the first bit block is not greater than D2.

In one subembodiment of the above embodiment, the second number set comprises: zero.

In one embodiment, the meaning of the phrase that a number of HARQ-ACK bit(s) comprised in the first bit block and type(s) of HARQ-ACK comprised in the first bit block are used together to determine a number of time-frequency resource element(s) comprised in a first reserved resource pool comprises: the first bit block comprises only one of the first-type HARQ-ACK or the second HARQ-ACK; when the first bit block comprises the first-type HARQ-ACK and a number of bit(s) of the first-type HARQ-ACK comprised in the first bit block is not greater than D, the number of the time-frequency resource element(s) comprised in the first reserved resource pool is greater than 0; when the first bit block comprises the second-type HARQ-ACK, the number of the time-frequency resource element(s) comprised in the first reserved resource pool is greater than 0; when the first bit block comprises the first-type HARQ-ACK and a number of bit(s) of the first-type HARQ-ACK comprised in the first bit block is greater than D, the number of the time-frequency resource element(s) comprised in the first reserved resource pool is equal to 0; D is a positive integer.

In one subembodiment of the above embodiment, when the first bit block comprises the second-type HARQ-ACK; a modulation symbol generated by the first bit block is mapped into time-frequency resources other than the first reserved resource pool in the first time-frequency resource pool.

In one subembodiment of the above embodiment, when the first bit block comprises the second-type HARQ-ACK and a number of the second-type HARQ-ACK bit(s) comprised in the first bit block is not greater than D2: a modulation symbol generated by the first bit block is mapped into another reserved resource pool in the first time-frequency resource pool being different from the first reserved resource pool; D2 is a positive integer.

In one subembodiment of the above embodiment, a second reserved resource pool comprises a positive integer number of time-frequency resource element(s) that can be reserved for the potential second-type HARQ-ACK transmission, or a second reserved resource pool is a null set; the second reserved resource pool is different from the first reserved resource pool; when a number of the second-type HARQ-ACK bit(s) comprised in the first bit block is not greater than D2, a number of time-frequency resource element(s) comprised in the second reserved resource pool is greater than 0; when a number of the second-type HARQ-ACK bit(s) comprised in the first bit block is greater than D2, a number of time-frequency resource element(s) comprised in the second reserved resource pool is equal to 0; D2 is a positive integer.

In one subembodiment of the above embodiment, a second reserved resource pool is mutually orthogonal to the first reserved resource pool.

In one subembodiment of the above embodiment, both a second reserved resource pool and the first reserved resource pool comprise a same time-frequency resource element.

In one subembodiment of the above embodiment, when the first bit block comprises the first-type HARQ-ACK; a modulation symbol generated by the first bit block is mapped into time-frequency resources other than the second reserved resource pool in the first time-frequency resource pool.

In one embodiment, D is equal to 1.

In one embodiment, D is equal to 2.

In one embodiment, D is equal to 3.

In one embodiment, D is equal to 4.

In one embodiment, D is not greater than 1706.

In one embodiment, D is equal to a default positive integer.

In one embodiment, D is equal to a positive integer configured by a higher-layer signaling.

In one embodiment, D is equal to a positive integer configured by an RRC signaling.

In one embodiment, D is equal to a positive integer configured by a MAC CE signaling.

In one embodiment, D2 is equal to 1.

In one embodiment, D2 is equal to 2.

In one embodiment, D2 is equal to 3.

In one embodiment, D2 is equal to 4.

In one embodiment, D2 is not greater than 1706.

In one embodiment, D2 is equal to a default positive integer.

In one embodiment, D2 is equal to a positive integer configured by a higher-layer signaling.

In one embodiment, D2 is equal to a positive integer configured by an RRC signaling.

In one embodiment, D2 is equal to a positive integer configured by a MAC CE signaling.

In one embodiment, D2 is equal to D.

In one embodiment, D2 is not equal to D.

In one embodiment, the first reserved resource pool is reserved for the potential first-type HARQ-ACK transmission.

In one embodiment, the first reserved resource pool comprises a positive integer number of time-frequency resource element(s) reserved for the potential first-type HARQ-ACK transmission, or, the first reserved resource pool is a null set.

In one embodiment, the first reserved resource pool comprises a positive integer number of time-frequency resource element(s) reserved for the potential first-type HARQ-ACK transmission or the potential second-type HARQ-ACK transmission, or, the first reserved resource pool is a null set.

In one embodiment, the first reserved resource pool is determined based on the description in section 6.2.7 of 3GPP TS38.212.

In one embodiment, the first reserved resource pool is reserved for a potential HARQ-ACK transmission.

In one embodiment, the first reserved resource pool comprises time-frequency resources reserved for a potential HARQ-ACK transmission.

In one embodiment, the first reserved resource pool comprises a positive integer number of time-frequency resource element(s) reserved for potential HARQ-ACK transmission, or, the first reserved resource pool is a null set.

In one embodiment, the number of the time-frequency resource element(s) comprised in the first reserved resource pool is greater than 0.

In one embodiment, the first time-frequency resource pool comprises the first reserved resource pool.

In one embodiment, time-frequency resources comprised in the first reserved resource pool are a subset of time-frequency resources comprised in the first time-frequency resource pool.

In one embodiment, the number of the time-frequency resource element(s) comprised in the first reserved resource pool is a number of RE(s) comprised in the first reserved resource pool.

In one embodiment, the number of the time-frequency resource element(s) comprised in the first reserved resource pool is a number of coded modulation symbols per layer that can be carried by the first reserved resource pool.

In one embodiment, the number of the time-frequency resource element(s) comprised in the first reserved resource pool is equal to a number of coded modulation symbols per layer that can be carried by the first reserved resource pool.

In one embodiment, the number of the time-frequency resource element(s) comprised in the first reserved resource pool is not less than a number of coded modulation symbols per layer that can be carried by the first reserved resource pool.

In one embodiment, the coded modulation symbols per layer in the present application comprises: coded modulation symbols per layer for HARQ-ACK transmission, or, coded modulation symbols per layer for potential HARQ-ACK transmission.

In one embodiment, the first signal carries Channel State Information part 1 (CSI part 1); a modulation symbol generated by the CSI part 1 is mapped into time-frequency resources other than the first reserved resource pool in the first time-frequency resource pool.

In one subembodiment of the above embodiment, the first reserved resource pool is a resource set comprising a positive integer number of time-frequency resource element(s), or the first reserved resource pool is a null set; when the number of the time-frequency resource element(s) comprised in the first reserved resource pool is greater than 0, a modulation symbol generated by the first bit block is transmitted in the first reserved resource pool; the number of the time-frequency resource element(s) comprised in the first reserved resource pool is equal to 0, and the first reserved resource pool is a null set.

In one embodiment, the modulation symbol generated by the first bit block comprises: an output after all or partial bits in the first bit block sequentially through part or all of CRC insertion, segmentation, code block-level CRC insertion, channel coding, rate matching, concatenation, scrambling, and modulation.

In one embodiment, the modulation symbol generated by the target coded bit sequence comprises: an output after the target coded bit sequence is through at least one of scrambling or modulation.

In one embodiment, the number of the time-frequency resource element(s) comprised in the first reserved resource pool is not greater than a number of time-frequency resource element(s) comprised in the first time-frequency resource pool.

In one embodiment, the first reserved resource pool does not comprise any time-frequency resource other than time-frequency resources comprised in the first time-frequency resource pool.

In one embodiment, a number of HARQ-ACK bit(s) comprised in the first bit block and type(s) of a HARQ-ACK comprised in the first bit block are used together to determine whether the number of the time-frequency resource element(s) comprised in the first reserved resource pool is greater than 0.

In one embodiment, the meaning of the phrase that a target coded bit sequence output through a first procedure is related to the number of the time-frequency resource element(s) comprised in the first reserved resource pool comprises: there exists a one-to-one mapping relation between a first number range set and a first parameter set, the number of the time-frequency resource element(s) comprised in the first reserved resource pool is a number in a first number range, the first number range set comprises the first number range, a first parameter is a parameter corresponding to the first number range in the first parameter set, and an output after the first parameter is input into the first procedure is the target coded bit sequence.

In one subembodiment of the above embodiment, the first number range set is configured by a higher-layer signaling.

In one subembodiment of the above embodiment, the first parameter set is configured by a higher-layer signaling.

In one embodiment, the meaning of the phrase that a target coded bit sequence output through a first procedure is related to the number of the time-frequency resource element(s) comprised in the first reserved resource pool comprises: the target coded bit sequence is output after the first procedure is executed, and the number of the time-frequency resource element(s) comprised in the first reserved resource pool is used to determine the method in which the first procedure is executed.

In one embodiment, the meaning of the phrase that a target coded bit sequence output through a first procedure is related to the number of the time-frequency resource element(s) comprised in the first reserved resource pool comprises: an output of the first procedure is the target coded bit sequence, and the number of the time-frequency resource element(s) comprised in the first reserved resource pool is used to determine how the first procedure is executed.

In one embodiment, the meaning of the phrase that a target coded bit sequence output through a first procedure is related to the number of the time-frequency resource element(s) comprised in the first reserved resource pool comprises: an output of the first procedure is the target coded bit sequence; the first procedure comprises at least two of a first sub-procedure, a second sub-procedure or a third sub-procedure; when the number of the time-frequency resource element(s) comprised in the first reserved resource pool is equal to 0, the first procedure comprises a first sub-procedure and a second sub-procedure, the first coded bit sequence is used as an input to execute the first sub-procedure in the first procedure, the second coded bit sequence is used as an input to execute the second sub-procedure in the first procedure, and the first sub-procedure in the first procedure is executed before the second sub-procedure in the first procedure; when the number of the time-frequency resource element(s) comprised in the first reserved resource pool is greater than 0, the first procedure comprises a second sub-procedure and a third sub-procedure, the second coded bit sequence is used as an input to execute the second sub-procedure in the first procedure, the first coded bit sequence used as an input is used to execute the third sub-procedure in the first procedure, and the third sub-procedure in the first procedure is executed after the second sub-procedure in the first procedure.

In one embodiment, the first procedure comprises a first sub-procedure, a second sub-procedure and a third sub-procedure; when the number of the time-frequency resource element(s) comprised in the first reserved resource pool is equal to 0, the first coded bit sequence used as an input is used to execute the first sub-procedure in the first procedure, the second coded bit sequence is used as an input to execute the second sub-procedure in the first procedure, steps in the third sub-procedure in the first procedure is not executed, and the first sub-procedure in the first procedure is executed after the second sub-procedure in the first procedure; when the number of the time-frequency resource element(s) comprised in the first reserved resource pool is greater than 0, steps in the first sub-procedure in the first procedure is not executed, the second coded bit sequence is as an input used to execute the second sub-procedure in the first procedure, the first coded bit sequence is used as an input to execute the third sub-procedure in the first procedure, and the third sub-procedure in the first procedure is executed before the second sub-procedure in the first procedure.

In one embodiment, the first procedure comprises at least two of a first sub-procedure, a second sub-procedure or a third sub-procedure; when the number of the time-frequency resource element(s) comprised in the first reserved resource pool is greater than 0, the first procedure comprises a first sub-procedure and a second sub-procedure, the first coded bit sequence is used as an input to execute the first sub-procedure in the first procedure, the second coded bit sequence is used as an input to execute the second sub-procedure in the first procedure, and the first sub-procedure in the first procedure is executed before the second sub-procedure in the first procedure; when the number of the time-frequency resource element(s) comprised in the first reserved resource pool is equal to 0, the first procedure comprises a second sub-procedure and a third sub-procedure, the second coded bit sequence is used as an input to execute the second sub-procedure in the first procedure, the first coded bit sequence used as an input is used to execute the third sub-procedure in the first procedure, and the third sub-procedure in the first procedure is executed after the second sub-procedure in the first procedure.

In one embodiment, the meaning of the phrase that both the first bit block and the second bit block are used to determine the target coded bit sequence comprises: the target coded bit sequence comprises partial or all bits in the first bit block and partial or all bits in the second bit block.

In one embodiment, the meaning of the phrase that both the first bit block and the second bit block are used to determine the target coded bit sequence comprises: the first bit block and the second bit block are respectively used to generate two coded bit sequences of the target coded bit sequence.

In one embodiment, the meaning of the phrase that both the first bit block and the second bit block are used to determine the target coded bit sequence comprises: the first bit block generates the first coded bit sequence, and the second bit block generates the second coded bit sequence; the first coded bit sequence and the second coded bit sequence are used as input to execute the first procedure to obtain the target coded bit sequence.

In one embodiment, the first procedure comprises multiple sub-procedures.

In one embodiment, the first procedure comprises part or all of multiple steps of generating multiplexed data and control coded bit sequence in section 6.2.7 of 3GPP TS38.212.

Embodiment 2

Figure 2:
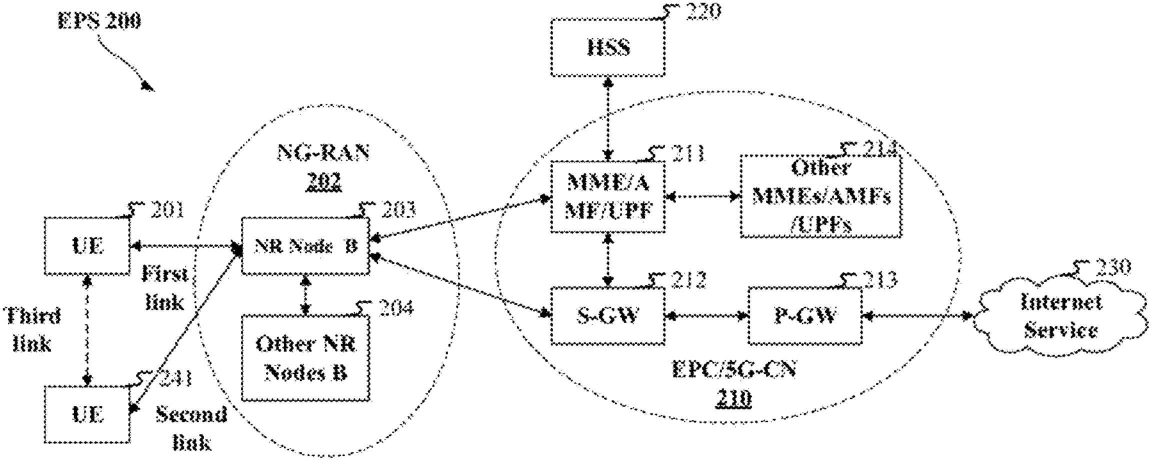
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (BSS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 241 corresponds to the second node in the present application.

In one embodiment, the gNB 203 corresponds to the second node in the present application.

In one embodiment, the UE 241 corresponds to the first node in the present application.

In one embodiment, the UE 201 corresponds to the second node in the present application.

Embodiment 3

Figures 3, 4:
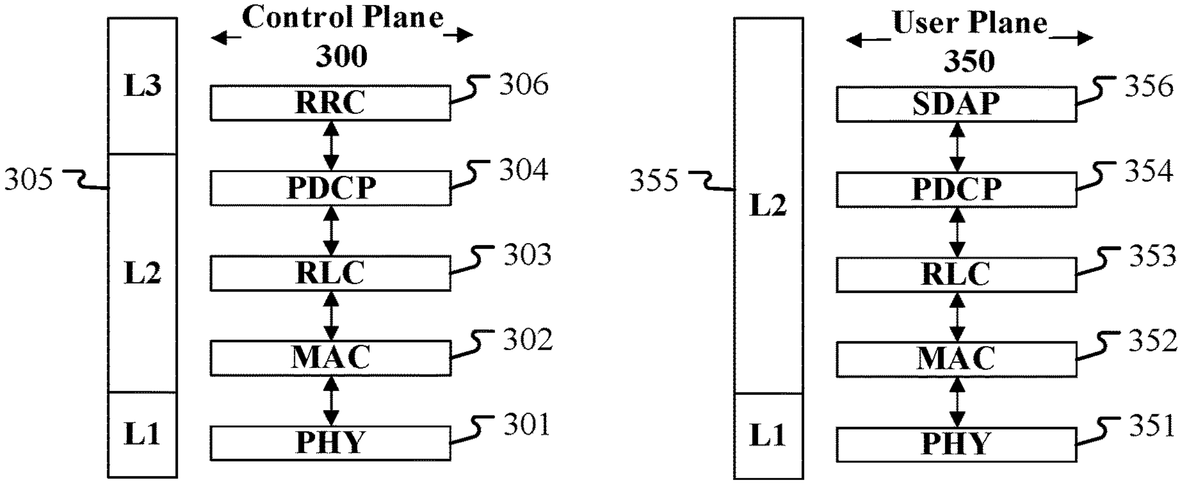
FIG. 3 illustrates a schematic diagram of a radio protocol architecture of a user plane and a control plane according to one embodiment of the present application.
FIG. 4 illustrates a schematic diagram of a first communication device and a second communication device according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first bit block in the present application is generated by the RRC sublayer 306.

In one embodiment, the first bit block in the present application is generated by the MAC sublayer 302.

In one embodiment, the first bit block in the present application is generated by the MAC sublayer 352.

In one embodiment, the first bit block in the present application is generated by the PHY 301.

In one embodiment, the first bit block in the present application is generated by the PHY 351.

In one embodiment, the second bit block in the present application is generated by the RRC sublayer 306.

In one embodiment, the second bit block in the present application is generated by the SDAP sublayer 356.

In one embodiment, the second bit block in the present application is generated by the MAC sublayer 302.

In one embodiment, the second bit block in the present application is generated by the MAC sublayer 352.

In one embodiment, the second bit block in the present application is generated by the PHY 301.

In one embodiment, the second bit block in the present application is generated by the PHY 351.

In one embodiment, the first signaling in the present application is generated by the RRC sublayer 306.

In one embodiment, the first signaling in the present application is generated by the MAC sublayer 302.

In one embodiment, the first signaling in the present application is generated by the MAC sublayer 352.

In one embodiment, the first signaling in the present application is generated by the PHY 301.

In one embodiment, the first signaling in the present application is generated by the PHY 351.

Embodiment 4

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller processor 459 can be connected to a memory 460 that stores program code and data. The memory 460 can be called a computer readable medium. In the transmission from the first communication device 410 to the second communication device 450, the controller/processor 459 provides de-multiplexing between a transport channel and a logical channel, packet reassembling, decryption, header decompression and control signal processing so as to recover a higher-layer packet from the core network. The higher layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises; at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present application; transmits the first signal in the present application in the first time-frequency resource pool in the present application, and the first signal carries the first bit block in the present application; herein, the first signaling is used to determine the first time-frequency resource pool; the first bit block comprises K HARQ-ACK information bit(s), K being a positive integer; the first bit block comprises at least one of the first-type HARQ-ACK in the present application or the second-type HARQ-ACK in the present application; the first condition in the present application is a condition related to type(s) of HARQ-ACK(s) comprised in the first bit block; when the first condition is not satisfied, a same offset value is not only used to determine the number of the time-frequency resource element(s) comprised in the first time-frequency resource sub-pool but also used to determine the number of the time-frequency resource element(s) comprised in the first reserved resource pool in the present application: when the first condition is satisfied, two different offset values are respectively used to determine the number of the time-frequency resource element(s) comprised in the first time-frequency resource sub-pool in the present application and the number of the time-frequency resource element(s) comprised in the first reserved resource pool in the present application; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving the first signaling in the present application; and transmitting the first signal in the present application in the first time-frequency resource pool in the present application, and the first signal carrying the first bit block in the present application; herein, the first signaling is used to determine the first time-frequency resource pool; the first bit block comprises K HARQ-ACK information bit(s), K being a positive integer; the first bit block comprises at least one of the first-type HARQ-ACK in the present application or the second-type HARQ-ACK in the present application; the first condition in the present application is a condition related to type(s) of HARQ-ACK(s) comprised in the first bit block; when the first condition is not satisfied, a same offset value is not only used to determine the number of the time-frequency resource element(s) comprised in the first time-frequency resource sub-pool but also used to determine the number of the time-frequency resource element(s) comprised in the first reserved resource pool in the present application; when the first condition is satisfied, two different offset values are respectively used to determine the number of the time-frequency resource element(s) comprised in the first time-frequency resource sub-pool in the present application and the number of the time-frequency resource element(s) comprised in the first reserved resource pool in the present application; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present application; and receives the first signal in the present application in the first time-frequency resource pool in the present application, and the first signal carries the first bit block in the present application; herein, the first signaling is used to determine the first time-frequency resource pool; the first bit block comprises K HARQ-ACK information bit(s), K being a positive integer; the first bit block comprises at least one of the first-type HARQ-ACK in the present application or the second-type HARQ-ACK in the present application; the first condition in the present application is a condition related to type(s) of HARQ-ACK(s) comprised in the first bit block; when the first condition is not satisfied, a same offset value is not only used to determine the number of the time-frequency resource element(s) comprised in the first time-frequency resource sub-pool but also used to determine the number of the time-frequency resource element(s) comprised in the first reserved resource pool in the present application; when the first condition is satisfied, two different offset values are respectively used to determine the number of the time-frequency resource element(s) comprised in the first time-frequency resource sub-pool in the present application and the number of the time-frequency resource element(s) comprised in the first reserved resource pool in the present application; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting the first signaling in the present application; and receiving the first signal in the present application in the first time-frequency resource pool in the present application, and the first signal carrying the first bit block in the present application; herein, the first signaling is used to determine the first time-frequency resource pool; the first bit block comprises K HARQ-ACK information bit(s), K being a positive integer; the first bit block comprises at least one of the first-type HARQ-ACK in the present application or the second-type HARQ-ACK in the present application; the first condition in the present application is a condition related to type(s) of HARQ-ACK (S) comprised in the first bit block; when the first condition is not satisfied, a same offset value is not only used to determine the number of the time-frequency resource element(s) comprised in the first time-frequency resource sub-pool but also used to determine the number of the time-frequency resource element(s) comprised in the first reserved resource pool in the present application; when the first condition is satisfied, two different offset values are respectively used to determine the number of the time-frequency resource element(s) comprised in the first time-frequency resource sub-pool in the present application and the number of the time-frequency resource element(s) comprised in the first reserved resource pool in the present application; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the transmitter 454, the multi-antenna transmission processor 458, the transmitting processor 468, the controller/processor 459, the memory 460, or the data source 467 is used to transmit the first signal in the present application in the first time-frequency resource pool in the present application.

In one embodiment, at least one of the antenna 420, the receiver 418, the multi-antenna receiving processor 472, the receiving processor 470, the controller/processor 475, or the memory 476 is used to receive the first signal in the present application in the first time-frequency resource pool in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present application; and transmits the first signal in the present application in the first time-frequency resource pool in the present application, the first signal carries the first bit block in the present application and the second bit block in the present application; herein, the first signaling is used to determine the first time-frequency resource pool; the second bit block comprises a TB, and the first bit block comprises at least one of a first-type HARQ-ACK in the present application or a second-type HARQ-ACK in the present application; a number of HARQ-ACK bit(s) comprised in the first bit block and type(s) of HARQ-ACK comprised in the first bit block are used together to determine the number of the time-frequency resource element(s) comprised in the first reserved resource pool in the present application, and the number of the time-frequency resource element(s) comprised in the first reserved resource pool is a non-negative integer; the target coded bit sequence in the present application output through a first procedure in the present application is related to the number of the time-frequency resource element(s) comprised in the first reserved resource pool, both the first bit block and the second bit block are used to determine the target coded bit sequence, and a modulation symbol generated by the target coded bit sequence is transmitted in the first time-frequency resource pool.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving the first signaling in the present application; and transmitting the first signal in the present application in the first time-frequency resource pool in the present application, the first signal carrying the first bit block in the present application and the second bit block in the present application; herein, the first signaling is used to determine the first time-frequency resource pool; the second bit block comprises a TB, and the first bit block comprises at least one of a first-type HARQ-ACK in the present application or a second-type HARQ-ACK in the present application; a number of HARQ-ACK bit(s) comprised in the first bit block and type(s) of HARQ-ACK comprised in the first bit block are used together to determine the number of the time-frequency resource element(s) comprised in the first reserved resource pool in the present application, and the number of the time-frequency resource element(s) comprised in the first reserved resource pool is a non-negative integer; the target coded bit sequence in the present application output through a first procedure in the present application is related to the number of the time-frequency resource element(s) comprised in the first reserved resource pool, both the first bit block and the second bit block are used to determine the target coded bit sequence, and a modulation symbol generated by the target coded bit sequence is transmitted in the first time-frequency resource pool.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present application; and receives the first signal in the present application in the first time-frequency resource pool in the present application, the first signal carries the first bit block in the present application and the second bit block in the present application; herein, the first signaling is used to determine the first time-frequency resource pool; the second bit block comprises a TB, and the first bit block comprises at least one of a first-type HARQ-ACK in the present application or a second-type HARQ-ACK in the present application; a number of HARQ-ACK bit(s) comprised in the first bit block and type(s) of HARQ-ACK comprised in the first bit block are used together to determine the number of the time-frequency resource element(s) comprised in the first reserved resource pool in the present application, and the number of the time-frequency resource element(s) comprised in the first reserved resource pool is a non-negative integer; the target coded bit sequence in the present application output through a first procedure in the present application is related to the number of the time-frequency resource element(s) comprised in the first reserved resource pool, both the first bit block and the second bit block are used to determine the target coded bit sequence, and a modulation symbol generated by the target coded bit sequence is transmitted in the first time-frequency resource pool.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting the first signaling in the present application; and receiving the first signal in the present application in the first time-frequency resource pool in the present application, the first signal carrying the first bit block in the present application and the second bit block in the present application; herein, the first signaling is used to determine the first time-frequency resource pool; the second bit block comprises a TB, and the first bit block comprises at least one of a first-type HARQ-ACK in the present application or a second-type HARQ-ACK in the present application; a number of HARQ-ACK bit(s) comprised in the first bit block and type(s) of HARQ-ACK comprised in the first bit block are used together to determine the number of the time-frequency resource element(s) comprised in the first reserved resource pool in the present application, and the number of the time-frequency resource element(s) comprised in the first reserved resource pool is a non-negative integer; the target coded bit sequence in the present application output through a first procedure in the present application is related to the number of the time-frequency resource element(s) comprised in the first reserved resource pool, both the first bit block and the second bit block are used to determine the target coded bit sequence, and a modulation symbol generated by the target coded bit sequence is transmitted in the first time-frequency resource pool.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, of the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the transmitter 454, the multi-antenna transmission processor 458, the transmitting processor 468, the controller/processor 459, the memory 460, or the data source 467 is used to transmit the first signal in the present application in the first time-frequency resource pool in the present application.

In one embodiment, at least one of the antenna 420, the receiver 418, the multi-antenna receiving processor 472, the receiving processor 470, the controller/processor 475, or the memory 476 is used to receive the first signal in the present application in the first time-frequency resource pool in the present application.

Embodiment 5A

Figure 5:
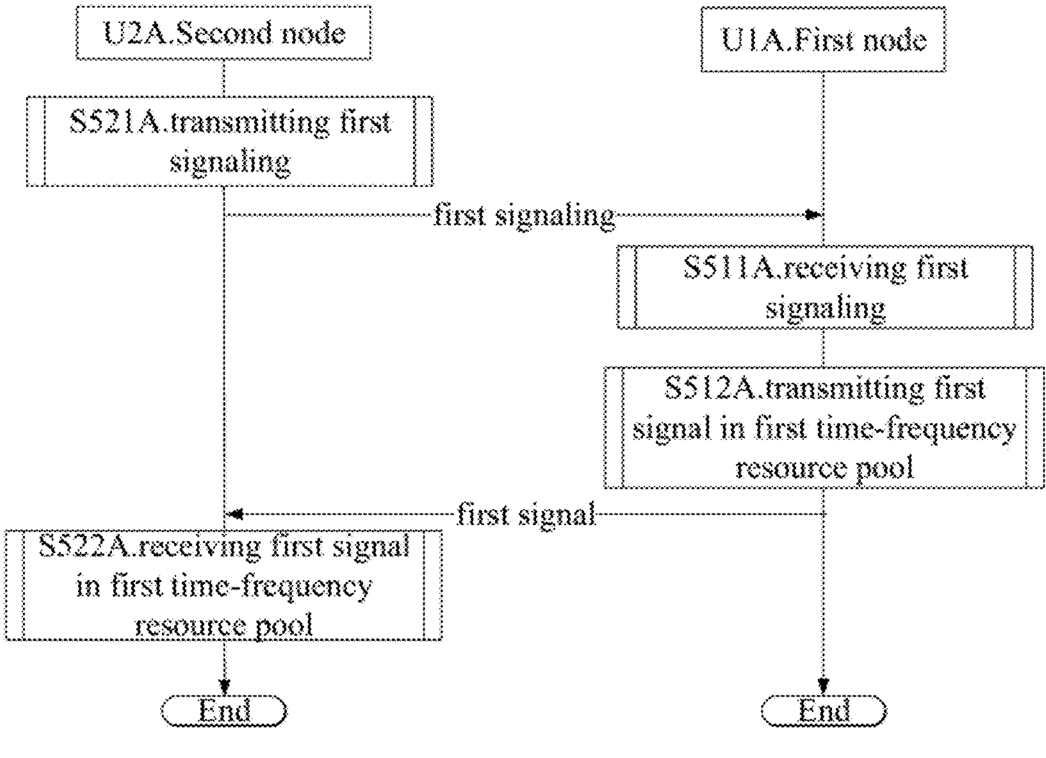
FIG. 5 illustrates a flowchart of signal transmission according to one embodiment of the present application.

Embodiment 5A illustrates a flowchart of radio signal transmission according to one embodiment in the present application, as shown in FIG. 5. In FIG. 5, a first node U1A and a second node U2A are in communications via an air interface.

The first node U1A receives a first signaling in step S511A; transmits a first signal in a first time-frequency resource pool in step S512A.

The second node U2A transmits a first signaling in step S521A; receives a first signal in a first time-frequency resource pool in step S522A.

In embodiment 5A, the first signal carries a first bit block; the first signaling is used to determine the first time-frequency resource pool; the first bit block comprises K HARQ-ACK information bit(s), K being a positive integer; the first bit block comprises at least one of a first-type HARQ-ACK or a second-type HARQ-ACK; a first condition is a condition related to type(s) of HARQ-ACK(s) comprised in the first bit block; when the first condition is not satisfied, a same offset value is used to determine both a number of time-frequency resource element(s) comprised in a first time-frequency resource sub-pool and a number of time-frequency resource element(s) comprised in a first reserved resource pool: when the first condition is satisfied, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool; the first signal carries a second bit block, the second bit block comprises a Transport Block (TB); the first condition comprises: the first bit block comprising the second-type HARQ-ACK; a first radio resource pool is reserved for at least one bit sub-block comprised in the first bit block; the first radio resource pool overlaps with the first time-frequency resource pool in time domain; the first-type HARQ-ACK corresponds to a first priority, and the second-type HARQ-ACK corresponds to a second priority.

In one subembodiment of embodiment 5A, when the first condition is satisfied: the two different offset values are respectively a first offset value and a second offset value; the first offset value is used to determine the number of the time-frequency resource element(s) comprised in the first time-frequency resource sub-pool, and the second offset value is used to determine the number of the time-frequency resource element(s) comprised in the first reserved resource pool.

In one subembodiment of embodiment 5A, the first condition is satisfied: a second condition set comprises N mutually-exclusive conditions, N being a positive integer greater than 1; a first offset value set comprises not less than the N mutually-different offset values, and a second offset value set comprises at least one offset value; for any positive integer j not greater than N, when the j-th condition in the second condition set is satisfied: the j-th offset value in the first offset value set is used to determine the number of the time-frequency resource element(s) comprised in the first time-frequency resource sub-pool, an offset value in the second offset value set different from the j-th offset value in the first offset value set is used to determine the number of the time-frequency resource element(s) comprised in the first reserved resource pool.

In one embodiment, the first node U1A is the first node in the present application.

In one embodiment, the second node U2A is the second node in the present application.

In one embodiment, the first node U1A is a UE.

In one embodiment, the second node U2A is a base station.

In one embodiment, the second node U2A is a UE.

In one embodiment, an air interface between the second node U2A and the first node U1A is a Uu interface.

In one embodiment, an air interface between the second node U2A and the first node U1A comprises a cellular link.

In one embodiment, an air interface between the second node U2A and the first node U1A is a PC5 interface.

In one embodiment, an air interface between the second node U2A and the first node ULA comprises a sidelink.

In one embodiment, an air interface between the second node U2A and the first node U1A comprises a radio interface between a base station and a UE.

In one embodiment, the first signaling comprises scheduling information of the second bit block.

In one embodiment, the phrase that the first signal carries a second bit block comprises: the first signal comprises an output after all or partial bits in the second bit block sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Generation of Multicarrier symbol and Modulation and Upconversion.

In one embodiment, the first signal comprises an output after all or partial bits in the first bit block group and the second bit block sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Generation of Multicarrier symbol and Modulation and Upconversion.

In one embodiment, the second bit block comprises a positive integer of bit(s).

In one embodiment, the first signal carries a second bit block, and the second bit block comprises a Code Block (CB).

In one embodiment, the first signal carries a second bit block, and the second bit block comprises a Code Block Group (CBG).

In one embodiment, the first condition comprises: the first bit block comprising the second-type HARQ-ACK; the meaning of the expression that the first condition is not satisfied comprises: the first bit block does not comprise the second-type HARQ-ACK; the meaning of the expression that the first condition is satisfied comprises: the first bit block comprises the second-type HARQ-ACK.

In one embodiment, the first bit block comprises at least a former of the first-type HARQ-ACK and the second-type HARQ-ACK.

In one embodiment, when the first bit block does not comprise the second-type HARQ-ACK, a same offset value is used to determine both a number of time-frequency resource element(s) comprised in a first time-frequency resource sub-pool and a number of time-frequency resource element(s) comprised in a first reserved resource pool; when the first bit block comprises the second-type HARQ-ACK, two different offset values are respectively used to determine a number of time-frequency resource element(s) comprised in a first time-frequency resource sub-pool and a number of time-frequency resource element(s) comprised in a first reserved resource pool.

In one embodiment, the first time-frequency resource sub-pool is determined on the basis that the number of the time-frequency resource element(s) comprised in the first time-frequency resource sub-pool is determined first.

In one embodiment, the first time-frequency resource sub-pool comprises; time-frequency resources used to carry coded bits for HARQ-ACK in a PUSCH; the first time-frequency resource sub-pool is determined based on the procedure of HARQ-ACK coded bits being multiplexed described in section 6.2.7 of 3GPP TS38.212.

In one embodiment, the first reserved resource pool is determined on the basis that the number of the time-frequency resource element(s) comprised in the first reserved resource pool is determined first.

In one embodiment, the reserved resource pool comprises; time-frequency resources reserved for a potential HARQ-ACK transmission; the first reserved resource pool is determined based on the description in section 6.2.7 of 3GPP TS38.212.

In one embodiment, one of the two different offset values is an offset value corresponding to an index indicated by the first signaling in an index set configured by a higher-layer signaling, and the other one of the two different offset values is an offset value corresponding to an index indicated by the first signaling in another index set configured by a higher-layer signaling.

In one embodiment, the first condition is not satisfied; a field comprised in the first signaling indicates the same offset value; a name of the field comprised in the first signaling comprises uci-OnPUSCH (or UCI-OnPUSCH).

In one embodiment, the first condition is not satisfied; a beta_offsetindicator field comprised in the first signaling indicates the same offset value.

In one embodiment, the first condition is satisfied; a field comprised in the first signaling indicates at least one of the two different offset values; a name of the field comprised in the first signaling comprises uci-OnPUSCH (or UCI-OnPUSCH).

In one embodiment, the first condition is satisfied; a beta_offset indicator field comprised in the first signaling indicates at least one offset value in the two different offset values.

In one embodiment, the first condition comprises: the first bit block does not comprise the second-type HARQ-ACK.

In one embodiment, the first condition comprises: the first bit block does not comprise one of the first-type HARQ-ACK or the second-type HARQ-ACK.

In one embodiment, the first condition comprises: the first bit block comprises the first-type HARQ-ACK and the second-type HARQ-ACK.

In one embodiment, the first condition comprises: all conditions in a first condition set are satisfied.

In one embodiment, each condition in the first condition set is a condition related to a type of HARQ-ACK comprised in the first bit block.

In one embodiment, a condition in the first condition set comprises; the first bit block comprising the second-type HARQ-ACK.

In one embodiment, a condition in the first condition set comprise: the first bit block comprising the first-type HARQ-ACK.

In one embodiment, when the first bit block does not comprise the second-type HARQ-ACK, the first bit block comprises the first-type HARQ-ACK.

In one embodiment, the first bit block comprises only one of the first-type HARQ-ACK or the second HARQ-ACK; the first condition is: the first bit block comprising the second-type HARQ-ACK; when the first bit block does not comprise the second-type HARQ-ACK, a fifth offset value is not only used to determine the number of the time-frequency resource element(s) comprised in the first time-frequency resource sub-pool but also used to determine the number of the time-frequency resource element(s) comprised in the first reserved resource pool; when the first bit block comprises the second-type HARQ-ACK, a sixth offset value is used to determine the number of the time-frequency resource element(s) comprised in the first time-frequency resource sub-pool, and a seventh offset value is used to determine the number of the time-frequency resource element(s) comprised in the first reserved resource pool; the fifth offset value and the sixth offset value are respectively different offset values, and the sixth offset value and the seventh offset value are respectively different offset values.

In one subembodiment of the above embodiment, the seventh offset value is the fifth offset value.

In one subembodiment of the above embodiment, the seventh offset value is not the fifth offset value.

In one embodiment, a type of a HARQ-ACK comprised in the first bit block is used to determine an offset value of the number of the time-frequency resource element(s) comprised in the first reserved resource pool is which of multiple offset values.

In one embodiment, the first bit block comprises only one of the first-type HARQ-ACK or the second HARQ-ACK; when the first bit block comprises only a former of the first-type HARQ-ACK or the second-type HARQ-ACK, a fifth offset value is used to determine the number of the time-frequency resource element(s) comprised in the first time-frequency resource sub-pool: when the first bit block comprises only a latter of the first-type HARQ-ACK or the second-type HARQ-ACK, a sixth offset value is used to determine the number of the time-frequency resource element(s) comprised in the first time-frequency resource sub-pool; the fifth offset value is an offset value in a fifth offset value element set, the sixth offset value is an offset value in a sixth offset value element set, and the fifth offset value element set is different from the sixth offset value element set.

In one subembodiment of the above embodiment, the first signaling indicates the fifth offset value in the fifth offset value element set.

In one subembodiment of the above embodiment, the first signaling indicates the sixth offset value in the sixth offset value element set.

In one subembodiment of the above embodiment, the first signaling determines the fifth offset value in the fifth offset value element set through indicating an offset value index.

In one subembodiment of the above embodiment, the first signaling indicates the sixth offset value in the sixth offset value element set.

In one subembodiment of the above embodiment, the first signaling determines the sixth offset value in the sixth offset value element set through indicating an offset value index.

In one embodiment, when the first bit block comprises only a former of the first-type HARQ-ACK or the second-type HARQ-ACK, a fifth offset value is used to determine the number of the time-frequency resource element(s) comprised in the first time-frequency resource sub-pool; when the first bit block comprises only a latter of the first-type HARQ-ACK or the second-type HARQ-ACK, a sixth offset value is used to determine the number of the time-frequency resource element(s) comprised in the first time-frequency resource sub-pool: when the first bit block comprises the first-type HARQ-ACK and the second-type HARQ-ACK, an eighth offset value is used to determine the number of the time-frequency resource element(s) comprised in the first time-frequency resource sub-pool; the fifth offset value is an offset value in a fifth offset value element set, the sixth offset value is an offset value in a sixth offset value element set, and the fifth offset value element set is different from the sixth offset value element set.

In one subembodiment of the above embodiment, the first signaling indicates the fifth offset value in the fifth offset value element set.

In one subembodiment of the above embodiment, the first signaling indicates the sixth offset value in the sixth offset value element set.

In one subembodiment of the above embodiment, the eighth offset value is an offset value in an eighth offset value element set; the eighth offset value element set is different from at least one of the fifth offset value element set of the sixth offset value element set.

In one subembodiment of the above embodiment, the first signaling indicates the eighth offset value in the eighth offset value element set.

In one subembodiment of the above embodiment, the first signaling indicates the eighth offset value in the eighth offset value element set.

In one subembodiment of the above embodiment, the first signaling determines the fifth offset value in the fifth offset value element set through indicating an offset value index.

In one subembodiment of the above embodiment, the first signaling determines the sixth offset value in the sixth offset value element set through indicating an offset value index.

In one subembodiment of the above embodiment, the first signaling determines the eighth offset value in the eighth offset value element set through indicating an offset value index.

In one embodiment, English names in the present application are not case-sensitive.

In one embodiment, different HARQ-ACK types respectively correspond to related configurations of different offset values.

In one subembodiment of the above embodiment, related configuration of the offset value comprises: UCI-OnPUSCH (or uci-OnPUSCH) configuration.

In one subembodiment of the above embodiment, related configuration of the offset value comprises: the offset value configuration in the present application.

In one embodiment, a characteristic used for a method in the first node also comprises: receiving a signaling group.

In one embodiment, a characteristic used for a method in the second node also comprises: transmitting a signaling group.

In one embodiment, a value determined by a signaling group corresponds to related multiple different offset values related to multiple different offset value configurations.

In one subembodiment of the above embodiment, the meaning of the phrase that a value determined by a signaling group corresponds to multiple different offset values related to multiple different offset value configurations comprises: the value determined by the signaling group corresponds to different offset values in multiple different offset value configurations based on a mapping relation.

In one subembodiment of the above embodiment, the meaning of the phrase that a value determined by a signaling group corresponds to multiple different offset values related to multiple different offset value configurations comprises: the value determined by the signaling group corresponds to different offset value indexes in multiple different offset value configurations based on a mapping relation.

In one subembodiment of the above embodiment, the meaning of the phrase that a value determined by a signaling group corresponds to multiple different offset values related to multiple different offset value configurations comprises: the value determined by the signaling group corresponds to at least two different offset values in multiple different offset value configurations based on a mapping relation.

In one subembodiment of the above embodiment, the meaning of the phrase that a value determined by a signaling group corresponds to multiple different offset values related to multiple different offset value configurations comprises: the value determined by the signaling group corresponds to at least two different offset value indexes in multiple different offset value configurations based on a mapping relation.

In one subembodiment of the above embodiment, the multiple different offset values related to the multiple different offset value configurations corresponding to the value determined by the signaling group at least comprise two offset values greater than 0.

In one subembodiment of the above embodiment, when the first condition is not satisfied, the same offset value is one of the multiple different offset values related to the multiple different offset value configurations corresponding to the value determined by the signaling group; when the first condition is satisfied, the two different offset values are two of the multiple different offset values related to the multiple different offset value configurations corresponding to the value determined by the signaling group.

In one subembodiment of the above embodiment, when the first condition is satisfied, the two different offset values are two of the multiple different offset values related to the multiple different offset value configurations corresponding to the value determined by the signaling group, an offset value used to determine the number of the time-frequency resource element(s) comprised in the first reserved resource pool among the two different offset values is a maximum offset value related to the multiple different offset value configurations corresponding to the value determined by the signaling group among the multiple different offset values.

In one subembodiment of the above embodiment, when the first condition is satisfied, the two different offset values are two of the multiple different offset values related to the multiple different offset value configurations corresponding to the value determined by the signaling group, an offset value used to determine the number of the time-frequency resource element(s) comprised in the first reserved resource pool among the two different offset values is a minimum offset value related to the multiple different offset value configurations corresponding to the value determined by the signaling group among the multiple different offset values.

In one subembodiment of the above embodiment, the multiple different offset values related to the multiple different offset value configurations corresponding to the value determined by the signaling group comprise an offset value in the first offset value set.

In one subembodiment of the above embodiment, the multiple different offset values related to the multiple different offset value configurations corresponding to the value determined by the signaling group comprise an offset value in the second offset value set.

In one embodiment, the offset value index in the present application respectively corresponds to the offset value in the present application.

In one embodiment, multiple values determined by a signaling group corresponds to multiple different offset values related to multiple different offset value configurations.

In one subembodiment of the above embodiment, the meaning of the phrase that multiple values determined by a signaling group respectively correspond to multiple different offset values related to multiple different offset value configurations comprises; the multiple values determined by the signaling group respectively correspond to different offset values in the multiple different offset value configurations based on a mapping relation.

In one subembodiment of the above embodiment, the meaning of the phrase that multiple values determined by a signaling group respectively correspond to multiple different offset values related to multiple different offset value configurations comprises: the multiple values determined by the signaling group respectively correspond to different offset value indexes in the multiple different offset value configurations based on a mapping relation.

In one subembodiment of the above embodiment, the meaning of the phrase that multiple values determined by a signaling group respectively correspond to multiple different offset values related to multiple different offset value configurations comprises: the multiple values determined by the signaling group correspond to at least two different offset values in multiple different offset value configurations based on a mapping relation.

In one subembodiment of the above embodiment, the meaning of the phrase that multiple values determined by a signaling group respectively correspond to multiple different offset values related to multiple different offset value configurations comprises: the multiple values determined by the signaling group correspond to at least two different offset value indexes in multiple different offset value configurations based on a mapping relation.

In one subembodiment of the above embodiment, the multiple different offset values related to the multiple different offset value configurations corresponding to the multiple values determined by the signaling group comprise two offset values greater than 0.

In one subembodiment of the above embodiment, when the first condition is not satisfied, the same offset value is one of the multiple different offset values related to the multiple different offset value configurations corresponding to the multiple values determined by the signaling group; when the first condition is satisfied, the two different offset values are two of the multiple different offset values related to the multiple different offset value configurations corresponding to the multiple values determined by the signaling group;

In one subembodiment of the above embodiment, when the first condition is satisfied, the two different offset values are two of the multiple different offset values related to the multiple different offset value configurations corresponding to the multiple values determined by the signaling group, an offset value used to determine the number of the time-frequency resource element(s) comprised in the first reserved resource pool among the two different offset values is a maximum offset value related to the multiple different offset value configurations corresponding to the multiple values determined by the signaling group among the multiple different offset values.

In one subembodiment of the above embodiment, when the first condition is satisfied, the two different offset values are two of the multiple different offset values related to the multiple different offset value configurations corresponding to the multiple values determined by the signaling group, an offset value used to determine the number of the time-frequency resource element(s) comprised in the first reserved resource pool among the two different offset values is a minimum offset value related to the multiple different offset value configurations corresponding to the multiple values determined by the signaling group among the multiple different offset values.

In one subembodiment of the above embodiment, the multiple different offset values related to the multiple different offset value configurations corresponding to the multiple values determined by the signaling group comprise an offset value in the first offset value set.

In one subembodiment of the above embodiment, the multiple different offset values related to the multiple different offset value configurations corresponding to the multiple values determined by the signaling group comprise an offset value in the second offset value set.

In one embodiment, a signaling group is used to determine multiple different offset values; when the first condition is not satisfied, the multiple different offset values determined by the signaling group comprise the same offset value; when the first condition is satisfied, the multiple different offset values determined by the signaling group comprise two different offset values.

In one embodiment, the signaling group in the present application comprises one or multiple signalings.

In one embodiment, the signaling group in the present application comprises the first signaling.

In one embodiment, the signaling group in the present application comprises a signaling other than the first signaling.

In one embodiment, the signaling group in the present application comprises and only comprises the first signaling.

In one embodiment, the signaling group in the present application indicates multiple different offset values.

In one embodiment, the signaling group in the present application indicates multiple different offset value indexes.

In one embodiment, a signaling in the signaling group in the present application comprises a DCI.

In one embodiment, a signaling in the signaling group in the present application comprises one of multiple fields in a DCI.

In one embodiment, a signaling in the signaling group in the present application comprises a higher-layer signaling.

In one embodiment, a signaling in the signaling group in the present application comprises one or multiple fields in a higher-layer signaling.

In one embodiment, a signaling in the signaling group in the present application comprises an RRC signaling.

In one embodiment, a signaling in the signaling group in the present application comprises a MAC CE signaling.

In one embodiment, a signaling in the signaling group in the present application comprises one or multiple fields in an RRC signaling.

In one embodiment, a signaling in the signaling group in the present application comprises one or multiple fields in a MAC CE signaling.

In one embodiment, a signaling in the signaling in the present application is used to activate a transmission of configured grant.

In one embodiment, a signaling in the signaling in the present application is used to activate a transmission of Type 1 configured grant.

In one embodiment, a signaling in the signaling in the present application is used to activate a transmission of Type 2 configured grant.

In one embodiment, the first signaling comprises a second field; a value of the second field in the first signaling corresponds to multiple different offset values related to multiple different offset value configurations.

In one subembodiment of the above embodiment, the meaning of the phrase that a value of the second field in the first signaling corresponds to multiple different offset values related to multiple different offset value configurations comprises: the value of the second field in the first signaling corresponds to different offset values in the multiple different offset value configurations based on a mapping relation.

In one subembodiment of the above embodiment, the meaning of the phrase that a value of the second field in the first signaling corresponds to multiple different offset values related to multiple different offset value configurations comprises: the value of the second field in the first signaling corresponds to different offset value indexes in the multiple different offset value configurations based on a mapping relation.

In one subembodiment of the above embodiment, the meaning of the phrase that a value of the second field in the first signaling corresponds to multiple different offset values related to multiple different offset value configurations comprises: the value of the second field in the first signaling corresponds to at least two different offset values in the multiple different offset value configurations based on a mapping relation.

In one subembodiment of the above embodiment, the meaning of the phrase that a value of the second field in the first signaling corresponds to multiple different offset values related to multiple different offset value configurations comprises: the value of the second field in the first signaling corresponds to at least two different offset value indexes in the multiple different offset value configurations based on a mapping relation.

In one subembodiment of the above embodiment, the meaning of the phrase that a value of the second field in the first signaling corresponds to multiple different offset values related to multiple different offset value configurations comprises: the multiple different offset value configurations comprise D different offset value configurations, for any two mutually-different positive integers r and t that are not greater than D, an offset value corresponding to the value of the second field in the first signaling based on a mapping relation in the r-th offset value configuration among the multiple different offset value configurations is different from an offset value corresponding to the value of the second field in the first signaling based on a mapping relation in the t-th offset value configuration among the multiple different offset value configurations; D is a positive integer greater than 1.

In one subembodiment of the above embodiment, the meaning of the phrase that a value of the second field in the first signaling corresponds to multiple different offset values related to multiple different offset value configurations comprises: the multiple different offset value configurations comprise D different offset value configurations, for any two mutually-different positive integers r and t that are not greater than D, an offset value index corresponding to the value of the second field in the first signaling based on a mapping relation in the r-th offset value configuration among the multiple different offset value configurations is different from an offset value index corresponding to the value of the second field in the first signaling based on a mapping relation in the t-th offset value configuration among the multiple different offset value configurations: D is a positive integer greater than 1.

In one subembodiment of the above embodiment, the meaning of the phrase that a value of the second field in the first signaling corresponds to multiple different offset values related to multiple different offset value configurations comprises: the multiple different offset value configurations comprise D different offset value configurations, there exist two mutually-different positive integers r and t that are not greater than D, an offset value corresponding to the value of the second field in the first signaling based on a mapping relation in the r-th offset value configuration among the multiple different offset value configurations is different from an offset value corresponding to the value of the second field in the first signaling based on a mapping relation in the t-th offset value configuration among the multiple different offset value configurations; D is a positive integer greater than 1.

In one subembodiment of the above embodiment, the meaning of the phrase that a value of the second field in the first signaling corresponds to multiple different offset values related to multiple different offset value configurations comprises: the multiple different offset value configurations comprise D different offset value configurations, there exist two mutually-different positive integers r and t that are not greater than D, an offset value index corresponding to the value of the second field in the first signaling based on a mapping relation in the r-th offset value configuration among the multiple different offset value configurations is different from an offset value index corresponding to the value of the second field in the first signaling based on a mapping relation in the t-th offset value configuration among the multiple different offset value configurations; D is a positive integer greater than 1.

In one subembodiment of the above embodiment, the multiple different offset values related to the multiple different offset value configurations corresponding to the value of the second field in the first signaling are all offset values greater than 0.

In one subembodiment of the above embodiment, the multiple different offset values related to the multiple different offset value configurations corresponding to the value of the second field in the first signaling at least comprise two offset values greater than 0.

In one subembodiment of the above embodiment, when the first condition is not satisfied, the same offset value is one of the multiple different offset values related to the multiple different offset value configurations corresponding to the value of the second field in the first signaling; when the first condition is satisfied, the two different offset values are two of the multiple different offset values related to the multiple different offset value configurations corresponding to the value of the second field in the first signaling.

In one subembodiment of the above embodiment, when the first condition is satisfied, the two different offset values are two of the multiple different offset values related to the multiple different offset value configurations corresponding to the value of the second field in the first signaling, an offset value used to determine the number of the time-frequency resource element(s) comprised in the first reserved resource pool among the two different offset values is a maximum offset value related to the multiple different offset value configurations corresponding to the value of the second field in the first signaling among the multiple different offset values.

In one subembodiment of the above embodiment, when the first condition is satisfied, the two different offset values are two of the multiple different offset values related to the multiple different offset value configurations corresponding to the value of the second field in the first signaling, an offset value used to determine the number of the time-frequency resource element(s) comprised in the first reserved resource pool among the two different offset values is a minimum offset value related to the multiple different offset value configurations corresponding to the value of the second field in the first signaling among the multiple different offset values.

In one subembodiment of the above embodiment, the multiple different offset values related to the multiple different offset value configurations corresponding to the value of the second field in the first signaling comprise an offset value in the first offset value set.

In one subembodiment of the above embodiment, the multiple different offset values related to the multiple different offset value configurations corresponding to the value of the second field in the first signaling comprise an offset value in the second offset value set.

In one embodiment, the second field is a beta_offset indicator field.

In one embodiment, a name of the second field comprises at least one of beta or offset.

In one embodiment, a value of the second field is equal to one of multiple values.

In one embodiment, a value of the second field is equal to 0 or 1.

In one embodiment, a value of the second field is equal to one of 00, 01, 10 or 11.

In one embodiment, a value of the second field is equal to one of 000, 001, 010, 011, 100, 101, 110 or 111.

In one embodiment, a value of the second field is equal to an integer from Q1 to Q2; Q1 is a non-negative integer, Q2 is a positive integer greater than Q1.

In one embodiment, the offset value configuration in the present application comprises a configuration related to the mapping method.

In one embodiment, the offset value configuration in the present application comprises part or all in a mapping table.

In one embodiment, a name of the offset value configuration in the present application comprises at least one of UCI or OnPUSCH.

In one embodiment, a name of the offset value configuration in the present application comprises at least one of beta or Offsets.

In one embodiment, the offset value configuration in the present application comprises part or all in UCI-OnPUSCH configuration.

In one embodiment, the offset value configuration in the present application comprises part or all a configuration whose name comprises UCI-OnPUSCH.

In one embodiment, the multiple different offset value configurations in the present application comprise:

part or all of multiple different UCI-OnPUSCH configurations.

In one embodiment, the multiple different offset value configurations in the present application comprise: part or all in multiple different betaOffsets configurations in a UCI-OnPUSCH configuration.

In one embodiment, the multiple different offset value configurations in the present application comprise: part or all in multiple different betaOffsets configurations in multiple different UCI-OnPUSCH configurations.

In one embodiment, the multiple different offset value configurations in the present application comprise: part of all of multiple different configurations whose name comprise UCI-OnPUSCH.

In one embodiment, the multiple different offset value configurations in the present application comprise: part or all of multiple different configurations whose name comprise betaOffsets in a configuration whose name comprises UCI-OnPUSCH.

In one embodiment, the multiple different offset value configurations in the present application comprise: part of all of multiple different configurations whose names comprise betaOffsets among multiple different configurations whose names comprise UCI-OnPUSCH.

In one embodiment, the first signaling is used to configure multiple different offset values.

In one subembodiment of the above embodiment, the first signaling configures multiple different offset values through configuring multiple different offset value indexes.

In one subembodiment of the above embodiment, the multiple different offset values configured by the first signaling comprise at least two offset values greater than 0.

In one subembodiment of the above embodiment, when the first condition is not satisfied, the same offset value is one of the multiple different offset values configured by the first signaling; when the first condition is satisfied, the two different offset value is two of the multiple different offset values configured by the first signaling.

In one subembodiment of the above embodiment, when the first condition is satisfied, the two different offset values are two of the multiple different offset values configured by the first signaling; an offset value used to determine the number of the time-frequency resource element(s) comprised in the first reserved resource pool in the two different offset values is a maximum offset value in the multiple different offset values configured by the first signaling.

In one subembodiment of the above embodiment, when the first condition is satisfied, the two different offset values are two of the multiple different offset values configured by the first signaling; an offset value used to determine the number of the time-frequency resource element(s) comprised in the first reserved resource pool in the two different offset values is a minimum offset value in the multiple different offset values configured by the first signaling.

In one embodiment, the first signaling is used to activate a transmission of Configured Grant.

In one embodiment, the first signaling is used to activate a transmission of Type 1 CG.

In one embodiment, the first signaling is used to activate a transmission of Type 2 CG.

In one embodiment, a signaling in a signaling group comprises D fields; for any two mutually-different positive integers r and t that are not greater than D, an offset value corresponding to the value of the r-th field in the D fields in the signaling in the signaling group based on a mapping relation in the r-th offset value configuration in the D different offset value configurations is different from an offset value corresponding to the value of the t-th field in the D fields in the signaling is the signaling group based on a mapping relation in the t-th offset value configuration in the D different offset value configurations; D is a positive integer greater than 1.

In one embodiment, a signaling in a signaling group comprises D fields; for any two mutually-different positive integers r and t that are not greater than D, an offset value index corresponding to the value of the r-th field in the D fields in the signaling in the signaling group based on a mapping relation in the r-th offset value configuration in the D different offset value configurations is different from an offset value index corresponding to the value of the t-th field in the D fields in the signaling is the signaling group based on a mapping relation in the t-th offset value configuration in the D different offset value configurations; D is a positive integer greater than 1.

In one embodiment, the signaling group in the present application comprises the D signalings in the present application.

In one embodiment, D signalings respectively comprise D fields; for any two mutually-different positive integers r and t that are not greater than D, an offset value corresponding to the value of one of the D fields comprised in the r-th signaling in the D signalings based on a mapping relation in the r-th offset value configuration in the D different offset value configurations is different from an offset value corresponding to the value of one of the D fields comprised in the t-th signaling in the D signalings based on a mapping relation in the t-th offset value configuration in the D different offset value configurations; D is a positive integer greater than 1.

In one embodiment, D signalings respectively comprise D fields; for any two mutually-different positive integers r and t that are not greater than D, an offset value index corresponding to the value of one of the D fields comprised in the r-th signaling in the D signalings based on a mapping relation in the r-th offset value configuration in the D different offset value configurations is different from an offset value index corresponding to the value of one of the D fields comprised in the t-th signaling in the D signalings based on a mapping relation in the t-th offset value configuration in the D different offset value configurations; D is a positive integer greater than 1.

In one embodiment, a signaling in a signaling group comprises D fields; there exist two mutually-different positive integers r and t that are not greater than D, an offset value corresponding to the value of the r-th field in the D fields in the signaling in the signaling group based on a mapping relation in the r-th offset value configuration in the D different offset value configurations is different from an offset value corresponding to the value of the t-th field in the D fields in the signaling in the signaling group based on a mapping relation in the t-th offset value configuration in the D different offset value configurations; D is a positive integer greater than 1.

In one embodiment, a signaling in a signaling group comprises D fields; there exist two mutually-different positive integers r and t that are not greater than D, an offset value index corresponding to the value of the r-th field in the D fields in the signaling in the signaling group based on a mapping relation in the r-th offset value configuration in the D different offset value configurations is different from an offset value index corresponding to the value of the t-th field in the D fields in the signaling in the signaling group based on a mapping relation in the t-th offset value configuration in the D different offset value configurations; D is a positive integer greater than 1.

In one embodiment, D signalings respectively comprise D fields; there exist two mutually-different positive integers r and t that are not greater than D, an offset value corresponding to the value of one of the D fields comprised in the r-th signaling in the D signalings based on a mapping relation in the r-th offset value configuration in the D different offset value configurations is different from an offset value corresponding to the value of one of the D fields comprised in the t-th signaling in the D signalings based on a mapping relation in the t-th offset value configuration in the D different offset value configurations; D is a positive integer greater than 1.

In one embodiment, D signalings respectively comprise D fields; there exist two mutually-different positive integers r and t that are not greater than D, an offset value index corresponding to the value of one of the D fields comprised in the r-th signaling in the D signalings based on a mapping relation in the r-th offset value configuration in the D different offset value configurations is different from an offset value index corresponding to the value of one of the D fields comprised in the t-th signaling in the D signalings based on a mapping relation in the t-th offset value configuration in the D different offset value configurations; D is a positive integer greater than 1.

In one embodiment, the D signalings respectively comprise D DCIs.

In one embodiment, the D signalings respectively comprise one or multiple fields in D DCIs.

In one embodiment, one of the D signalings comprises a DCI.

In one embodiment, one of the D signalings comprises one or multiple fields in a DCI.

In one embodiment, one of the D signalings comprises a higher-layer signaling.

In one embodiment, one of the D signalings comprises one or multiple fields in a higher-layer signaling.

In one embodiment, one of the D signalings comprises an RRC signaling.

In one embodiment, one of the D signalings comprises a MAC CE signaling.

In one embodiment, one of the D signalings comprises one or multiple fields in an RRC signaling.

In one embodiment, one of the D signalings comprises one or multiple fields in a MAC CE signaling.

In one embodiment, one of the D signalings is used to activate a transmission of a configured grant.

In one embodiment, one of the D signalings is used to activate a transmission of Type 1 configured grant.

In one embodiment, one of the D signalings is used to activate a transmission of Type 2 configured grant.

In one embodiment, a value of one of the D fields is equal to one of multiple values.

In one embodiment, a value of one of the D fields is equal to one of 0 or 1.

In one embodiment, a value of one of the D fields is equal to one of 00, 01, 10 or 11.

In one embodiment, a value of one of the D fields is equal to one of 000, 001, 010, 011, 100, 101, 110 or 111.

In one embodiment, a value of one of the D fields is equal to an integer between Q1 and Q2; Q1 is a non-negative integer, Q2 is a positive integer greater than Q1.

In one embodiment, CG-UCI-OnPUSCH is configured as dynamic.

In one embodiment, CG-UCI-OnPUSCH is configured as semiStatic.

In one embodiment, the offset value configuration in the present application comprises an offset value element set.

In one embodiment, the offset value configuration in the present application comprises an offset value index set.

In one embodiment, the offset value configuration in the present application comprises an offset value index set corresponding to an offset value element set.

In one embodiment, the offset value configuration in the present application comprises a configuration of an offset value element set.

In one embodiment, the offset value configuration in the present application comprises a configuration of an offset value index set.

In one embodiment, the offset value configuration in the present application comprises a configuration of an offset value index set corresponding to an offset value element set.

In one embodiment, the first signaling is used to determine multiple different offset values; when the first condition is not satisfied, the multiple different offset value determined by the first signaling comprises the same offset value; when the first condition is satisfied, the multiple different offset values determined by the first signaling comprise two different offset values.

In one embodiment, the first signaling indicates multiple different offset values.

In one embodiment, the first signaling indicates multiple different offset values in multiple different offset value element sets.

In one embodiment, the first signaling indicates multiple different offset value indexes.

In one embodiment, the first signaling indicates that multiple different offset value element sets respectively correspond to multiple different offset value indexes in multiple different offset value index sets.

In one embodiment, the offset value element set in the present application corresponds to an offset value index set.

In one embodiment, there exists a one-to-one mapping relation between the offset value element set in the present application and an offset value index set.

In one embodiment, the offset value index set in the present application comprises multiple offset value indexes.

In one embodiment, a number of offset value indexes comprised in the offset value index set in the present application is not greater than 32.

In one embodiment, the offset value index set in the present application comprises 2 or 4 offset value indexes.

In one embodiment, the offset value index set in the present application is an index set related to BetaOffsets configuration.

In one embodiment, the offset value index set in the present application is an index set corresponding to a betaOffsetACK-Index1 field.

In one embodiment, the offset value element set in the present application is a set comprising multiple offset values.

In one embodiment, the offset value set in the present application comprises multiple offset values.

In one embodiment, a number of offset value(s) comprised in the offset value element set in the present application is not greater than 32.

In one embodiment, the offset value element set in the present application comprises 2 or 4 offset values.

In one embodiment, the offset value element set in the present application comprises multiple offset values respectively corresponding to multiple offset value indexes in an offset value index set.

In one embodiment, the offset value element set in the present application is configured by a higher-layer signaling.

In one embodiment, the offset value element set in the present application is configured by an RRC signaling.

In one embodiment, the two different offset values in the present application comprises: (according to corresponding offset value indexes) an offset value determined from an offset value element set and the other offset value determined from the other offset value element set.

In one embodiment, the offset value in the present application is an offset value used for HARQ-ACK information.

In one embodiment, an offset value comprised in the offset value element set in the present application is an offset value used for HARQ-ACK information.

In one embodiment, a second field in a signaling indicates an index of the offset value in the present application in the offset value index set in the present application In one subembodiment of the above embodiment, the signaling is the first signaling.

In one subembodiment of the above embodiment, the first signaling is a DCI.

In one subembodiment of the above embodiment, the signaling comprises one or multiple fields in a DCI.

In one subembodiment of the above embodiment, the second field is a beta_offset indicator field.

In one subembodiment of the above embodiment, a name of the second field comprises at least one of beta or offset.

In one embodiment, in the present application, the number of the time-frequency resource element(s) comprised in the first reserved resource pool is less than each resource number in D resource numbers comprised in a first resource number group, and the D resource numbers in the first resource number group are respectively related to D parameters comprised in a first parameter set; D is a positive integer greater than 1.

In one subembodiment of the above embodiment, the D parameters in the first parameter set respectively correspond to the D different offset value configurations in the present application.

In one subembodiment of the above embodiment, the D parameters in the first parameter set are respectively configured in the D different offset value configurations in the present application.

In one subembodiment of the above embodiment, the D parameters in the first parameter set are respectively configured in D configurations whose names comprise UCI-OnPUSCH; the D different offset value configurations in the present application are respectively configured in D configurations whose names comprise UCI-OnPUSCH.

In one subembodiment of the above embodiment, the D parameters in the first parameter set are scaling parameters configured by a higher-layer signaling.

In one subembodiment of the above embodiment, the D parameters in the first parameter set are scaling parameters configured by an RRC signaling.

In one subembodiment of the above embodiment, the D resource numbers in the first resource number set are respectively equal to a value of the D parameters in the first parameter set multiplied by a resource amount and then rounded up to an integer, the resource amount is equal to a number of time-frequency resource element(s) that can be used for UCI transmission on one or multiple multicarrier symbols.

Embodiment 5B

Embodiment 5B illustrates a flowchart of radio signal transmission according to one embodiment in the present application, as shown in FIG. 5. In FIG. 5, a first node U1A and a second node U2A are in communications via an air interface.

The first node U1A receives a first signaling in step S511A; transmits a first signal in a first time-frequency resource pool in step S512A.

The second node U2A transmits a first signaling in step S521A; receives a first signal in a first time-frequency resource pool in step S522A.

In embodiment 5B, the first signal carries a first bit block and a second bit block; the first signaling is used to determine the first time-frequency resource pool; the second bit block comprises a TB, and the first bit block comprises at least one of a first-type HARQ-ACK or a second-type HARQ-ACK; a number of HARQ-ACK bit(s) comprised in the first bit block and type(s) of HARQ-ACK comprised in the first bit block are used together to determine a number of time-frequency resource element(s) comprised in a first reserved resource pool, and the number of the time-frequency resource element(s) comprised in the first reserved resource pool is a non-negative integer; a target coded bit sequence output through a first procedure is related to the number of the time-frequency resource element(s) comprised in the first reserved resource pool, both the first bit block and the second bit block are used to determine the target coded bit sequence, and modulation symbols generated by the target coded bit sequence are transmitted in the first time-frequency resource pool; the first bit block generates a first coded bit sequence, and the second bit block generates a second coded bit sequence; the first coded bit sequence and the second coded bit sequence are used as input to execute the first procedure to obtain the target coded bit sequence; the first procedure comprises at least two of a first sub-procedure, a second sub-procedure or a third sub-procedure; when the number of the time-frequency resource element(s) comprised in the first reserved resource pool is equal to 0, the first procedure comprises a first sub-procedure and a second sub-procedure, the first coded bit sequence is used as an input to execute the first sub-procedure in the first procedure, the second coded bit sequence is used as an input to execute the second sub-procedure in the first procedure, and the first sub-procedure in the first procedure is executed before the second sub-procedure in the first procedure; when the number of the time-frequency resource element(s) comprised in the first reserved resource pool is greater than 0, the first procedure comprises a second sub-procedure and a third sub-procedure, the second coded bit sequence is used as an input to execute the second sub-procedure in the first procedure, the first coded bit sequence used as an input is used to execute the third sub-procedure in the first procedure, and the third sub-procedure in the first procedure is executed after the second sub-procedure in the first procedure; a first number threshold is related to a type of HARQ-ACK comprised in the first bit block; a first condition is a condition related to type(s) of HARQ-ACK(s) comprised in the first bit block; when the first condition is satisfied, the first number threshold is equal to a first number; when the first condition is not satisfied, the first number threshold is equal to a number different from the first number; a magnitude relation between a number of HARQ-ACK bit(s) comprised in the first bit block and the first number threshold is used to determine the number of the time-frequency resource element(s) comprised in the first reserved resource pool; a first condition set comprises multiple mutually-exclusive conditions; there exist two conditions in the first condition set, a first number threshold determined when one of the two conditions in the first condition set is satisfied is not equal to a first number threshold determined when the other of the two conditions in the first condition set is satisfied; all conditions in the first condition set are conditions related to a type of HARQ-ACK comprised in the first bit block; when a number of HARQ-ACK bit(s) comprised in the first bit block is not greater than a first number threshold, the number of the time-frequency resource element(s) comprised in the first reserved resource pool is greater than 0; when a number of HARQ-ACK bit(s) comprised in the first bit block is greater than a first number threshold, the number of the time-frequency resource element(s) comprised in the first reserved resource pool is equal to 0; a first radio resource pool is reserved for at least one bit sub-block comprised in the first bit block; the first radio resource pool overlaps with the first time-frequency resource pool in time domain.

In one subembodiment of embodiment 5B, when the number of the time-frequency resource element(s) comprised in the first reserved resource pool is greater than 0, a modulation symbol generated by the first bit block is transmitted in the first reserved resource pool, and code rate of the second bit block is unrelated to a number of bit(s) comprised in the first bit block; when the number of the time-frequency resource element(s) comprised in the first reserved resource pool is equal to 0, a number of bit(s) comprised in the first bit block is used to determine code rate of the second bit block.

In one embodiment, the first node U1B is the first node in the present application.

In one embodiment, the second node U2A is the second node in the present application.

In one embodiment, the first node U1A is a UE.

In one embodiment, the second node U2A is a base station.

In one embodiment, the second node U2A is a UE.

In one embodiment, an air interface between the second node U2A and the first node U1A is a Uu interface.

In one embodiment, an air interface between the second node U2A and the first node ULA comprises a cellular link.

In one embodiment, an air interface between the second node U2A and the first node U1A is a PC5 interface.

In one embodiment, an air interface between the second node U2A and the first node U1A comprises sidelink link.

In one embodiment, an air interface between the second node U2A and the first node U1A comprises a radio interface between a base station and a UE.

In one embodiment, the first reserved resource pool is determined on the basis that the number of the time-frequency resource element(s) comprised in the first reserved resource pool is determined first.

In one embodiment, the reserved resource pool comprises: time-frequency resources reserved for a potential HARQ-ACK transmission; the first reserved resource pool is determined based on the description in section 6.2.7 of 3GPP TS38.212.

In one embodiment, the first signaling comprises a field whose name comprises UCI-OnPUSCH.

In one embodiment, the first signaling comprises a second field; a name of the second field comprises at least one of beta or offset.

In one embodiment, a second field in the first signaling is used to indicate one or multiple offset value indexes in the present application.

In one embodiment, the second field is a beta_offset indicator field.

In one embodiment, a value of the second field is equal to one of multiple values.

In one embodiment, a value of the second field is equal to 0 or 1.

In one embodiment, a value of the second field is equal to one of 00, 01, 10 or 11.

In one embodiment, a value of the second field is equal to one of 000, 001, 010, 011, 100, 101, 110 or 111.

In one embodiment, a value of the second field is equal to an integer from Q1 to Q2; Q1 is a non-negative integer, Q2 is a positive integer greater than Q1.

In one embodiment, English names in the present application are not case-sensitive.

In one embodiment, the first signaling is used to activate a transmission of Configured Grant.

In one embodiment, the first signaling is used to activate a transmission of Type 1 CG.

In one embodiment, the first signaling is used to activate a transmission of Type 2 CG.

In one embodiment, CG-UCI-OnPUSCH is configured as dynamic.

In one embodiment, CG-UCI-OnPUSCH is configured as semiStatic.

In one embodiment, the number of the time-frequency resource element(s) comprised in the first reserved resource pool is less than each resource number in multiple resource numbers comprised in a first resource number group, and the multiple resource numbers in the first resource number group are respectively related to multiple parameters comprised in a first parameter set.

In one subembodiment of the above embodiment, the multiple parameters in the first parameter set respectively correspond to the multiple offset value index sets in the present application.

In one subembodiment of the above embodiment, the multiple parameters in the first parameter set are respectively configured in multiple configurations whose names comprise UCI-OnPUSCH; the multiple offset value index sets in the present application are respectively configured in the multiple configurations whose names comprise UCI-OnPUSCH.

In one subembodiment of the above embodiment, the multiple parameters in the first parameter set are scaling parameters configured by a higher-layer signaling.

In one subembodiment of the above embodiment, the multiple parameters in the first parameter set are scaling parameters configured by an RRC signaling.

In one subembodiment of the above embodiment, the multiple resource numbers in the first resource number set are respectively equal to a value of the multiple parameters in the first parameter set multiplied by a resource amount and then rounded up to an integer; the resource amount is equal to a number of time-frequency resource element(s) that can be used for UCI transmission on one or multiple multicarrier symbols.

Embodiment 6A

Figures 6A, 6B, 7A:
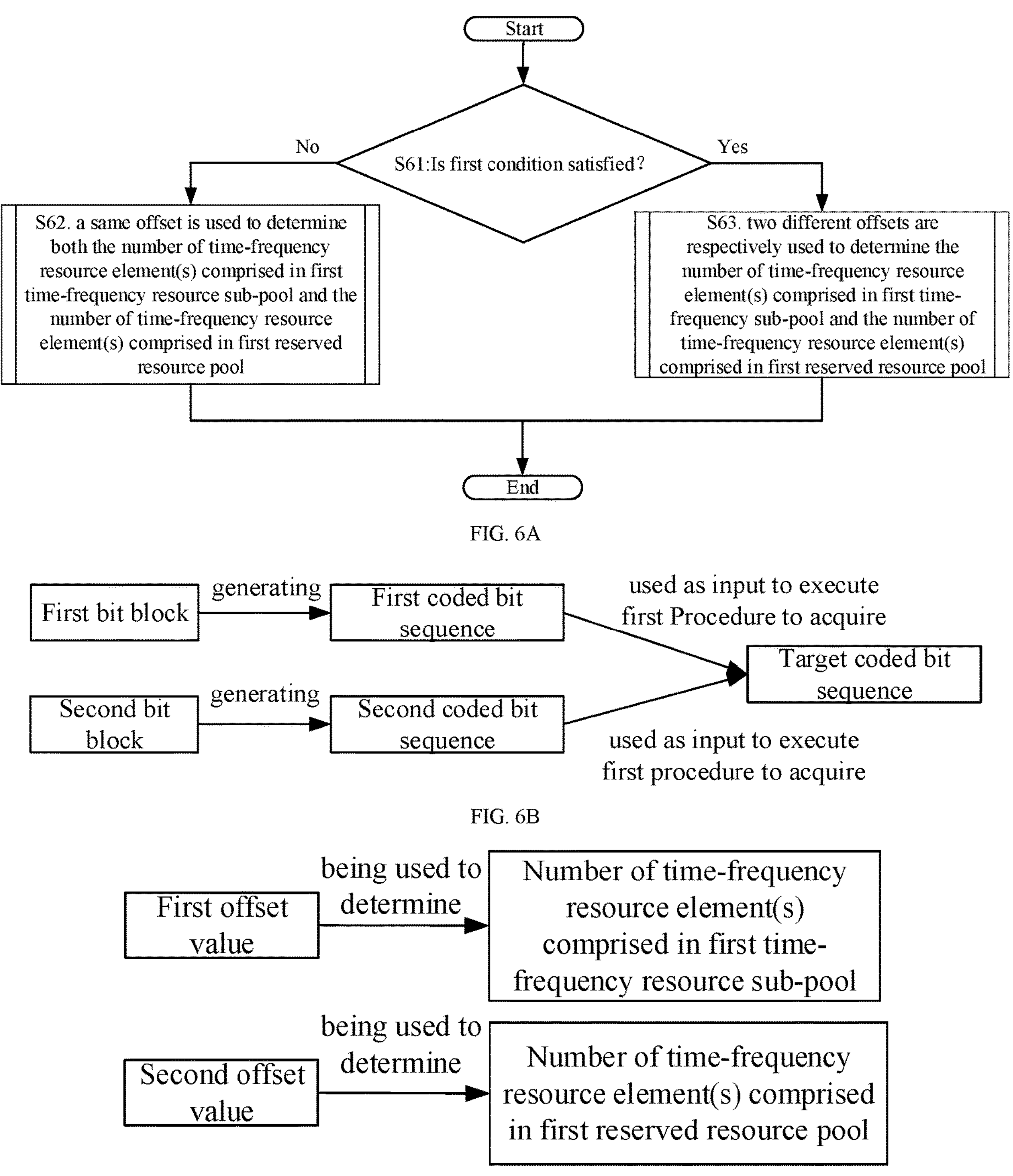
FIG. 6A illustrates a schematic diagram of judging how to determine a number of time-frequency resource element(s) comprised in a first time-frequency resource sub-pool and a number of time-frequency resource element(s) comprised in a first reserved resource pool according to one embodiment of the present application.
FIG. 6B illustrates a schematic diagram of relations among a first bit block, a first coded bit sequence, a second bit block, a second coded bit sequence and a target coded bit sequence according to one embodiment of the present application.
FIG. 7A illustrates a schematic diagram of a relation between a first offset value and a number of time-frequency resource element(s) comprised in a first time-frequency resource sub-pool as well as a relation between a second offset value and a number of time-frequency resource element(s) comprised in a first reserved resource pool according to one embodiment of the present application.

Embodiment 6A illustrates a schematic diagram of the procedure of judging how to determine a number of time-frequency resource element(s) comprised in a first time-frequency resource sub-pool and a number of time-frequency resource element(s) comprised in a first reserved resource pool according to one embodiment of the present application, as shown in FIG. 6A.

In embodiment 6A, the first node in the present application judges whether a first condition is satisfied in step S61; if yes, enters in to step S63 to determine: two different offset values are respectively used to determine a number of time-frequency resource element(s) comprised in a first time-frequency resource sub-pool and a number of time-frequency resource element(s) comprised in a first reserved resource pool; otherwise, enters into step S62 to determine: a same offset value is used to determine both a number of time-frequency resource element(s) comprised in a first time-frequency resource sub-pool and a number of time-frequency resource element(s) comprised in a first reserved resource pool.

In one subembodiment of embodiment 6A, when the first condition is satisfied: one of the two different offset values is used to determine the number of time-frequency resource element(s) comprised in the first time-frequency resource sub-pool, and the other of the two different offset values is used to determine the number of the time-frequency resource element(s) comprised in the first reserved resource pool.

In one embodiment, when the first condition is satisfied: one of two different offset values is used to determine the number of time-frequency resource element(s) comprised in the first time-frequency resource sub-pool, and the other of the two different offset values is used to determine the number of the time-frequency resource element(s) comprised in the first reserved resource pool.

In one embodiment, the first condition is satisfied; one of two different offset values is used to determine the number of time-frequency resource element(s) comprised in the first time-frequency resource sub-pool, and the other of the two different offset values is used to determine the number of the time-frequency resource element(s) comprised in the first reserved resource pool; the offset value in the two different offset values is used to or is not used to determine the number of the time-frequency resource element(s) comprised in the first reserved resource pool, and the other of the two different offset values is not used to determine the number of the time-frequency resource element(s) comprised in the first time-frequency resource sub-pool.

In one subembodiment of the above embodiment, in the procedure of executing a calculation to determine the number of the time-frequency resource element(s) comprised in the first time-frequency resource sub-pool, the offset value in the two different offset values is used as an input.

In one subembodiment of the above embodiment, in the procedure of executing a calculation to determine the number of the time-frequency resource element(s) comprised in the first reserved resource pool, the other of the two different offset values is used as an input.

In one embodiment, the first condition is not satisfied; a first intermediate quantity is used to determine the number of the time-frequency resource element(s) comprised in the first time-frequency resource sub-pool; the first intermediate quantity is linearly associated with the same offset value.

In one embodiment, the first condition is not satisfied; the number of the time-frequency resource element(s) comprised in the first time-frequency resource sub-pool is equal to a result after a first intermediate quantity is rounded up to an integer; the first intermediate quantity is linearly associated with the same offset value.

In one embodiment, the first condition is not satisfied; the number of the time-frequency resource element(s) comprised in the first time-frequency resource sub-pool is equal to a minimum value between a result after a first intermediate quantity is rounded up to an integer and a result after a second intermediate quantity is rounded up to an integer; the first intermediate quantity is linearly associated with the same offset value.

In one embodiment, the first intermediate quantity is equal to a first bit size (number of bit(s) multiplied by the same offset value multiplied by a first resource amount divided by the first payload amount.

In one embodiment, the first intermediate quantity is equal to a first bit size (number of bit(s)) multiplied by the same offset value divided by first code rate divided by a first modulation order.

In one embodiment, the first condition is not satisfied; the number of the time-frequency resource element(s) comprised in the first time-frequency resource sub-pool is equal to a minimum value between a result after a first intermediate quantity is rounded up to an integer and a result after a second intermediate quantity is rounded up to an integer; the first intermediate quantity is equal to a first bit size (number of bit(s)) multiplied by the same offset value multiplied by a first resource amount divided by the first payload amount.

In one embodiment, the first bit size (number of bit(s)) in the present application is equal to K.

In one embodiment, the first bit size (number of bit(s)) in the present application is equal to K plus a number of CRC bit(s).

In one embodiment, the first resource amount in the present application is equal to a number of time-frequency resource element(s) that can be used for UCI transmission on one or multiple multicarrier symbols.

In one embodiment, the first payload amount in the present application is equal to a payload size of uplink data.

In one embodiment, the first payload amount in the present application is equal to a number of bit(s) comprised in a UL-SCH transmitted on a first PUSCH.

In one embodiment, the first PUSCH in the present application is a PUSCH.

In one embodiment, the first time-frequency resource pool is reserved for the first PUSCH in the present application.

In one embodiment, the first time-frequency resource pool comprises time-frequency resources reserved for the first PUSCH in the present application.

In one embodiment, the first time-frequency resource pool comprises time-frequency resources occupied by the first PUSCH in the present application.

In one embodiment, the first condition is not satisfied; the number of the time-frequency resource element(s) comprised in the first time-frequency resource sub-pool is equal to a minimum value between a result after a first intermediate quantity is rounded up to an integer and a result after a second intermediate quantity is rounded up to an integer; the first intermediate quantity is equal to a first bit size (number of bit(s)) multiplied by the same offset value divided by first code rate divided by a first modulation order.

In one embodiment, the first code rate in the present application is a code rate of a first PUSCH.

In one embodiment, the first modulation order in the present application is a modulation order of a first PUSCH.

In one embodiment, the first signaling is used to determine the first code rate.

In one embodiment, the first signaling is used to determine the first modulation order.

In one embodiment, an MCS indicated by the first signaling is used to determine the first code rate.

In one embodiment, an MCS indicated by the first signaling is used to determine the first modulation order.

In one embodiment, the second intermediate quantity in the present application is equal to a first parameter multiplied by a second resource amount.

In one embodiment, the second intermediate quantity in the present application is linearly associated with a first parameter.

In one embodiment, the second resource amount in the present application is equal to a number of time-frequency resource element(s) that can be used for UCI transmission on one or multiple multicarrier symbols.

In one embodiment, the first parameter in the present application is configured by a higher-layer signaling.

In one embodiment, the first parameter in the present application is configured by a higher layer parameter scaling.

In one embodiment, the first condition is not satisfied; a third intermediate quantity is used to determine the number of the time-frequency resource element(s) comprised in the first reserved resource pool; the third intermediate quantity is linearly associated with the same offset value.

In one embodiment, the first condition is not satisfied; the number of the time-frequency resource element(s) comprised in the first reserved resource pool is equal to a result after a third intermediate quantity is rounded up to an integer; the third intermediate quantity is linearly associated with the same offset value.

In one embodiment, the first condition is not satisfied; the number of the time-frequency resource element(s) comprised in the first reserved resource pool is equal to a minimum value between a result after a third intermediate quantity is rounded up to an integer and a result after a fourth intermediate quantity is rounded up to an integer; the third intermediate quantity is linearly associated with the same offset value.

In one embodiment, the third intermediate quantity is equal to a second bit size (number of bit(s)) multiplied by the same offset value multiplied by a first resource amount divided by the first payload amount.

In one embodiment, the third intermediate quantity is equal to a second bit size (number of bit(s)) multiplied by the same offset value divided by first code rate divided by a first modulation order.

In one embodiment, the first condition is not satisfied; the number of the time-frequency resource element(s) comprised in the first reserved resource pool is equal to a minimum value between a result after a third intermediate quantity is rounded up to an integer and a result after a fourth intermediate quantity is rounded up to an integer; the third intermediate quantity is equal to a second bit size (number of bit(s)) multiplied by the same offset value multiplied by a first resource amount divided by the first payload amount.

In one embodiment, the first condition is not satisfied; the number of the time-frequency resource element(s) comprised in the first reserved resource pool is equal to a minimum value between a result after a third intermediate quantity is rounded up to an integer and a result after a fourth intermediate quantity is rounded up to an integer; the third intermediate quantity is equal to a second bit size (number of bit(s) multiplied by the same offset value divided by first code rate divided by a first modulation order.

In one embodiment, the fourth intermediate quantity in the present application is equal to the second intermediate quantity in the present application.

In one embodiment, the second bit size (number of bit(s)) in the present application is not less than K.

In one embodiment, the second bit size (number of bit(s)) in the present application is greater than K.

In one embodiment, the second bit size (number of bit(s)) in the present application is equal to 2.

In one embodiment, the second bit size (number of bit(s)) in the present application is equal to a default value.

In one embodiment, the second bit size (number of bit(s)) in the present application is equal to a value in a first number set, and the number set comprises multiple values.

In one subembodiment of the above embodiment, the number set is default.

In one subembodiment of the above embodiment, the number set is configured by a higher-layer signaling.

In one embodiment, the first condition is satisfied; one of two different offset values is used to determine the number of time-frequency resource element(s) comprised in the first time-frequency resource sub-pool, and the other of the two different offset values is used to determine the number of the time-frequency resource element(s) comprised in the first reserved resource pool; a fifth intermediate quantity is used to determine the number of the time-frequency resource element(s) comprised in the first time-frequency resource sub-pool, and the fifth intermediate quantity is linearly associated with one of the two different offset values; a seventh intermediate quantity is used to determine the number of the time-frequency resource element(s) comprised in the first reserved resource pool, and the seventh intermediate quantity is linearly associated with the other of the two different offset values.

In one embodiment, the first condition is satisfied; one of two different offset values is used to determine the number of time-frequency resource element(s) comprised in the first time-frequency resource sub-pool, and the other of the two different offset values is used to determine the number of the time-frequency resource element(s) comprised in the first reserved resource pool; the number of the time-frequency resource element(s) comprised in the first time-frequency resource sub-pool is equal to a result after a fifth intermediate quantity is rounded up to an integer, and the fifth intermediate quantity is linearly associated with one of the two different offset values; the number of the time-frequency resource element(s) comprised in the first reserved resource pool is equal to a result after a seventh intermediate quantity is rounded up to an integer, and the seventh intermediate quantity is linearly associated with the other of the two different offset values.

In one embodiment, the fifth intermediate quantity is equal to a fifth bit size (number of bit(s)) multiplied by the one of the two different offset values multiplied by a fifth resource amount divided by a fifth payload amount.

In one embodiment, the seventh intermediate quantity is equal to a seventh bit size (number of bit(s)) multiplied by the other one of the two different offset values multiplied by a fifth resource amount divided by a fifth payload amount.

In one embodiment, the fifth intermediate quantity is equal to a fifth bit size (number of bit(s)) multiplied by the one of the two different offset values divided by fifth code rate divided by a fifth modulation order.

In one embodiment, the seventh intermediate quantity is equal to a seventh bit size (number of bit(s)) multiplied by the other of the two different offset values divided by fifth code rate divided by a fifth modulation order.

In one embodiment, the first condition is satisfied: one of two different offset values is used to determine the number of time-frequency resource element(s) comprised in the first time-frequency resource sub-pool, and the other of the two different offset values is used to determine the number of the time-frequency resource element(s) comprised in the first reserved resource pool; the number of the time-frequency resource element(s) comprised in the first time-frequency resource sub-pool is equal to a minimum value between a result after a fifth intermediate quantity is rounded up to an integer and a result after a sixth intermediate quantity is rounded up to an integer, and the fifth intermediate quantity is linearly associated with one of the two different offset values; the number of the time-frequency resource element(s) comprised in the first reserved resource pool is equal to a minimum value between a result after a seventh intermediate quantity is rounded up to an integer and a result after a eighth intermediate quantity is rounded up to an integer, and the seventh intermediate quantity is linearly associated with the other of the two different offset values.

In one embodiment, the first condition is satisfied: one of two different offset values is used to determine the number of time-frequency resource element(s) comprised in the first time-frequency resource sub-pool, and the other of the two different offset values is used to determine the number of the time-frequency resource element(s) comprised in the first reserved resource pool; the number of the time-frequency resource element(s) comprised in the first time-frequency resource sub-pool is equal to a minimum value between a result after a fifth intermediate quantity is rounded up to an integer and a result after a sixth intermediate quantity is rounded up to an integer, and the fifth intermediate quantity is equal to the fifth bit size (number of bit(s) multiplied by the one of the two different offset values multiplied by the fifth resource amount divided by the fifth payload amount; the number of the time-frequency resource element(s) comprised in the first reserved resource pool is equal to a minimum value between a result after a seventh intermediate quantity is rounded up to an integer and a result after an eighth intermediate quantity is rounded up to an integer, and the seventh intermediate quantity is equal to a seventh bit size (number of bit(s)) multiplied by the other of the two different offset values multiplied by the fifth resource amount divided by the fifth payload amount.

In one embodiment, the first condition is satisfied; one of two different offset values is used to determine the number of time-frequency resource element(s) comprised in the first time-frequency resource sub-pool, and the other of the two different offset values is used to determine the number of the time-frequency resource element(s) comprised in the first reserved resource pool; the number of the time-frequency resource element(s) comprised in the first time-frequency resource sub-pool is equal to a minimum value between a result after a fifth intermediate quantity is rounded up to an integer and a result after a sixth intermediate quantity is rounded up to an integer, and the fifth intermediate quantity is equal to a fifth bit size (number of bit(s) multiplied by the one of the two different offset values divided by fifth code rate divided by a fifth modulation order; the number of the time-frequency resource element(s) comprised in the first reserved resource pool is equal to a minimum value between a result after a seventh intermediate quantity is rounded up to an integer and a result after a eighth intermediate quantity is rounded up to an integer, and the seventh intermediate quantity is equal to a seventh bit size (number of bit(s)) multiplied by the other of the two different offset values divided by the fifth code rate divided by the fifth modulation order.

In one embodiment, the fifth bit size (number of bit(s)) in the present application is equal to K.

In one embodiment, the fifth bit size (number of bit(s) in the present application is equal to K plus a number of CRC bit(s).

In one embodiment, the fifth bit size (number of bit(s)) in the present application is equal to the first bit size (number of bit(s)) in the present application.

In one embodiment, the fifth resource amount in the present application is equal to a number of time-frequency resource element(s) that can be used for UCI transmission on one or multiple multicarrier symbols.

In one embodiment, the fifth resource amount in the present application is equal to the first resource amount in the present application.

In one embodiment, the fifth payload amount in the present application is equal to a size of payload of uplink data.

In one embodiment, the fifth payload amount in the present application is equal to a number of bit(s) comprised in a UL-SCH transmitted on a first PUSCH.

In one embodiment, the fifth payload in the present application is equal to the first payload in the present application.

In one embodiment, the fifth code rate in the present application is code rate of a first PUSCH.

In one embodiment, the fifth modulation order in the present application is a modulation order of a first PUSCH.

In one embodiment, the first signaling is used to determine the fifth code rate.

In one embodiment, the first signaling is used to determine the fifth modulation order.

In one embodiment, an MCS indicated by the first signaling is used to determine the fifth code rate.

In one embodiment, an MCS indicated by the first signaling is used to determine the fifth modulation order.

In one embodiment, the fifth code rate in the present application is equal to the first code rate in the present application.

In one embodiment, the fifth modulation order in the present application is equal to the first modulation order in the present application.

In one embodiment, the sixth intermediate quantity in the present application is equal to a sixth parameter multiplied by a sixth resource amount.

In one embodiment, the sixth intermediate quantity in the present application is linearly associated with a sixth parameter.

In one embodiment, the sixth resource amount in the present application is equal to a number of time-frequency resource element(s) that can be used for UCI transmission on one or multiple multicarrier symbols.

In one embodiment, the sixth parameter in the present application is configured by a higher-layer signaling.

In one embodiment, the sixth parameter in the present application is configured by a higher-layer parameter scaling.

In one embodiment, the sixth intermediate quantity in the present application is equal to the second intermediate quantity in the present application.

In one embodiment, the sixth intermediate quantity in the present application is not equal to the second intermediate quantity in the present application.

In one embodiment, the sixth resource amount in the present application is equal to the second resource amount in the present application.

In one embodiment, the sixth parameter in the present application is equal to the first parameter in the present application.

In one embodiment, the sixth parameter in the present application is not equal to the first parameter in the present application.

In one embodiment, the sixth parameter in the present application and the first parameter in the present application respectively correspond to different scalings.

In one embodiment, the eighth intermediate quantity in the present application is equal to the sixth intermediate quantity in the present application.

In one embodiment, the eighth intermediate quantity in the present application is not equal to the sixth intermediate quantity in the present application.

In one embodiment, the eighth intermediate quantity in the present application is equal to an eighth parameter multiplied by a sixth resource amount.

In one embodiment, the eighth intermediate quantity in the present application is linearly associated with an eighth parameter.

In one embodiment, the eighth resource amount in the present application is equal to a number of time-frequency resource element(s) that can be used for UCI transmission on one of multiple multicarrier symbols.

In one embodiment, the eighth parameter in the present application is configured by a higher-layer signaling.

In one embodiment, the eighth parameter in the present application is configured by a higher layer parameter scaling.

In one embodiment, the eighth parameter in the present application is equal to the sixth parameter in the present application.

In one embodiment, the eighth parameter in the present application is not equal to the sixth parameter in the present application.

In one embodiment, the seventh bit size (number of bit(s)) in the present application is not less than K.

In one embodiment, the seventh bit size (number of bit(s)) in the present application is greater than K.

In one embodiment, the seventh bit size (number of bit(s)) in the present application is equal to 2.

In one embodiment, the seventh bit size (number of bit(s) in the present application is equal to a default value.

In one embodiment, the seventh bit size (number of bit(s)) in the present application is equal to a value in a number set, and the number set comprises multiple values.

In one subembodiment of the above embodiment, the number set is default.

In one subembodiment of the above embodiment, the number set is configured by a higher-layer signaling.

In one embodiment, the seventh bit size (number of bit(s)) in the present application is equal to the second bit size (number of bit(s)) in the present application.

In one embodiment, the seventh bit size (number of bit(s)) in the present application is not equal to the second bit size (number of bit(s)) in the present application.

Embodiment 6B

Embodiment 6B illustrates a schematic diagram of relations among a first bit block, a first coded bit sequence, a second bit block, a second coded bit sequence and a target coded bit sequence according to one embodiment of the present application, as shown in FIG. 6B.

In embodiment 6B, a first bit block generates a first coded bit sequence, and a second bit block generates a second coded bit sequence; the first coded bit sequence and the second coded bit sequence are used as input to execute a first procedure to acquire a target coded bit sequence.

In one embodiment, the first coded bit sequence comprises: an output after all or partial bits in the first bit block sequentially through part or all of CRC insertion, segmentation, code block-level CRC insertion, channel coding, rate matching and concatenation.

In one embodiment, the second coded bit sequence comprises: an output after all or partial bits in the second bit block sequentially through part or all of CRC insertion, segmentation, code block-level CRC insertion, channel coding, rate matching and concatenation.

In one embodiment, the first coded bit sequence comprises multiple bits.

In one embodiment, the first coded bit sequence comprises coded bit(s) of a HARQ-ACK.

In one embodiment, the second coded bit sequence comprises multiple bits.

In one embodiment, the second coded bit sequence comprises coded bit(s) of an Uplink Shared Channel (UL-SCH).

In one embodiment, the target coded bit sequence comprises multiple bits.

Embodiment 7A

Embodiment 7A illustrates a schematic diagram of a relation between a first offset value and a number of time-frequency resource element(s) comprised in a first time-frequency resource sub-pool as well as a relation between a second offset value and a number of time-frequency resource element(s) comprised in a first reserved resource pool according to one embodiment of the present application, as shown in FIG. 7A.

In embodiment 7A, the first condition in the present application is satisfied; a first offset value is used to determine a number of time-frequency resource element(s) comprised in a first time-frequency resource sub-pool, and a second offset value is used to determine a number of time-frequency resource element(s) comprised in a first reserved resource pool.

In one embodiment, the first offset value is not greater than the second offset value.

In one embodiment, a value of the first offset value is less than a value of the second offset value.

In one embodiment, when the first condition is satisfied: the second offset value is not used to determine the number of the time-frequency resource element(s) comprised in the first time-frequency resource sub-pool.

In one embodiment, when the first condition is satisfied: the number of the time-frequency resource element(s) comprised in the first time-frequency resource sub-pool is unrelated to the second offset value.

In one embodiment, the meaning of the expression that the second offset value is not used to determine the number of the time-frequency resource element(s) comprised in the first time-frequency resource sub-pool comprises: in the calculation procedure of determining the number of the time-frequency resource element(s) comprised in the first time-frequency resource sub-pool, the second offset value is not used.

Embodiment 7B

Figures 7B, 8A, 8B:
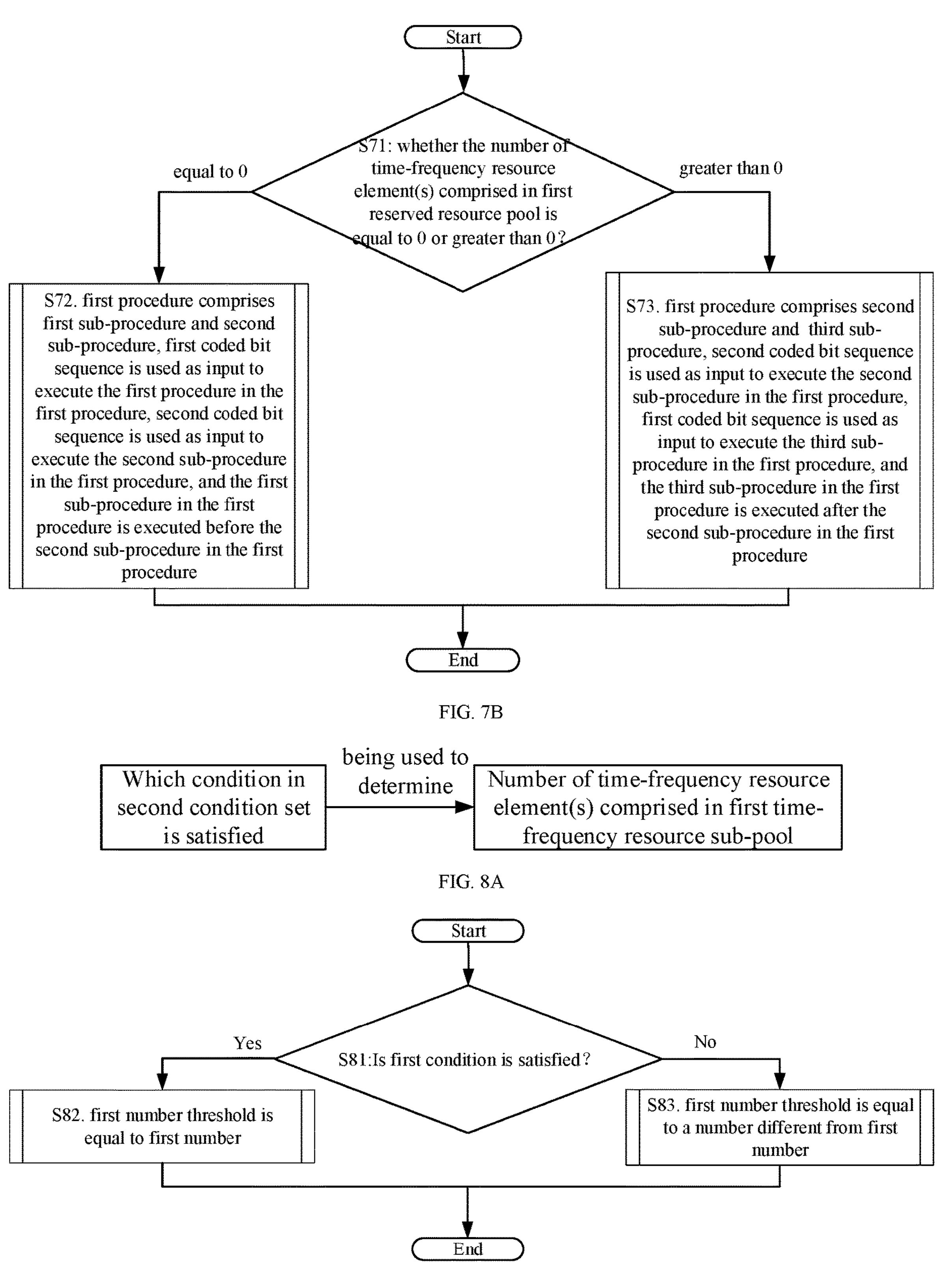
FIG. 7B illustrates a schematic diagram of a number of time-frequency resource element(s) comprised in a first reserved resource pool being used to determine a first procedure according to one embodiment of the present application.
FIG. 8A illustrates a schematic diagram of a relation between a second condition set and a number of time-frequency resource element(s) comprised in a first time-frequency resource sub-pool according to one embodiment in the present application.
FIG. 8B illustrates a schematic diagram of a procedure of a first condition being used to determine a first number threshold according to one embodiment of the present application.

Embodiment 7B illustrates a schematic diagram of a number of time-frequency resource element(s) comprised in a first reserved resource pool being used to determine a first procedure according to one embodiment of the present application, as shown in FIG. 7B.

In embodiment 7B, the first node in the present application judges whether a number of time-frequency resource element(s) comprised in a first reserved resource pool is equal to 0 or greater than 0 in step S71; if a result of a judgment is equal to 0, then determines in step S72: a first procedure comprises a first sub-procedure and a second sub-procedure, a first coded bit sequence used as an input is used to execute the first sub-procedure in the first procedure, a second coded bit sequence used as an input is used to execute the second sub-procedure in the first procedure, and the first sub-procedure in the first procedure is executed before the second sub-procedure in the first procedure; if a result of a judgment is greater than 0, then determines in step S73: a first procedure comprises a second sub-procedure and a third sub-procedure, a second coded bit sequence used as an input is used to execute the second sub-procedure in the first procedure, the first coded bit sequence used as an input is used to execute the third sub-procedure in the first procedure, and the third sub-procedure in the first procedure is executed after the second sub-procedure in the first procedure.

In one embodiment, the first procedure comprises only two of a first sub-procedure, a second sub-procedure or a third sub-procedure.

In one embodiment, the first procedure comprises a first sub-procedure, a second sub-procedure and a third sub-procedure.

In one embodiment, in the first procedure: only two of a first sub-procedure, a second sub-procedure or a third sub-procedure are executed.

In one embodiment, the meaning of a sub-procedure in a procedure in the present application not being executed comprises: the main body executing the procedure determines to skip steps in the sub-procedure in the procedure.

In one embodiment, the phrase that the first coded bit sequence used as an input is used to execute the first sub-procedure in the first procedure comprises: a corresponding input acquired after the first coded bit sequence is input the first sub-procedure in the first procedure.

In one embodiment, the phrase that the first coded bit sequence used as an input is used to execute the first sub-procedure in the first procedure comprises: at least part in an output after the first sub-procedure in the first procedure is executed is equal to part or all in the first coded bit sequence.

In one embodiment, the phrase that the second coded bit sequence is used as an input to execute the second sub-procedure in the first procedure comprises: a corresponding input acquired after the second coded bit sequence is input in the second sub-procedure in the first procedure.

In one embodiment, the phrase that the second coded bit sequence is used as an input to execute the second sub-procedure in the first procedure comprises: at least part in an output after the second sub-procedure in the first procedure is executed is equal to part or all in the second coded bit sequence.

In one embodiment, the phrase that the first coded bit sequence is used as an input to execute the third sub-procedure in the first procedure comprises: a corresponding input acquired after the first coded bit sequence is input in the third sub-procedure in the first procedure.

In one embodiment, the phrase that the first coded bit sequence is used as an input to execute the third sub-procedure in the first procedure comprises: at least part in an output after the third sub-procedure in the first procedure is executed is equal to part or all in the first coded bit sequence.

In one embodiment, the first sub-procedure comprises: all or partial bits in an input coded bit sequence are used to execute an assignment operation.

In one embodiment, the second sub-procedure comprises: all or partial bits in an input coded bit sequence are used to execute an assignment operation.

In one embodiment, the third sub-procedure comprises: all or partial bits in an input coded bit sequence are used to execute an assignment operation.

In one embodiment, the first sub-procedure comprises part of multiple steps of generating multiplexed data and control coded bit sequence in section 6.2.7 of 3GPP TS38.212.

In one embodiment, the second sub-procedure comprises part of multiple steps of generating multiplexed data and control coded bit sequence in section 6.2.7 of 3GPP TS38.212.

In one embodiment, the third sub-procedure comprises part of multiple steps of generating multiplexed data and control coded bit sequence in section 6.2.7 of 3GPP TS38.212.

In one embodiment, the first sub-procedure comprises part or all of Step 2 in multiple steps of generating multiplexed data and control coded bit sequence in section 6.2.7 of 3GPP TS38.212.

In one embodiment, the second sub-procedure comprises part or all of Step 4 in multiple steps of generating multiplexed data and control coded bit sequence in section 6.2.7 of 3GPP TS38.212.

In one embodiment, the third sub-procedure comprises part or all of Step 5 in multiple steps of generating multiplexed data and control coded bit sequence in section 6.2.7 of 3GPP TS38.212.

In one embodiment, the first procedure comprises a first sub-procedure, a second sub-procedure and a third sub-procedure; when the number of the time-frequency resource element(s) comprised in the first reserved resource pool is equal to 0, the first coded bit sequence used as an input is used to execute the first sub-procedure in the first procedure, the second coded bit sequence is used as an input to execute the second sub-procedure in the first procedure, steps in the third sub-procedure in the first procedure is not executed, and the first sub-procedure in the first procedure is executed before the second sub-procedure in the first procedure; when the number of the time-frequency resource element(s) comprised in the first reserved resource pool is greater than 0, steps in the first sub-procedure in the first procedure are not executed, the second coded bit sequence is used as an input to execute the second sub-procedure in the first procedure, the first coded bit sequence used as an input is used to execute the third sub-procedure in the first procedure, and the third sub-procedure in the first procedure is executed after the second sub-procedure in the first procedure.

Embodiment 8A

Embodiment 8A illustrates a schematic diagram of a relation between a second condition set and a number of time-frequency resource element(s) comprised in a first time-frequency resource sub-pool according to one embodiment in the present application, as shown in FIG. 8A.

In embodiment 8A, the first condition in the present application is satisfied; which condition in a second condition set is satisfied is used to determine a number of time-frequency resource element(s) comprised in a first time-frequency resource sub-pool.

In one subembodiment of embodiment 8A, the second condition set comprises N mutually-exclusive conditions, N being a positive integer greater than 1; a first offset value set comprises not less than the N mutually-different offset values, and a second offset value set comprises at least one offset value; for any positive integer j not greater than N, when the j-th condition in the second condition set is satisfied: the j-th offset value in the first offset value set is used to determine the number of the time-frequency resource element(s) comprised in the first time-frequency resource sub-pool, an offset value in the second compensation set different from the j-th offset value in the first offset value set is used to determine a number of time-frequency resource element(s) comprised in a first reserved resource pool.

In one embodiment, the first condition is satisfied; the second condition set comprises N mutually-exclusive conditions, and a first offset value set comprises N mutually-different offset values, N being a positive integer greater than 1; a second offset value set comprises at least one offset value; the N conditions in the second condition set respectively correspond to the N offset values in the first offset value set; when a condition in the second condition set is satisfied, an offset value in the first offset value set corresponding to the condition in the second condition set is used to determine the number of the time-frequency resource element(s) comprised in the first time-frequency resource sub-pool, and an offset value in the second offset value set different from the offset value in the first offset value set corresponding to the condition in the second condition set is used to determine a number of time-frequency resource element(s) comprised in a first reserved resource pool.

In one subembodiment of the above embodiment, a corresponding relation between the second condition set and the first offset value set is configured by a higher-layer signaling or is inferred based on a higher-layer signaling.

In one subembodiment of the above embodiment, a corresponding relation between the second condition set and the first offset value set is configured by an RRC signaling or is inferred based on an RRC signaling.

In one subembodiment of the above embodiment, a corresponding relation between the second condition set and the first offset value set is configured by a MAC CB signaling or is inferred based on a MAC CE signaling.

In one embodiment, each condition in the second condition set is a condition related to a type of HARQ-ACK comprised in the first bit block.

In one embodiment, there exists an offset value in the second offset value set being different from all offset values in the first offset value set.

In one embodiment, N is not greater than 2.

In one embodiment, N is greater than 2 and is not greater than 2 to the power of u, u is a positive integer greater than 1.

In one embodiment, a condition in the second condition set comprise: the first bit block comprises the second-type HARQ-ACK and the first bit block comprises the first-type HARQ-ACK.

In one embodiment, another condition in the second condition set comprise: the first bit block comprises the second-type HARQ-ACK and the first bit block does not comprise the first-type HARQ-ACK.

In one embodiment, the second condition set comprises two mutually-exclusive conditions; a first of the two mutually-exclusive conditions in the second condition set is: the first bit block comprises the first-type HARQ-ACK; a second of the two mutually-exclusive conditions in the second condition set is: the first bit block does not comprise the first-type HARQ-ACK.

In one embodiment, different offset values in the first offset value set are respectively different offset values configured by an RRC signaling.

In one embodiment, different offset values in the first offset value set are respectively different offset values configured by a MAC CE signaling.

In one embodiment, different offset values in the first offset value set are respectively different offset values configured by a higher-layer signaling.

In one embodiment, the first signaling respectively indicates indexes of different offset values in the first offset value set in multiple offset value index sets configured by a higher layer signaling.

In one embodiment, the first signaling respectively indicates indexes of different offset values in the first offset value set in multiple offset value index sets configured by an RRC signaling.

In one embodiment, the first signaling respectively indicates indexes of different offset values in the first offset value set in multiple offset value index sets configured by a MAC CE signaling.

In one embodiment, the second offset value set only comprises an offset value.

In one embodiment, the second offset value set comprises multiple offset values.

In one embodiment, an offset value in the second offset value set is an offset value configured by an RRC signaling.

In one embodiment, an offset value in the second offset value set is an offset value configured by a MAC CE signaling.

In one embodiment, an offset value in the second offset value set is an offset value configured by a higher-layer signaling.

In one embodiment, the first signaling indicates an index of an offset value in the second offset value set in an offset value index set configured by a higher-layer signaling.

In one embodiment, the first signaling indicates an index of an offset value in the second offset value set in an offset value index set configured by an RRC signaling.

In one embodiment, the first signaling indicates an index of an offset value in the second offset value set in an offset value index set configured by a MAC CE signaling.

Embodiment 8B

Embodiment 8B illustrates a schematic diagram of a procedure of a first condition being used to determine a first number threshold according to one embodiment of the present application, as shown in FIG. 8B.

In embodiment 8B, the first node in the present application judges whether a first condition is satisfied in step S81; if yes, enters into the step S82 to determine: a first number threshold is equal to a first number; otherwise, enters into the step S83 to determine: a first number threshold is equal to a number different from a first number.

In one embodiment, the first number is equal to 2.

In one embodiment, the first number is equal to a positive integer less than 1706.

In one embodiment, the first number is equal to a default positive integer.

In one embodiment, the first number is configured by a higher-layer signaling.

In one embodiment, the first number is configured by an RRC signaling.

In one embodiment, the first number is configured by a MAC CE signaling.

In one embodiment, the first number is related to an offset value related to a type of a HARQ-ACK comprised in the first bit block.

In one embodiment, the first number is determined through executing a calculation.

In one embodiment, the number different from the first number is equal to a positive integer less than 1706.

In one embodiment, the number different from the first number is equal to a default positive integer.

In one embodiment, the number different from the first number is configured by a higher-layer signaling.

In one embodiment, the number different from the first number is configured by an RRC signaling.

In one embodiment, the number different from the first number is configured by a MAC CE signaling.

In one embodiment, the number different from the first number is related to an offset value related to a type of a HARQ-ACK comprised in the first bit block.

In one embodiment, the number different from the first number is determined through executing calculation.

In one embodiment, the first condition comprises: the first bit block does not comprise the second-type HARQ-ACK.

In one embodiment, the first condition comprises: the first bit block comprising the second-type HARQ-ACK.

In one embodiment, the first condition comprises: the first bit block does not comprise the second-type HARQ-ACK and the first bit block comprises the first-type HARQ-ACK.

In one embodiment, the first condition comprises: the first bit block comprises the second-type HARQ-ACK and the first bit block comprises the first-type HARQ-ACK.

In one embodiment, the first condition comprises: the first bit block comprises the second-type HARQ-ACK and the first bit block does not comprise the first-type HARQ-ACK.

Embodiment 9A

Figure 9A:
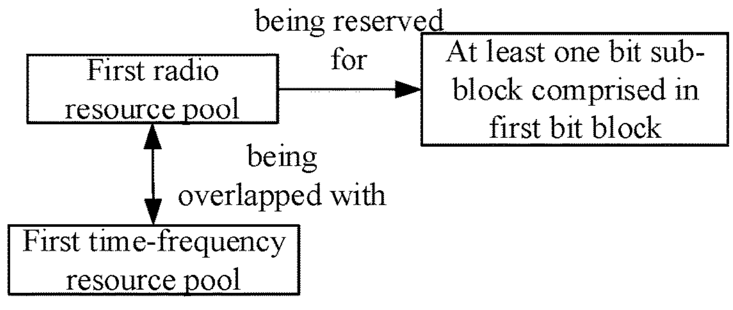
FIG. 9A illustrates a schematic diagram of relations among a first time-frequency resource pool, a first radio resource pool and a first bit block according to one embodiment of the present application.

Embodiment 9A illustrates a schematic diagram of relations among a first time-frequency resource pool, a first radio resource pool and a first bit block according to one embodiment of the present application, as shown in FIG. 9A.

In embodiment 9A, a first radio resource pool is reserved for at least one bit sub-block in a first bit block: the first radio resource pool overlaps with a first time-frequency resource pool in time domain.

In one embodiment, a number of bit sub-block(s) comprised in the first bit block is the same as a number of HARQ-ACK type(s) comprised in the first bit block.

In one embodiment, a number of HARQ-ACK type(s) comprised in each bit sub-block comprised in the first bit block is equal to 1.

In one embodiment, the phrase of being overlapped in time domain in the present application comprises: being overlapped in time domain, and being overlapped in frequency domain.

In one embodiment, the phrase of being overlapped in time domain in the present application comprises: being overlapped in time domain, and being overlapped and non-overlapped in frequency domain.

In one embodiment, the first radio resource pool comprises a positive integer number of time-frequency resource element(s) in time-frequency domain.

In one embodiment, the first radio resource pool comprises a positive integer number of Resource Element(s) (RE(s)) in time frequency domain.

In one embodiment, the first radio resource pool comprises a positive integer number of subcarrier(s) in frequency domain.

In one embodiment, the first radio resource pool comprises a positive integer number of PRB(s) in frequency domain.

In one embodiment, the first radio resource pool comprises a positive integer number of RB(s) in frequency domain.

In one embodiment, the first radio resource pool comprises a positive integer number of multi-carrier symbol(s) in time domain.

In one embodiment, the first radio resource pool comprises a positive integer number of slot(s) in time domain.

In one embodiment, the first radio resource pool comprises a positive integer number of sub-slot(s) in time domain.

In one embodiment, the first radio resource pool comprises a positive integer number of ms(s) in time domain.

In one embodiment, the first radio resource pool comprises a positive integer number of continuous multi-carrier symbol(s) in time domain.

In one embodiment, the first radio resource pool comprises a positive integer number of discontinuous slot(s) in time domain.

In one embodiment, the first radio resource pool comprises a positive integer number of continuous slot(s) in time domain.

In one embodiment, the first radio resource pool comprises a positive integer number of sub-frame(s) in time domain.

In one embodiment, the first radio resource pool is configured by a physical-layer signaling.

In one embodiment, the first radio resource pool is configured by a higher-layer signaling.

In one embodiment, the first radio resource pool is configured by a Radio Resource Control (RRC) signaling.

In one embodiment, the first radio resource pool is configured by a Medium Access Control layer Control Element (MAC CE) signaling.

In one embodiment, the first radio resource pool is reserved for a Physical Uplink Control CHannel (PUCCH).

In one embodiment, the first radio resource pool comprises radio resources reserved for a PUCCH.

In one embodiment, the first radio resource pool comprises radio resources occupied by a PUCCH.

In one embodiment, the first radio resource pool comprises a PUCCH resource.

In one embodiment, the first radio resource pool comprises a PUCCH resource in a PUCCH resource set.

In one embodiment, when the first bit block comprises only one of the first-type HARQ-ACK or the second HARQ-ACK: the first radio resource pool is reserved for the first bit block; when the first bit block comprises the first-type HARQ-ACK and the second-type HARQ-ACK: the first bit block comprises a first bit sub-block and a second bit sub-block, the first bit sub-block comprises the first-type HARQ-ACK, the second bit sub-block comprises the second-type HARQ-ACK, and the first radio resource pool is reserved for at least one of the first bit sub-block or the second bit sub-block.

Embodiment 9B

Figure 9B:
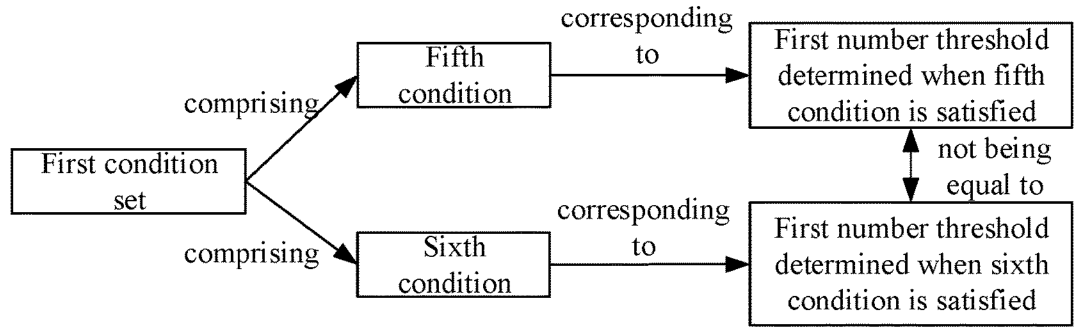
FIG. 9B illustrates a schematic diagram of relations among a first condition set, a fifth condition, a sixth condition and a first number threshold according to one embodiment of the present application.

Embodiment 9B illustrates a schematic diagram of relations among a first condition set, a fifth condition, a sixth condition and a first number threshold according to one embodiment of the present application, as shown in FIG. 9B.

In embodiment 9B, a first condition set comprises a fifth condition and a sixth condition; a first number threshold determined when the fifth condition is satisfied is not equal to a first number threshold determined when the sixth condition is satisfied.

In one embodiment, a first condition set comprises multiple mutually-exclusive conditions; for any two conditions in the first condition set: a first number threshold determined when one of the any two conditions in the first condition set is not equal to a first number threshold determined when the other of the any two conditions in the first condition set is satisfied; all conditions in the first condition set are conditions related to a type of HARQ-ACK comprised in the first bit block.

In one embodiment, the first condition set comprises the first condition in the present application.

In one embodiment, a condition in the first condition set comprise: the first bit block does not comprise the second-type HARQ-ACK.

In one embodiment, a condition in the first condition set comprise: the first bit block comprises the second-type HARQ-ACK.

In one embodiment, a condition in the first condition set comprise: the first bit block does not comprise the second-type HARQ-ACK and the first bit block comprises the first-type HARQ-ACK.

In one embodiment, a condition in the first condition set comprise: the first bit block comprises the second-type HARQ-ACK and the first bit block comprises the first-type HARQ-ACK.

In one embodiment, a condition in the first condition set comprise; the first bit block comprises the second-type HARQ-ACK and the first bit block does not comprise the first-type HARQ-ACK.

In one embodiment, a corresponding relation between a condition in the first condition set and the first number threshold determined when the condition in the first condition set is satisfied is default.

In one embodiment, a corresponding relation between a condition in the first condition set and the first number threshold determined when the condition in the first condition set is satisfied is configured by a higher-layer signaling.

In one embodiment, a corresponding relation between a condition in the first condition set and the first number threshold determined when the condition in the first condition set is satisfied is configured by an RRC signaling.

In one embodiment, a corresponding relation between a condition in the first condition set and the first number threshold determined when the condition in the first condition set is satisfied is configured by a MAC CE signaling.

In one embodiment, the first number threshold determined when one condition in the first condition set is satisfied is related to an offset value determined when the condition in the first condition set is satisfied.

In one subembodiment of the above embodiment, the first number threshold determined when one condition in the first condition set is satisfied is related to an offset value determined based on a higher-layer signaling configuration when the condition in the first condition set is satisfied.

In one subembodiment of the above embodiment, the first number threshold determined when one condition in the first condition set is satisfied is related to an offset value determined based on an RRC signaling configuration when the condition in the first condition set is satisfied.

In one subembodiment of the above embodiment, the first number threshold determined when one condition in the first condition set is satisfied is related to an offset value determined based on a MAC CE signaling configuration when the condition in the first condition set is satisfied.

In one embodiment, the first signaling in the present application indicates multiple different offset values.

In one embodiment, value(s) of one or multiple fields in the first signaling in the present application corresponds (correspond) to multiple different offset value indexes in multiple offset value set indexes.

In one embodiment, the mapping relation in the present application is default.

In one embodiment, the mapping relation in the present application is configured by a higher-layer signaling.

In one embodiment, the mapping relation in the present application is configured by an RRC signaling.

In one embodiment, the mapping relation in the present application is configured by a MAC CE signaling.

In one embodiment, the first number threshold determined when one condition in the first condition set is satisfied is acquired through executing calculation.

In one embodiment, when a condition in the first condition set is satisfied, the first number threshold is related to a maximum non-negative integer satisfying an eighth condition in a first non-negative integer set; the eighth condition comprises: a first calculation amount is not greater than a second calculation amount, and a non-negative integer in the first non-negative integer set is used to determine the first calculation amount.

In one embodiment, when a condition in the first condition set is satisfied, the first number threshold is related to a maximum non-negative integer satisfying an eighth condition in a first non-negative integer set; the eighth condition comprises; the first calculation amount is not greater than the second calculation amount, the first calculation amount is equal to a minimum value between a result after a first intermediate quantity is rounded up to an integer and a result after a second intermediate quantity is rounded up to an integer, and the second calculation amount is equal to a minimum value between a result after a third intermediate quantity is rounded up to an integer and a result after a fourth intermediate quantity is rounded up to an integer.

In one subembodiment of the above embodiment, the first intermediate quantity is equal to a non-negative integer in the first non-negative integer set multiplied by an offset value determined when the condition in the first condition set is satisfied multiplied by the first resource amount divided by the first payload amount.

In one subembodiment of the above embodiment, the first intermediate quantity is equal to a non-negative integer in the first non-negative integer set multiplied by an offset value determined when the condition in the first condition set is satisfied divided by first code rate divided by a first modulation order.

In one subembodiment of the above embodiment, the third intermediate quantity is equal to a default or configured non-negative integer multiplied by another offset value other than an offset value determined when the condition in the first condition set is satisfied and then multiplied by the first resource amount divided by the first payload amount.

In one subembodiment of the above embodiment, the third intermediate quantity is equal to a default or configured non-negative integer multiplied by another offset value other than an offset value determined when the condition in the first condition set is satisfied and then divided by first code rate divided by a first modulation order.

In one subembodiment of the above embodiment, the second intermediate quantity is equal to a parameter multiplied by a second resource amount.

In one subembodiment of the above embodiment, the fourth intermediate quantity is equal to a parameter multiplied by a second resource amount.

In one embodiment, the meaning of the phrase that the first number threshold is related to a maximum non-negative integer satisfying an eighth condition in a first non-negative integer set comprises; the first number threshold is equal to the maximum non-negative integer satisfying the eighth condition in the first non-negative integer set.

In one embodiment, the meaning of the phrase that the first number threshold is related to a maximum non-negative integer satisfying an eighth condition in a first non-negative integer set comprises: the first number threshold is equal to the maximum non-negative integer satisfying the eighth condition in the first non-negative integer set minus a number of CRC bit(s).

In one embodiment, the meaning of the phrase that the first number threshold is related to a maximum non-negative integer satisfying an eighth condition in a first non-negative integer set comprises; the first number threshold is equal to a smallest one of the maximum non-negative integer satisfying the eighth condition in the first non-negative integer set and an eighth number.

In one subembodiment of the above embodiment, the eighth number is equal to 2.

In one subembodiment of the above embodiment, the eighth number is equal to a positive integer less than 1706.

In one subembodiment of the above embodiment, the eighth number is default.

In one subembodiment of the above embodiment, the eighth number is configured by a higher-layer signaling.

In one subembodiment of the above embodiment, the eighth number is configured by an RRC signaling.

In one subembodiment of the above embodiment, the eighth number is configured by a MAC CE signaling.

In one embodiment, the first resource amount in the present application is equal to a number of time-frequency resource element(s) that can be used for UCI transmission on one or multiple multicarrier symbols.

In one embodiment, the first payload amount in the present application is equal to a size of payload of uplink data.

In one embodiment, a first PUSCH comprises a PUSCH.

In one embodiment, the first time-frequency resource pool in the present application is reserved for the first PUSCH.

In one embodiment, the first time-frequency resource pool in the present application comprises time-frequency resources reserved for the first PUSCH.

In one embodiment, the first time-frequency resource pool in the present application comprises time-frequency resources occupied by the first PUSCH.

In one embodiment, the first payload amount in the present application is equal to a number of bit(s) comprised in a UL-SCH transmitted on the first PUSCH.

In one embodiment, the first code rate in the present application is code rate of the first PUSCH.

In one embodiment, the first modulation order in the present application is a modulation order of the first PUSCH.

In one embodiment, the first signaling in the present application is used to determine the first code rate in the present application.

In one embodiment, the first signaling in the present application is used to determine the first modulation order in the present application.

In one embodiment, an MCS indicated by the first signaling in the present application is used to determine the first code rate in the present application.

In one embodiment, an MCS indicated by the first signaling in the present application is used to determine the first modulation order in the present application.

In one embodiment, the second resource amount in the present application is equal to a number of time-frequency resource element(s) that can be used for UCI transmission on one or multiple multicarrier symbols.

In one embodiment, the parameter used to determine the second intermediate quantity in the present application is configured by a higher-layer signaling.

In one embodiment, the parameter used to determine the second intermediate quantity in the present application is configured by a higher-layer parameter scaling.

In one embodiment, the parameter used to determine the fourth intermediate quantity in the present application is configured by a higher-layer signaling.

In one embodiment, the parameter used to determine the fourth intermediate quantity in the present application is configured by a higher-layer parameter scaling.

In one embodiment, the offset value in the present application is $$\beta_{offset}^{HARQ-ACK}.$$

In one embodiment, the offset value in the present application is beta-offset.

In one embodiment, the offset value in the present application is a beta-offset value.

In one embodiment, a name of the offset value in the present application comprises β.

In one embodiment, a name of the offset value in the present application comprises at least one of HARQ or ACK.

In one embodiment, a name of the offset value in the present application comprises offset.

In one embodiment, a symbol used to represent the offset value in the present application comprises β.

In one embodiment, a symbol used to represent the offset value in the present application comprises at least one of HARQ or ACK.

In one embodiment, a symbol used to represent the offset value in the present application comprises offset.

In one embodiment, the first signaling in the present application indicates the offset value number determined when the condition in the first condition set is satisfied.

In one embodiment, the first signaling in the present application indicates the another offset value other than the offset value determined when the condition in the first condition set is satisfied.

In one embodiment, value(s) of one or multiple fields in the first signaling in the present application corresponds (correspond) to multiple different offset value indexes in multiple offset value index sets.

In one embodiment, value(s) of one or multiple fields in the first signaling in the present application corresponds (correspond) to multiple different offset value indexes in multiple offset value index sets based on a mapping relation; the offset value determined when the condition in the first condition set is satisfied is: an offset value corresponding to the value of one or multiple fields in the first signaling in the multiple different offset value indexes in the multiple offset value index sets based on the mapping relation.

In one embodiment, value(s) of one or multiple fields in the first signaling in the present application corresponds (correspond) to multiple different offset value indexes in multiple offset value index sets based on the mapping relation; the another offset value other than the offset value determined when the condition in the first condition set is satisfied is: an offset value corresponding to one of the multiple different offset value indexes in the multiple offset value index sets corresponding to the value of one or multiple the fields in the first signaling based on the mapping relation.

In one embodiment, different offset values respectively correspond to different offset value indexes.

In one embodiment, the offset value index set in the present application comprises multiple the offset value indexes in the present application.

In one embodiment, an offset value determined when a condition in the first condition set is satisfied is: an offset value configured to calculate resource number used for HARQ-ACK transmission comprised in the first bit block when the condition in the first condition set is satisfied.

In one embodiment, the another offset value other than the offset value determined when the condition in the first condition set is satisfied is default.

In one embodiment, the another offset value other than the offset value determined when the condition in the first condition set is satisfied is configured by a higher-layer signaling.

In one embodiment, the another offset value other than the offset value determined when the condition in the first condition set is satisfied is configured by an RRC signaling.

In one embodiment, the another offset value other than the offset value determined when the condition in the first condition set is satisfied is configured by a MAC CB signaling.

In one embodiment, the first non-negative integer set comprises multiple non-negative integers.

In one embodiment, the first non-negative integer set comprises 0, 1, . . . K.

In one subembodiment of the above embodiment, K is default positive integer.

In one subembodiment of the above embodiment, K is configured by a higher-layer signaling.

In one subembodiment of the above embodiment, K is configured by an RRC signaling.

In one subembodiment of the above embodiment, K is configured by a MAC CE signaling.

Embodiment 10A

Embodiment 10A illustrates a schematic diagram of a relation between a first-type HARQ-ACK and a first priority as well as a second-type HARQ-ACK and a second priority according to one embodiment of the present application, as shown in FIG. 10A.

In embodiment 10A, a first-type HARQ-ACK corresponds to a first priority, and a second-type HARQ-ACK corresponds to a second priority.

In one embodiment, the second bit block in the present application corresponds to one of a first priority or a second priority.

In one embodiment, a priority corresponding to the second bit block in the present application is a priority indicated by the first signaling.

In one embodiment, both the first priority index in the present application and the second priority index in the present application are priority indexes.

In one embodiment, a first priority index indicates the first priority, and a second priority index indicates the second priority.

In one embodiment, the first signaling in the present application indicates one of a first priority index or a second priority index.

In one embodiment, the first signaling in the present application comprises a priority indicator field.

In one embodiment, a priority index comprised in a priority indicator field comprised in the first signaling is one of a first priority index or a second priority index.

In one embodiment, the first-type HARQ-ACK is: a HARQ-ACK indicating whether a bit block carried by a PDSCH transmission scheduled by a signaling indicating the first priority is correctly received or a HARQ-ACK indicating whether a signaling itself indicating the first priority is correctly received.

In one embodiment, the second-type HARQ-ACK is; a HARQ-ACK indicating whether a bit block carried by a PDSCH transmission scheduled by a signaling indicating the second priority is correctly received or a HARQ-ACK indicating whether a signaling itself indicating the second priority is correctly received.

In one embodiment, the first-type HARQ-ACK is: a HARQ-ACK indicating whether a bit block carried by a. PDSCH transmission scheduled by a signaling indicating a first priority index is correctly received or a HARQ-ACK indicating whether a signaling itself indicating a first priority index is correctly received.

In one embodiment, the second-type HARQ-ACK is: a HARQ-ACK indicating whether a bit block carried by a PDSCH transmission scheduled by a signaling indicating a second priority index is correctly received or a HARQ-ACK indicating whether a signaling itself indicating a second priority index is correctly received.

In one embodiment, the first priority index is priority index 1, and the second priority index is priority index 0.

In one embodiment, the first priority index is priority index 0, and the second priority index is priority index 1.

Embodiment 10B

Figure 10B:
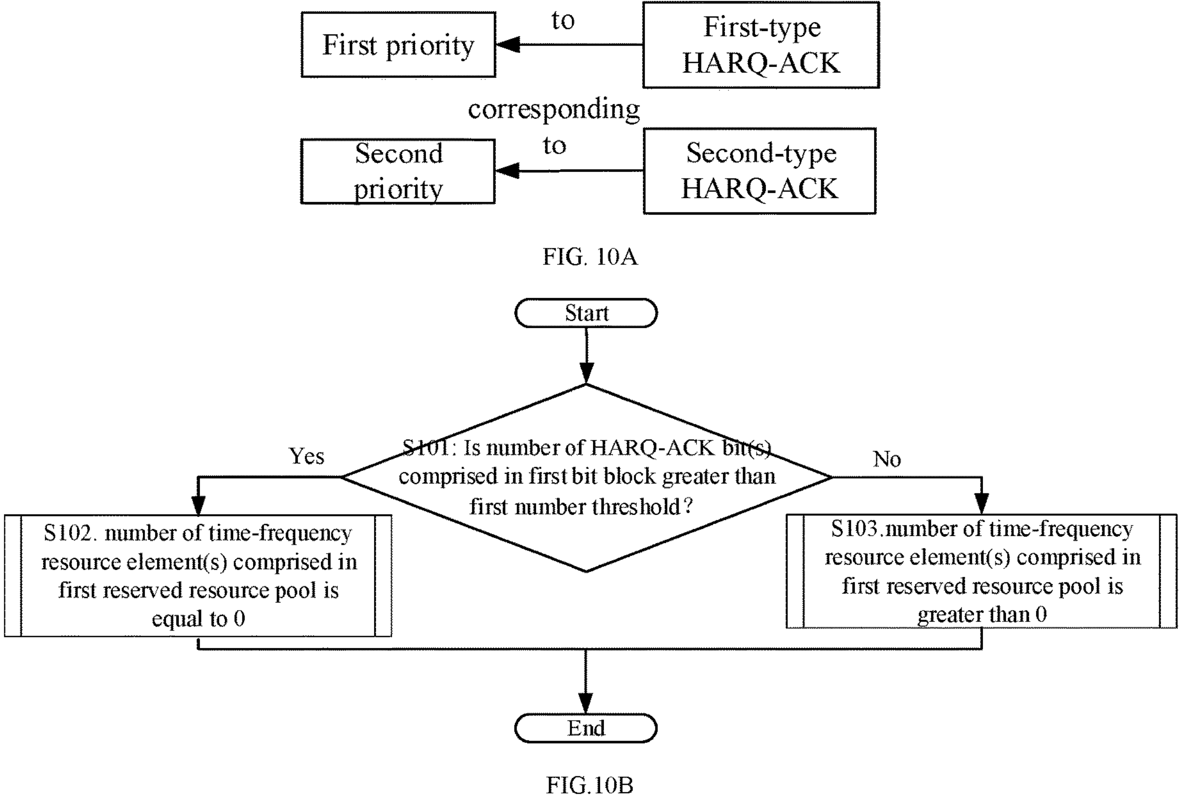
FIG. 10B illustrates a schematic diagram of a number of HARQ-ACK bit(s) comprised in a first bit block and a first number threshold being used to determine a number of time-frequency resource element(s) comprised in a first reserved resource pool according to one embodiment of the present application.

Embodiment 10B illustrates a schematic diagram of a number of HARQ-ACK bit(s) comprised in a first bit block and a first number threshold being used to determine a number of time-frequency resource element(s) comprised in a first reserved resource pool according to one embodiment of the present application, as shown in FIG. 10B.

In embodiment 10B, the first node in the present application judges whether a number of HARQ-ACK bit(s) comprised in a first bit block is greater than a first number threshold in step S101; if yes, enters into step S102 to determine; a number of time-frequency resource element(s) comprised in a first reserved resource pool is equal to 0; otherwise, enters into the step S103 to determine: a number of time-frequency resource element(s) comprised in a first reserved resource pool is greater than 0.

In one embodiment, the number of the time-frequency resource element(s) comprised in the first reserved resource pool is greater than 0; the number of the time-frequency resource element(s) comprised in the first reserved resource pool is equal to a minimum value between a result after a fifth intermediate quantity is rounded up to an integer and a result after a sixth intermediate quantity is rounded up to an integer.

In one subembodiment of the above embodiment, the fifth intermediate quantity is equal to a fifth number multiplied by a fifth offset value multiplied by a first resource amount divided by a first payload size.

In one subembodiment of the above embodiment, the fifth intermediate quantity is equal to a fifth number multiplied by a fifth offset value divided by first code rate divided by a first modulation order.

In one subembodiment of the above embodiment, the sixth intermediate quantity is equal to a sixth parameter multiplied by a second resource amount.

In one embodiment, the fifth number is equal to a positive integer greater than 0.

In one embodiment, the fifth number is default.

In one embodiment, the fifth number is configured by a higher-layer signaling.

In one embodiment, the fifth number is configured by an RRC signaling.

In one embodiment, the fifth number is configured by a MAC CE signaling.

In one embodiment, the first signaling in the present application indicates the fifth offset value.

In one embodiment, value(s) of one or multiple fields in the first signaling in the present application corresponds (correspond) to multiple different offset value indexes in multiple offset value index sets based on a mapping relation; the fifth offset value is: an offset value corresponding to the value of one or multiple fields in the first signaling based on the mapping relation in the multiple different offset value indexes in the multiple offset value index sets.

In one subembodiment of the above embodiment, the fifth offset value is: a maximum offset value in multiple different offset values corresponding to the multiple different offset value indexes in the multiple offset value index sets corresponding to the value of one or multiple the fields in the first signaling based on the mapping relation.

In one subembodiment of the above embodiment, the fifth offset value is: an offset value determined according to default (or configured by a higher-layer signaling, or configured by an RRC signaling, or configured by a MAC CE signaling) rule in multiple different offset values corresponding to the multiple different offset value indexes in the multiple offset value index sets corresponding to the value of one or multiple fields in the first signaling based on the mapping relation.

In one embodiment, the sixth parameter is configured by a higher-layer signaling.

In one embodiment, the sixth parameter is configured by a higher-layer parameter scaling.

In one embodiment, the sixth parameter is configured by an RRC-layer parameter scaling.

In one embodiment, when a number of HARQ-ACK bit(s) comprised in the first bit block is not greater than a first number threshold, the number of the time-frequency resource element(s) comprised in the first reserved resource pool is equal to 0; when a number of HARQ-ACK bit(s) comprised in the first bit block is greater than a first number threshold, the number of the time-frequency resource element(s) comprised in the first reserved resource pool is greater than 0.

In one embodiment, when a number of HARQ-ACK bit(s) comprised in the first bit block is not greater than a first number threshold, the number of the time-frequency resource element(s) comprised in the first reserved resource pool is not greater than a first reserved resource number; when a number of HARQ-ACK bit(s) comprised in the first bit block is greater than a first number threshold, the number of the time-frequency resource element(s) comprised in the first reserved resource pool is greater than a first reserved resource number.

In one embodiment, when a number of HARQ-ACK bit(s) comprised in the first bit block is not greater than a first number threshold, the number of the time-frequency resource element(s) comprised in the first reserved resource pool is greater than a first reserved resource number; when a number of HARQ-ACK bit(s) comprised in the first bit block is greater than a first number threshold, the number of the time-frequency resource element(s) comprised in the first reserved resource pool is not greater than a first reserved resource number.

In one embodiment, the first reserved resource number is equal to a positive integer greater than 0.

In one embodiment, the first reserved resource number is default.

In one embodiment, the first reserved resource number is configured by a higher-layer signaling.

In one embodiment, the first reserved resource number is configured by an RRC signaling.

In one embodiment, the first reserved resource number is configured by a MAC CE signaling.

In one embodiment, a resource number in the first reserved resource number is calculated or inferred based on a configured parameter.

Embodiment 11A

Figure 11A:
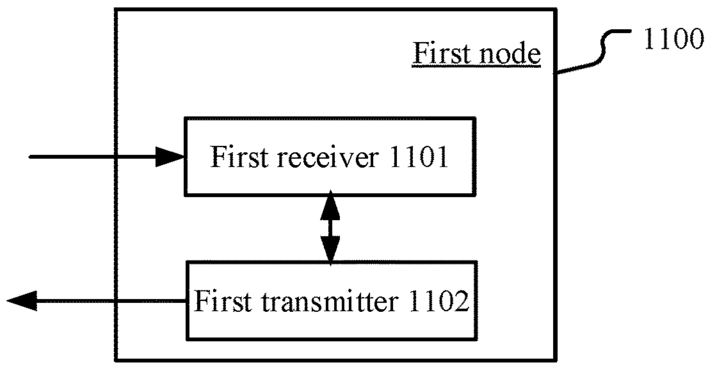
FIG. 11A illustrates a structure block diagram of a processor in a first node according to one embodiment of the present application.

Embodiment 11A illustrates a structure block diagram of a processor in a first node, as shown in FIG. 11A.

In FIG. 11A, a processor 1100 in a first node comprises a first receiver 1101 and a first transmitter 1102.

In one embodiment, the first node 1100 is a UE.

In one embodiment, the first node 1100 is a relay node.

In one embodiment, the first node 1100 is a vehicle-mounted communication device.

In one embodiment, the first node 1100 is a UE that supports V2X communications.

In one embodiment, the first node 1100 is a relay node that supports V2X communications.

In one embodiment, the first receiver 1101 comprises at least one of the antenna 452, the receiver 454, the multi-antenna receiving processor 458, the receiving processor 456, the controller/processor 459, the memory 460 of the data source 467 in FIG. 4 of the present application.

In one embodiment, the first receiver 1101 comprises at least the first five of the antenna 452, the receiver 454, the multi-antenna receiving processor 458, the receiving processor 456, the controller processor 459, the memory 460 and the data source 467 in FIG. 4 of the present application.

In one embodiment, the first receiver 1101 comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101 comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101 comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1102 comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1102 comprises at least first five the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1102 comprises at least first four the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1102 comprises at least first three the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1102 comprises at least first two the antenna 452, the transmitter 454, the multi-antenna transmitting processor 457, the transmitting processor 468, the controller/processor 459, the memory 460, and the data source 467 in FIG. 4 of the present application.

In embodiment 11A, the first receiver 1101 receives a first signaling; the first transmitter 1102, transmits a first signal on a first time-frequency resource pool, the first signal carries a first bit block; herein, the first signaling is used to determine the first time-frequency resource pool; the first bit block comprises K HARQ-ACK information bit(s), K being a positive integer; the first bit block comprises at least one of a first-type HARQ-ACK or a second-type HARQ-ACK; a first condition is a condition related to type(s) of HARQ-ACK(s) comprised in the first bit block; when the first condition is not satisfied, a same offset value is used to determine both a number of time-frequency resource element(s) comprised in a first time-frequency resource sub-pool and a number of time-frequency resource element(s) comprised in a first reserved resource pool; when the first condition is satisfied, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one embodiment, the first signal carrying a second bit block, the second bit block comprising a Transport Block (TB).

In one embodiment, the first condition comprises: the first bit block comprising the second-type HARQ-ACK.

In one embodiment, when the first condition is satisfied: the two different offset values are respectively a first offset value and a second offset value; the first offset value is used to determine the number of the time-frequency resource element(s) comprised in the first time-frequency resource sub-pool, and the second offset value is used to determine the number of the time-frequency resource element(s) comprised in the first reserved resource pool.

In one embodiment, the first condition is satisfied; a second condition set comprises N mutually-exclusive conditions, N being a positive integer greater than 1; a first offset value set comprises not less than the N mutually-different offset values, and a second offset value set comprises at least one offset value; for any positive integer j not greater than N, when the j-th condition in the second condition set is satisfied: the j-th offset value in the first offset value set is used to determine the number of the time-frequency resource element(s) comprised in the first time-frequency resource sub-pool, an offset value in the second offset value set different from the j-th offset value in the first offset value set is used to determine the number of the time-frequency resource element(s) comprised in the first reserved resource pool.

In one embodiment, a first radio resource pool is reserved for at least one bit sub-block comprised in the first bit block; the first radio resource pool overlaps with the first time-frequency resource pool in time domain.

In one embodiment, the first-type HARQ-ACK corresponds to a first priority, and the second-type HARQ-ACK corresponds to a second priority.

In one embodiment, a first signal is transmitted in a first time-frequency resource pool, and the first signal carries a first bit block and a second bit block; the second bit block comprises a TB; a first signaling is used to determine the first time-frequency resource pool; the first bit block comprises K. HARQ-ACK information bit(s), K being a positive integer; the first bit block comprises at least one of a first-type HARQ-ACK or a second-type HARQ-ACK, the first-type HARQ-ACK is a HARQ-ACK corresponding to a first priority index, and the second-type HARQ-ACK is a HARQ-ACK corresponding to a second priority index; when the first bit block does not comprise the second-type HARQ-ACK, a same offset value is used to determine both a number of time-frequency resource element(s) comprised in a first time-frequency resource sub-pool and a number of time-frequency resource element(s) comprised in a first reserved resource pool; when the first bit block comprises the second-type HARQ-ACK, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one subembodiment of the above embodiment, K is equal to 1.

In one subembodiment of the above embodiment, K is equal to 1 or 2.

In one subembodiment of the above embodiment, the first priority index is equal to one of 0 or 1, and the second priority is equal to the other of 0 or 1.

In one subembodiment of the above embodiment, the first time-frequency resource pool comprises time-frequency resources occupied by a PUSCH transmission.

In one subembodiment of the above embodiment, the first signaling comprises a second field; a value of the second field in the first signaling corresponds to multiple different offset values related to multiple different offset value configurations.

Embodiment 11B

Figure 11B:
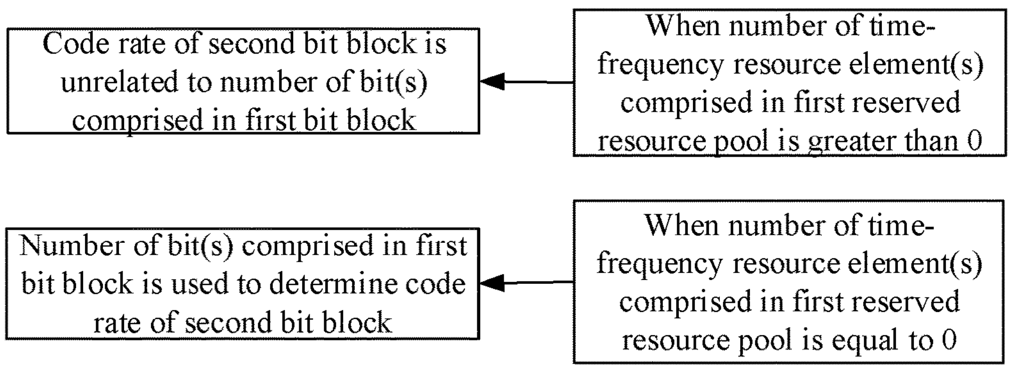
FIG. 11B illustrates a schematic diagram of a relation between a number of time-frequency resource element(s) comprised in a first reserved resource pool and whether code rate of a second bit block being related to a number of bit(s) comprised in a first bit block according to one embodiment of the present application.

Embodiment 11B illustrates a schematic diagram of a relation between a number of time-frequency resource element(s) comprised in a first reserved resource pool and whether code rate of a second bit block is related to a number of bit(s) comprised in a first bit block according to one embodiment of the present application, as shown in FIG. 11B.

In embodiment 11B, when a number of time-frequency resource element(s) comprised in a first reserved resource pool is greater than 0, code rate of a second bit block is unrelated to a number of bit(s) comprised in a first bit block;

when a number of time-frequency resource element(s) comprised in a first reserved resource pool is equal to 0, a number of bit(s) comprised in a first bit block is used to determine code rate of a second bit block.

In one embodiment, the code rate of the second bit block is related to a number of bit(s) comprised in the second bit block.

In one embodiment, the code rate of the second bit block is equal to a number of bit(s) comprised in the second bit block divided by a number of bit(s) comprised in a coded bit sequence generated by the second bit block.

In one embodiment, the meaning of the expression that code rate of the second bit block is unrelated to a number of bit(s) comprised in the first bit block comprises: a coded bit sequence generated by the second bit block is not influenced by a number of bit(s) comprised in the first bit block.

In one embodiment, the meaning of the phrase that a number of bit(s) comprised in the first bit block is used to determine code rate of the second bit block comprises: a second time-frequency resource sub-pool in the first time-frequency resource pool is used to calculate a number of bit(s) comprised in a coded bit sequence generated by the second bit block; time-frequency resources used to transmit the first bit block in the first time-frequency resource pool are excluded outside the second time-frequency resource sub-pool.

In one embodiment, the meaning of the phrase that a number of bit(s) comprised in the first bit block is used to determine code rate of the second bit block comprises: a sum of a number of bit(s) comprised in a coded bit sequence generated by the first bit block and a number of bit(s) comprised in a coded bit sequence generated by the second bit block is not greater than a first bit size (number of bit(s), and the first bit size (number of bit(s) is linearly associated with a number of time-frequency resource element(s) comprised in a time-frequency resource sub-pool comprised in the first time-frequency resource pool.

In one subembodiment of the above embodiment, the time-frequency resource sub-pool comprised in the first time-frequency resource pool comprises time-frequency resources reserved for a UL-SCH transmission.

In one subembodiment of the above embodiment, the first bit size (number of bit(s)) is equal to a positive integral multiple of the number of the time-frequency resource element(s) comprised in the time-frequency resource sub-pool comprised in the first time-frequency resource pool.

In one embodiment, the coded bit sequence generated by the first bit block comprises the first coded bit sequence in the present application.

In one embodiment, the coded bit sequence generated by the second bit block comprises the second coded bit sequence in the present application.

Embodiment 12A

Figure 12A:
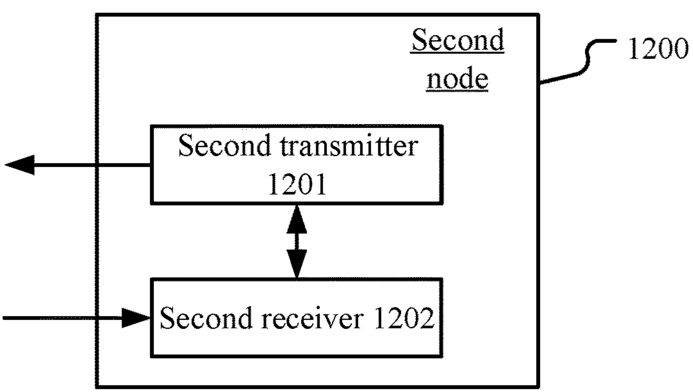
FIG. 12A illustrates a structure block diagram of a processor in a second node according to one embodiment of the present application.

Embodiment 12A illustrates a structure block diagram of a processor in a second node, as shown in FIG. 12A. In FIG. 12A, a processor 1200 in a second node comprises a second transmitter 1201 and a second receiver 1202.

In one embodiment, the second node 1200 is a UE.

In one embodiment, the second node 1200 is a base station.

In one embodiment, the second node 1200 is a relay node.

In one embodiment, the second node 1200 is a vehicle-mounted communication device.

In one embodiment, the second node 1200 is a UE that supports V2X communications.

In one embodiment, the second transmitter 1201 comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1201 comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1201 comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1201 comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1201 comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1202 comprises at least one of the antenna 420, the receiver 418, the multi-antenna receiving processor 472, the receiving processor 470, the controller/processor 475 or the memory 476 in FIG. 4 of the present application.

In one embodiment, the second receiver 1202 comprises at least first five of the antenna 420, the receiver 418, the multi-antenna receiving processor 472, the receiving processor 470, the controller/processor 475 and the memory 476 in FIG. 4 of the present application.

In one embodiment, the second receiver 1202 comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1202 comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1202 comprises at least first two of the antenna 420, the receiver 418, the multi-antenna receiving processor 472, the receiving processor 470, the controller/processor 475 and the memory 476 in FIG. 4 of the present application.

In embodiment 12A, the second transmitter 1201 transmits a first signaling; the second receiver 1202 receives a first signal in a first time-frequency resource pool, the first signal carries a first bit block; herein, the first signaling is used to determine the first time-frequency resource pool; the first bit block comprises K HARQ-ACK information bit(s), K being a positive integer; the first bit block comprises at least one of a first-type HARQ-ACK of a second-type HARQ-ACK; a first condition is a condition related to type(s) of HARQ-ACK(s) comprised in the first bit block; when the first condition is not satisfied, a same offset value is used to determine both a number of time-frequency resource element(s) comprised in a first time-frequency resource sub-pool and a number of time-frequency resource element(s) comprised in a first reserved resource pool; when the first condition is satisfied, two different offset values are respectively used to determine a number of time-frequency resource element(s) comprised in a first time-frequency resource sub-pool and a number of time-frequency resource element(s) comprised in a first reserved resource pool; the first reserved resource pool is reserved for transmitting a HARQ-ACK information bit, and the first time-frequency resource sub-pool comprises time-frequency resources occupied by a modulation symbol generated by the first bit block being transmitted in the first reserved resource pool; the number of the time-frequency resource element(s) comprised in the first time-frequency resource sub-pool is not greater than the number of the time-frequency resource element(s) comprised in the first reserved resource pool.

In one embodiment, the first signal carrying a second bit block, the second bit block comprising a Transport Block (TB).

In one embodiment, the first condition comprises: the first bit block comprising the second-type HARQ-ACK.

In one embodiment, when the first condition is satisfied: the two different offset values are respectively a first offset value and a second offset value; the first offset value is used to determine the number of the time-frequency resource element(s) comprised in the first time-frequency resource sub-pool, and the second offset value is used to determine the number of the time-frequency resource element(s) comprised in the first reserved resource pool.

In one embodiment, the first condition is satisfied; a second condition set comprises N mutually-exclusive conditions, N being a positive integer greater than 1; a first offset value set comprises not less than the N mutually-different offset values, and a second offset value set comprises at least one offset value; for any positive integer j not greater than N, when the j-th condition in the second condition set is satisfied: the j-th offset value in the first offset value set is used to determine the number of the time-frequency resource element(s) comprised in the first time-frequency resource sub-pool, an offset value in the second offset value set different from the j-th offset value in the first offset value set is used to determine the number of the time-frequency resource element(s) comprised in the first reserved resource pool.

In one embodiment, a first radio resource pool is reserved for at least one bit sub-block comprised in the first bit block; the first radio resource pool overlaps with the first time-frequency resource pool in time domain.

In one embodiment, the first-type HARQ-ACK corresponds to a first priority, and the second-type HARQ-ACK corresponds to a second priority.

Embodiment 12B

Figure 12B:
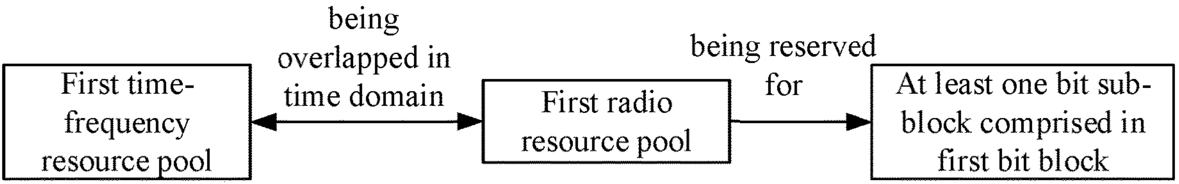
FIG. 12B illustrates a schematic diagram of relations among a first time-frequency resource pool, a first radio resource pool and a first bit block according to one embodiment of the present application.

Embodiment 12B illustrates a schematic diagram of relations among a first time-frequency resource pool, a first radio resource pool and a first bit block according to one embodiment of the present application, as shown in FIG. 12B.

In embodiment 12B, a first radio resource pool is reserved for at least one bit sub-block in a first bit block; the first radio resource pool overlaps with a first time-frequency resource pool in time domain.

In one embodiment, a number of bit sub-block(s) comprised in the first bit block is the same as a number of HARQ-ACK type(s) comprised in the first bit block.

In one embodiment, a number of HARQ-ACK type(s) comprised in each bit sub-block comprised in the first bit block is equal to 1.

In one embodiment, the phrase of being overlapped in time domain in the present application comprises: being overlapped in time domain, and being overlapped in frequency domain.

In one embodiment, the phrase of being overlapped in time domain in the present application comprises: being overlapped in time domain, and being overlapped and non-overlapped in frequency domain.

In one embodiment, the first radio resource pool comprises a positive integer number of time-frequency resource element(s) in time-frequency domain.

In one embodiment, the first radio resource pool comprises a positive integer number of Resource Element(s) (RE(s)) in time-frequency domain.

In one embodiment, the first radio resource pool comprises a positive integer number of subcarrier in frequency domain.

In one embodiment, the first radio resource pool comprises a positive integer number of PRB(s) in frequency domain.

In one embodiment, the first radio resource pool comprises a positive integer number of RB(s) in frequency domain.

In one embodiment, the first radio resource pool comprises a positive integer number of multi-carrier symbol(s) in time domain.

In one embodiment, the first radio resource pool comprises a positive integer number of slot(s) in time domain.

In one embodiment, the first radio resource pool comprises a positive integer number of sub-slot(s) in time domain.

In one embodiment, the first radio resource pool comprises a positive integer number of ma(s) in time domain.

In one embodiment, the first radio resource pool comprises a positive integer number of continuous multi-carrier symbol(s) in time domain.

In one embodiment, the first radio resource pool comprises a positive integer number of discontinuous slot(s) in time domain.

In one embodiment, the first radio resource pool comprises a positive integer number of continuous slot(s) in time domain.

In one embodiment, the first radio resource pool comprises a positive integer number of sub-frame(s) in time domain.

In one embodiment, the first radio resource pool is configured by a physical-layer signaling.

In one embodiment, the first radio resource pool is configured by a higher-layer signaling.

In one embodiment, the first radio resource pool is configured by a Radio Resource Control (RRC) signaling.

In one embodiment, the first radio resource pool is configured by a Medium Access Control layer Control Element (MAC CE) signaling.

In one embodiment, the first radio resource pool is reserved for a Physical Uplink Control CHannel (PUCCH).

In one embodiment, the first radio resource pool comprises radio resources reserved for a PUCCH.

In one embodiment, the first radio resource pool comprises radio resources occupied by a PUCCH.

In one embodiment, the first radio resource pool comprises a PUCCH resource.

In one embodiment, the first radio resource pool comprises a PUCCH resource in a PUCCH resource set.

In one embodiment, when the first bit block comprises only one of the first-type HARQ-ACK or the second HARQ-ACK: the first radio resource pool is reserved for the first bit block; when the first bit block comprises the first-type HARQ-ACK and the second-type HARQ-ACK: the first bit block comprises a first bit sub-block and a second bit sub-block, the first bit sub-block comprises the first-type HARQ-ACK, the second bit sub-block comprises the second-type HARQ-ACK, and the first radio resource pool is reserved for at least one of the first bit sub-block or the second bit sub-block.

Embodiment 13

Figures 13, 14, 15:
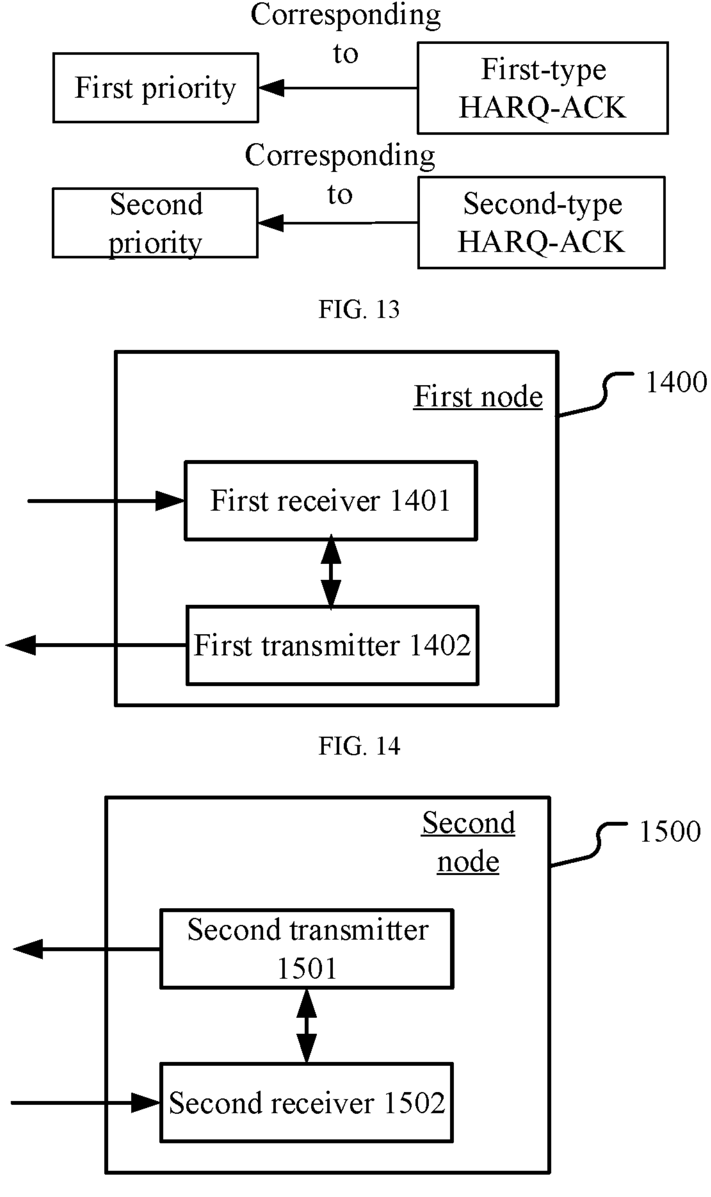
FIG. 13 illustrates a schematic diagram of a relation between a first-type HARQ-ACK and a first priority as well as a relation between a second-type HARQ-ACK and a second priority according to one embodiment of the present application.
FIG. 14 illustrates a structure block diagram of a processor in a first node according to one embodiment of the present application.
FIG. 15 illustrates a structure block diagram of a processor in second node according to one embodiment of the present application.

Embodiment 13 illustrates a schematic diagram of a relation between a first-type HARQ-ACK and a first priority as well as a relation between a second-type HARQ-ACK and a second priority according to one embodiment of the present application, as shown in FIG. 13.

In embodiment 13, a first-type HARQ-ACK corresponds to a first priority, and a second-type HARQ-ACK corresponds to a second priority.

In one embodiment, the second bit block in the present application corresponds to one of a first priority of a second priority.

In one embodiment, a priority corresponding to the second bit block in the present application is a priority indicated by the first signaling.

In one embodiment, both the first priority index in the present application and the second priority index in the present application are priority indexes.

In one embodiment, a first priority index indicates the first priority, and a second priority index indicates the second priority.

In one embodiment, an index of the first priority is a first priority index, and an index of the second priority is a second priority index.

In one embodiment, the first signaling in the present application indicates one of a first priority index or a second priority index.

In one embodiment, a priority indicated by the first signaling in the present application is the same as a priority corresponding to the first-type HARQ-ACK.

In one embodiment, a priority indicated by the first signaling in the present application is the same as a priority corresponding to the second-type HARQ-ACK.

In one embodiment, the first signaling in the present application comprises a priority indicator field.

In one embodiment, a priority index comprised in a priority indicator field comprised in the first signaling is one of a first priority index or a second priority index.

In one embodiment, the first-type HARQ-ACK is: a HARQ-ACK indicating whether a bit block carried by a PDSCH transmission scheduled by a signaling indicating the first priority is correctly received or a HARQ-ACK indicating whether a signaling itself indicating the first priority is correctly received.

In one embodiment, the second-type HARQ-ACK is: a HARQ-ACK indicating whether a bit block carried by a PDSCH transmission scheduled by a signaling indicating the second priority is correctly received or a HARQ-ACK indicating whether a signaling itself indicating the second priority is correctly received.

In one embodiment, the first-type HARQ-ACK is: a HARQ-ACK indicating whether a bit block carried by a PDSCH transmission scheduled by a signaling indicating a first priority index is correctly received or a HARQ-ACK indicating whether a signaling itself indicating a first priority index is correctly received.

In one embodiment, the second-type HARQ-ACK is: a HARQ-ACK indicating whether a bit block carried by a PDSCH transmission scheduled by a signaling indicating a second priority index is correctly received or a HARQ-ACK indicating whether a signaling itself indicating a second priority index is correctly received.

In one embodiment, the first priority index is priority index 1, and the second priority index is priority index 0.

In one embodiment, the first priority index is priority index 0, and the second priority index is priority index 1.

Embodiment 14

Embodiment 14 illustrates a structure block diagram of a processor in a first node, as shown in FIG. 14. In FIG. 14, a processor 1400 in a first node comprises a first receiver 1401 and a first transmitter 1402.

In one embodiment, the first node 1400 is a UE.

In one embodiment, the first node 1400 is a relay node.

In one embodiment, the first node 1400 is a vehicle-mounted communication device.

In one embodiment, the first node 1400 is a UE that supports V2X communications.

In one embodiment, the first node 1400 is a relay node that supports V2X communications.

In one embodiment, the first receiver 1401 comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1401 comprises at least the first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1401 comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1401 comprises at least the first three of the antenna 452, the receiver 454, the multi-antenna receiving processor 458, the receiving processor 456, the controller processor 459, the memory 460 and the data source 467 in FIG. 4 of the present application.

In one embodiment, the first receiver 1401 comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1402 comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1402 comprises at least first five the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1402 comprises at least first four the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1402 comprises at least first three the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1402 comprises at least first two the antenna 452, the transmitter 454, the multi-antenna transmitting processor 457, the transmitting processor 468, the controller/processor 459, the memory 460, and the data source 467 in FIG. 4 of the present application.

In Embodiment 14, the first receiver 1401 receives a first signaling; the first transmitter 1402 transmits a first signal in a first time-frequency resource pool, the first signal carries a first bit block and a second bit block; the first signaling is used to determine the first time-frequency resource pool; the second bit block comprises a TB, and the first bit block comprises at least one of a first-type HARQ-ACK or a second-type HARQ-ACK; a number of HARQ-ACK bit(s) comprised in the first bit block and type(s) of HARQ-ACK comprised in the first bit block are used together to determine a number of time-frequency resource element(s) comprised in a first reserved resource pool, and the number of the time-frequency resource element(s) comprised in the first reserved resource pool is a non-negative integer; a target coded bit sequence output through a first procedure is related to the number of the time-frequency resource element(s) comprised in the first reserved resource pool, both the first bit block and the second bit block are used to determine the target coded bit sequence, and modulation symbols generated by the target coded bit sequence are transmitted in the first time-frequency resource pool.

In one embodiment, the first bit block generates a first coded bit sequence, and the second bit block generates a second coded bit sequence; the first coded bit sequence and the second coded bit sequence are used as input to execute the first procedure to obtain the target coded bit sequence; the first procedure comprises at least two of a first sub-procedure, a second sub-procedure or a third sub-procedure: when the number of the time-frequency resource element(s) comprised in the first reserved resource pool is equal to 0, the first procedure comprises a first sub-procedure and a second sub-procedure, the first coded bit sequence is used as an input to execute the first sub-procedure in the first procedure, the second coded bit sequence is used as an input to execute the second sub-procedure in the first procedure, and the first sub-procedure in the first procedure is executed before the second sub-procedure in the first procedure; when the number of the time-frequency resource element(s) comprised in the first reserved resource pool is greater than 0, the first procedure comprises a second sub-procedure and a third sub-procedure, the second coded bit sequence is used as an input to execute the second sub-procedure in the first procedure, the first coded bit sequence used as an input is used to execute the third sub-procedure in the first procedure, and the third sub-procedure in the first procedure is executed after the second sub-procedure in the first procedure.

In one embodiment, a first number threshold is related to a type of HARQ-ACK comprised in the first bit block; a first condition is a condition related to type(s) of HARQ-ACK(S) comprised in the first bit block; when the first condition is satisfied, the first number threshold is equal to a first number; when the first condition is not satisfied, the first number threshold is equal to a number different from the first number; a magnitude relation between a number of HARQ-ACK bit(s) comprised in the first bit block and the first number threshold is used to determine the number of the time-frequency resource element(s) comprised in the first reserved resource pool.

In one embodiment, a first condition set comprises multiple mutually-exclusive conditions; there exist two conditions in the first condition set: a first number threshold determined when one of the two conditions in the first condition set is satisfied is not equal to a first number threshold determined when the other of the two conditions in the first condition set is satisfied; all conditions in the first condition set are conditions related to a type of HARQ-ACK comprised in the first bit block.

In one embodiment, when a number of HARQ-ACK bit(s) comprised in the first bit block is not greater than a first number threshold, the number of the time-frequency resource element(s) comprised in the first reserved resource pool is greater than 0; when a number of HARQ-ACK bit(s) comprised in the first bit block is greater than a first number threshold, the number of the time-frequency resource element(s) comprised in the first reserved resource pool is equal to 0.

In one embodiment, when the number of the time-frequency resource element(s) comprised in the first reserved resource pool is greater than 0, a modulation symbol generated by the first bit block is transmitted in the first reserved resource pool, and code rate of the second bit block is unrelated to a number of bit(s) comprised in the first bit block; when the number of the time-frequency resource element(s) comprised in the first reserved resource pool is equal to 0, a number of bit(s) comprised in the first bit block is used to determine code rate of the second bit block.

In one embodiment, a first radio resource pool is reserved for at least one bit sub-block comprised in the first bit block; the first radio resource pool overlaps with the first time-frequency resource pool in time domain.

Embodiment 15

Embodiment 15 illustrates a structure block diagram of a processor in a second node, as shown in FIG. 15. In FIG. 15, a processor 1500 in the second node comprises a second transmitter 1501 and a second receiver 1502.

In one embodiment, the second node 1500 is a UE.

In one embodiment, the second node 1500 is a base station.

In one embodiment, the second node 1500 is a relay node.

In one embodiment, the second node 1500 is a vehicle-mounted communication device.

In one embodiment, the second node 1500 is a UE supporting V2X communications.

In one embodiment, the second transmitter 1501 comprises at least one of the antenna 420, the transmitter 418, the multi-antenna transmitting processor 471, the transmitting processor 416, the controller/processor 475 of the memory 476 in FIG. 4 of the present application.

In one embodiment, the second transmitter 1501 comprises at least the first five of the antenna. 420, the transmitter 418, the multi-antenna transmitting processor 471, the transmitting processor 416, the controller/processor 475 and the memory 476 in FIG. 4 of the present application.

In one embodiment, the second transmitter 1501 comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1501 comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1501 comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1502 comprises at least one of the antenna 420, the receiver 418, the multi-antenna receiving processor 472, the receiving processor 470, the controller/processor 475 or the memory 476 in FIG. 4 of the present application.

In one embodiment, the second receiver 1502 comprises at least first five of the antenna 420, the receiver 418, the multi-antenna receiving processor 472, the receiving processor 470, the controller processor 475 and the memory 476 in FIG. 4 of the present application.

In one embodiment, the second receiver 1502 comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1502 comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1502 comprises at least first two of the antenna 420, the receiver 418, the multi-antenna receiving processor 472, the receiving processor 470, the controller/processor 475 and the memory 476 in FIG. 4 of the present application.

In Embodiment 15, the second transmitter 1501 transmits a first signaling; the second receiver 1502, receives a first signal in a first time-frequency resource pool, and the first signal carries a first bit block and a second bit block; herein, the first signaling is used to determine the first time-frequency resource pool; the second bit block comprises a TB, and the first bit block comprises at least one of a first-type HARQ-ACK or a second-type HARQ-ACK; a number of HARQ-ACK bit(s) comprised in the first bit block and type(s) of HARQ-ACK comprised in the first bit block are used together to determine a number of time-frequency resource element(s) comprised in a first reserved resource pool, and the number of the time-frequency resource element(s) comprised in the first reserved resource pool is a non-negative integer; a target coded bit sequence output through a first procedure is related to the number of the time-frequency resource element(s) comprised in the first reserved resource pool, both the first bit block and the second bit block are used to determine the target coded bit sequence, and modulation symbols generated by the target coded bit sequence are transmitted in the first time-frequency resource pool.

In one embodiment, the first bit block generates a first coded bit sequence, and the second bit block generates a second coded bit sequence; the first coded bit sequence and the second coded bit sequence are used as input to execute the first procedure to obtain the target coded bit sequence; the first procedure comprises at least two of a first sub-procedure, a second sub-procedure or a third sub-procedure; when the number of the time-frequency resource element(s) comprised in the first reserved resource pool is equal to 0, the first procedure comprises a first sub-procedure and a second sub-procedure, the first coded bit sequence is used as an input to execute the first sub-procedure in the first procedure, the second coded bit sequence is used as an input to execute the second sub-procedure in the first procedure, and the first sub-procedure in the first procedure is executed before the second sub-procedure in the first procedure; when the number of the time-frequency resource element(s) comprised in the first reserved resource pool is greater than 0, the first procedure comprises a second sub-procedure and a third sub-procedure, the second coded bit sequence is used as an input to execute the second sub-procedure in the first procedure, the first coded bit sequence used as an input is used to execute the third sub-procedure in the first procedure, and the third sub-procedure in the first procedure is executed after the second sub-procedure in the first procedure.

In one embodiment, a first number threshold is related to a type of HARQ-ACK comprised in the first bit block; a first condition is a condition related to type(s) of HARQ-ACK(s) comprised in the first bit block; when the first condition is satisfied, the first number threshold is equal to a first number; when the first condition is not satisfied, the first number threshold is equal to a number different from the first number; a magnitude relation between a number of HARQ-ACK bit(s) comprised in the first bit block and the first number threshold is used to determine the number of the time-frequency resource element(s) comprised in the first reserved resource pool.

In one embodiment, a first condition set comprises multiple mutually-exclusive conditions; there exist two conditions in the first condition set: a first number threshold determined when one of the two conditions in the first condition set is satisfied is not equal to a first number threshold determined when the other of the two conditions in the first condition set is satisfied; all conditions in the first condition set are conditions related to a type of HARQ-ACK comprised in the first bit block.

In one embodiment, when a number of HARQ-ACK bit(s) comprised in the first bit block is not greater than a first number threshold, the number of the time-frequency resource element(s) comprised in the first reserved resource pool is greater than 0; when a number of HARQ-ACK bit(s) comprised in the first bit block is greater than a first number threshold, the number of the time-frequency resource element(s) comprised in the first reserved resource pool is equal to 0.

In one embodiment, when the number of the time-frequency resource element(s) comprised in the first reserved resource pool is greater than 0, a modulation symbol generated by the first bit block is transmitted in the first reserved resource pool, and code rate of the second bit block is unrelated to a number of bit(s) comprised in the first bit block; when the number of the time-frequency resource element(s) comprised in the first reserved resource pool is equal to 0, a number of bit(s) comprised in the first bit block is used to determine code rate of the second bit block.

In one embodiment, a first radio resource pool is reserved for at least one bit sub-block comprised in the first bit block; the first radio resource pool overlaps with the first time-frequency resource pool in time domain.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE), comprising:

a receiver configured to receive control information indicating a first time-frequency resource pool including time-frequency resources of a physical uplink shared channel (PUSCH); and a transmitter configured to transmit modulation symbols associated with a first bit block and a second bit block in the first time-frequency resource pool, wherein the first bit block includes hybrid automatic repeat request-acknowledgment (HARQ-ACK) bits corresponding to priority index 1 or HARQ-ACK bits corresponding to priority index 0, wherein a number of resource elements of a first reserved resource pool is determined based on a number of the HARQ-ACK bits of the first bit block and a priority index of the HARQ-ACK bits of the first bit block, wherein a coded bit sequence is determined based on the first bit block and the second bit block, and the coded bit sequence is related to the number of the resource elements of the first reserved resource pool, and wherein the modulation symbols are generated based on the coded bit sequence.

2. The UE according to claim 1, wherein determining the number of the resource elements of the first reserved resource pool based on the number of the HARQ-ACK bits of the first bit block and the priority index of the HARQ-ACK bits includes:

on a condition that the first bit block includes the HARQ-ACK bits corresponding to priority index 1 and the number of the HARQ-ACK bits of the first bit block is not greater than two, the number of the resource elements of the first reserved resource pool is greater than 0, on a condition that the first bit block includes the HARQ-ACK bits corresponding to priority index 0, the number of the resource elements of the first reserved resource pool is greater than 0, on a condition that the first bit block includes the HARQ-ACK bits corresponding to priority index 1 and the number of the HARQ-ACK bits of the first bit block is greater than two, the number of the resource elements of the first reserved resource pool is.

3. The UE according to claim 2, wherein a procedure is used to determine the coded bit sequence, and the number of the resource elements of the first reserved resource pool is used to determine a manner of executing the procedure.

4. The UE according to claim 2, wherein:

a first coded bit sequence is determined based on the first bit block generates, and a second coded bit sequence is determined based on the second bit block, the first coded bit sequence and the second coded bit sequence are used as inputs to execute a procedure for obtaining the coded bit sequence, the procedure includes at least two of a first sub-procedure, a second sub-procedure or a third sub-procedure, on a condition that the number of the resource elements of the first reserved resource pool is zero, the procedure includes the first sub-procedure and the second sub-procedure, the first coded bit sequence is used as an input to execute the first sub-procedure, the second coded bit sequence is used as an input to execute the second sub-procedure, and the first sub-procedure is executed before the second sub-procedure, on a condition that the number of the resource elements of the first reserved resource pool is greater than zero, the procedure includes the second sub-procedure and the third sub-procedure, the second coded bit sequence is used as an input to execute the second sub-procedure, the first coded bit sequence is used as an input to execute the third sub-procedure, and the third sub-procedure is executed after the second sub-procedure.

5. The UE according to claim 1, wherein a priority indicated by the control information is priority index 1.

6. The UE according to claim 1, wherein the first reserved resource pool includes one or more resource elements reserved for potential HARQ-ACK transmission or the first reserved resource pool is a null set.

7. A base station for wireless communications, comprising:

a transmitter configured to transmit control information indicating a first time-frequency resource pool including time-frequency resources of a physical uplink shared channel (PUSCH); and a receiver configured to receive modulation symbols associated with a first bit block and a second bit block in the first time-frequency resource pool, wherein the first bit block includes hybrid automatic repeat request-acknowledgment (HARQ-ACK) bits corresponding to priority index 1 or HARQ-ACK bits corresponding to priority index 0, wherein a number of resource elements of a first reserved resource pool is determined based on a number of the HARQ-ACK bits of the first bit block and a priority index of the HARQ-ACK bits of the first bit block, wherein a coded bit sequence is determined based on the first bit block and the second bit block, and the coded bit sequence is related to the number of the resource elements of the first reserved resource pool, and wherein the modulation symbols are generated based on the coded bit sequence.

8. The base station according to claim 7, wherein determining the number of the resource elements of the first reserved resource pool based on the number of the HARQ-ACK bits of the first bit block and the priority index of the HARQ-ACK bits includes:

on a condition that the first bit block includes the HARQ-ACK bits corresponding to priority index 1 and the number of the HARQ-ACK bits of the first bit block is not greater than two, the number of the resource elements of the first reserved resource pool is greater than 0, on a condition that the first bit block includes the HARQ-ACK bits corresponding to priority index 0, the number of the resource elements of the first reserved resource pool is greater than 0, on a condition that the first bit block includes the HARQ-ACK bits corresponding to priority index 1 and the number of the HARQ-ACK bits of the first bit block is greater than two, the number of the resource elements of the first reserved resource pool is 0.

9. The base station according to claim 8, wherein a procedure is used to determine the coded bit sequence, and the number of the resource elements of the first reserved resource pool is used to determine a manner of executing the procedure.

10. The base station according to claim 8, wherein:

a first coded bit sequence is determined based on the first bit block generates, and a second coded bit sequence is determined based on the second bit block, the first coded bit sequence and the second coded bit sequence are used as inputs to execute a procedure for obtaining the coded bit sequence, the procedure includes at least two of a first sub-procedure, a second sub-procedure or a third sub-procedure, on a condition that the number of the resource elements of the first reserved resource pool is zero, the procedure includes the first sub-procedure and the second sub-procedure, the first coded bit sequence is used as an input to execute the first sub-procedure, the second coded bit sequence is used as an input to execute the second sub-procedure, and the first sub-procedure is executed before the second sub-procedure, on a condition that the number of the resource elements of the first reserved resource pool is greater than zero, the procedure includes the second sub-procedure and the third sub-procedure, the second coded bit sequence is used as an input to execute the second sub-procedure, the first coded bit sequence is used as an input to execute the third sub-procedure, and the third sub-procedure is executed after the second sub-procedure.

11. The base station according to claim 7, wherein a priority indicated by the control information is priority index 1.

12. A method, comprising:

receiving control information indicating a first time-frequency resource pool including time-frequency resources of a physical uplink shared channel (PUSCH); and transmitting modulation symbols associated with a first bit block and a second bit block in the first time-frequency resource pool, wherein the first bit block includes hybrid automatic repeat request-acknowledgment (HARQ-ACK) bits corresponding to priority index 1 or HARQ-ACK bits corresponding to priority index 0, wherein a number of resource elements of a first reserved resource pool is determined based on a number of the HARQ-ACK bits of the first bit block and a priority index of the HARQ-ACK bits of the first bit block, wherein a coded bit sequence is determined based on the first bit block and the second bit block, and the coded bit sequence is related to the number of the resource elements of the first reserved resource pool, and wherein the modulation symbols are generated based on the coded bit sequence.

13. The method according to claim 12, wherein determining the number of the resource elements of the first reserved resource pool based on the number of the HARQ-ACK bits of the first bit block and the priority index of the HARQ-ACK bits includes:

on a condition that the first bit block includes the HARQ-ACK bits corresponding to priority index 1 and the number of the HARQ-ACK bits of the first bit block is not greater than two, the number of the resource elements of the first reserved resource pool is greater than 0, on a condition that the first bit block includes the HARQ-ACK bits corresponding to priority index 0, the number of the resource elements of the first reserved resource pool is greater than 0, on a condition that the first bit block includes the HARQ-ACK bits corresponding to priority index 1 and the number of the HARQ-ACK bits of the first bit block is greater than two, the number of the resource elements of the first reserved resource pool is 0.

14. The method according to claim 13, wherein a procedure is used to determine the coded bit sequence, and the number of the resource elements of the first reserved resource pool is used to determine a manner of executing the procedure.

15. The method according to claim 13, wherein;

a first coded bit sequence is determined based on the first bit block generates, and a second coded bit sequence is determined based on the second bit block, the first coded bit sequence and the second coded bit sequence are used as inputs to execute a procedure for obtaining the coded bit sequence, the procedure includes at least two of a first sub-procedure, a second sub-procedure or a third sub-procedure, on a condition that the number of the resource elements of the first reserved resource pool is zero, the procedure includes the first sub-procedure and the second sub-procedure, the first coded bit sequence is used as an input to execute the first sub-procedure, the second coded bit sequence is used as an input to execute the second sub-procedure, and the first sub-procedure is executed before the second sub-procedure, on a condition that the number of the resource elements of the first reserved resource pool is greater than zero, the procedure includes the second sub-procedure and the third sub-procedure, the second coded bit sequence is used as an input to execute the second sub-procedure, the first coded bit sequence is used as an input to execute the third sub-procedure, and the third sub-procedure is executed after the second sub-procedure.

16. The method according to claim 12, wherein a priority indicated by the control information is priority index 1.

17. The method according to claim 12, wherein the first reserved resource pool includes one or more resource elements reserved for potential HARQ-ACK transmission or the first reserved resource pool is a null set.

18. A method, comprising:

transmitting control information indicating a first time-frequency resource pool including time-frequency resources of a physical uplink shared channel (PUSCH); and receiving modulation symbols associated with a first bit block and a second bit block in the first time-frequency resource pool, wherein the first bit block includes hybrid automatic repeat request-acknowledgment (HARQ-ACK) bits corresponding to priority index 1 or HARQ-ACK bits corresponding to priority index 0, wherein a number of resource elements of a first reserved resource pool is determined based on a number of the HARQ-ACK bits of the first bit block and a priority Index of the HARQ-ACK bits of the first bit block, wherein a coded bit sequence is determined based on the first bit block and the second bit block, and the coded bit sequence is related to the number of the resource elements of the first reserved resource pool, and wherein the modulation symbols are generated based on the coded bit sequence.

* * * * *